(12) United States Patent
Kim et al.

(10) Patent No.: US 11,683,865 B2
(45) Date of Patent: Jun. 20, 2023

(54) COOKING APPLIANCE

(71) Applicant: LG ELECTRONICS INC., Seoul (KR)

(72) Inventors: Hag Soo Kim, Seoul (KR); Eui Sung Kim, Seoul (KR); Sung Mun Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 418 days.

(21) Appl. No.: 16/739,495

(22) Filed: Jan. 10, 2020

(65) Prior Publication Data
US 2020/0229276 A1 Jul. 16, 2020

(30) Foreign Application Priority Data

Jan. 11, 2019 (KR) .................. 10-2019-0004169
Apr. 5, 2019 (KR) .................. 10-2019-0040378
Jul. 8, 2019 (KR) .................. 10-2019-0082347

(51) Int. Cl.
 *H05B 6/12* (2006.01)
 *H05B 6/06* (2006.01)
 *F24C 7/08* (2006.01)

(52) U.S. Cl.
 CPC ............ *H05B 6/1245* (2013.01); *F24C 7/08* (2013.01); *H05B 6/062* (2013.01); *H05B 2206/02* (2013.01); *H05B 2213/03* (2013.01)

(58) Field of Classification Search
 CPC combination set(s) only.
 See application file for complete search history.

(56) References Cited

U.S. PATENT DOCUMENTS

| | | | |
|---|---|---|---|
| 3,761,668 A | 9/1973 | Harnden, Jr. et al. | |
| 4,637,373 A | 1/1987 | Shirai et al. | |
| 5,698,125 A | 12/1997 | Kwon | |
| 2010/0078427 A1 | 4/2010 | Haas et al. | |
| 2017/0040830 A1 | 2/2017 | Jang et al. | |
| 2017/0142780 A1 | 5/2017 | Hoare et al. | |
| 2018/0296033 A1 | 10/2018 | Wenzel et al. | |
| 2021/0243853 A1* | 8/2021 | Suga .................. | H05B 6/062 |

FOREIGN PATENT DOCUMENTS

| | | |
|---|---|---|
| CN | 103353584 A | 10/2013 |
| CN | 203234590 U | 10/2013 |
| CN | 108199493 A | 6/2018 |
| DE | 10160086 A1 | 7/2002 |

(Continued)

*Primary Examiner* — Dana Ross
*Assistant Examiner* — Kuangyue Chen
(74) *Attorney, Agent, or Firm* — Dentons US LLP

(57) ABSTRACT

Disclosed herein is a cooking appliance. A working coil is provided at a lower portion of the cooking appliance. The working coil heats a tray disposed in a cooking compartment in an IH mode. A receiver coil wirelessly receiving external power is stacked below the working coil. An electromagnetic shielding plate is installed between the working coil and the receiver coil to partition a space in which the two coils are installed. The electromagnetic shielding plate shields an electromagnetic field or electromagnetic waves such that the electromagnetic field or electromagnetic waves in one of the two partitioned spaces does not leak to the other space located across the electromagnetic shielding plate.

19 Claims, 43 Drawing Sheets

(56) References Cited

FOREIGN PATENT DOCUMENTS

| | | |
|---|---|---|
| EP | 0757509 A1 | 2/1997 |
| FR | 2582896 A1 | 12/1986 |
| FR | 2649576 A1 | 1/1991 |
| JP | H03-81989 A | 4/1991 |
| JP | H03-050790 U | 5/1991 |
| JP | 0634137 A | 2/1994 |
| JP | 3822899 B2 | 9/2006 |
| JP | 2014127305 A | 7/2014 |
| KR | 1019970011605 A | 3/1997 |
| KR | 1020060062202 A | 6/2006 |
| KR | 20070107731 A * | 11/2007 |
| KR | 1020080024025 A | 3/2008 |
| KR | 1020090063422 A | 6/2009 |
| KR | 200450168 Y1 | 9/2010 |
| KR | 1020110008423 A | 1/2011 |
| KR | 10-2013-0056692 A | 5/2013 |
| KR | 10-1285910 B1 | 7/2013 |
| KR | 10-2013-0128958 A | 11/2013 |
| KR | 10-1335136 B1 | 12/2013 |
| KR | 101437981 B1 | 9/2014 |
| KR | 10-2014-0124106 A | 10/2014 |
| KR | 1020170085727 A | 7/2017 |
| KR | 10-2017-0140713 A | 12/2017 |
| KR | 10-2017-01407137 A | 12/2017 |
| KR | 1020180095332 A | 8/2018 |
| KR | 10-2018-0114340 A | 10/2018 |
| WO | 2014/056785 A1 | 4/2014 |
| WO | 2017-085026 A1 | 5/2017 |
| WO | 2017/174634 A1 | 10/2017 |
| WO | WO-2017174634 A1 * | 10/2017 ........... H05B 6/1236 |
| WO | 2018226059 A1 | 12/2018 |

* cited by examiner

COOKING APPLIANCE

CROSS-REFERENCE TO RELATED APPLICATION

This application claims priority to and the benefit of Korean Patent Application No. 10-2019-0004169 filed on Jan. 11, 2019, Korean Patent Application No. 10-2019-0040378 filed on Apr. 5, 2019, and Korean Patent Application No. 10-2019-0082347 filed on Jul. 8, 2019, the disclosure of which are incorporated herein by reference in their entirety.

BACKGROUND

1. Technical Field

The present disclosure relates to a cooking appliance, and more particularly, to a cooking appliance, such as an oven, including a door for opening and closing a cooking compartment.

2. Related Art

Cooking appliances, which are one kind of home appliances that are used for cooking food, are appliances installed in a kitchen space for cooking food according to a user's intention. Cooking appliances may be classified in various ways according to heat sources or forms used therein or types of fuels used therein.

When classified according to the form of cooking food, cooking appliances may be classified into open cooking appliances and sealed cooking appliances according to the form of a space in which food is placed. Sealed cooking appliances include an oven, a microwave oven, and the like, and open cooking appliances include a cooktop, a hob, and the like.

The sealed cooking appliances are cooking appliances that cook food by sealing a space in which food is located and heating the sealed space. The sealed cooking appliances are provided with a cooking compartment which is a space in which food is placed and which is sealed when attempting to cook the food. The cooking compartment is substantially the space in which food is cooked.

The sealed cooking appliances are broadly classified into gas ovens and electric ovens according to the type of heat source. The gas ovens use gas as a fuel and cook food by flames generated as gas is supplied to a plurality of burners, the burners are ignited, and the supplied gas burns. Unlike the gas ovens, the electric ovens use electricity as a heat source and cook food by heat emitted from a plurality of heaters as the heaters are operated.

Of the gas ovens and the electric ovens, the use of the electric ovens has been increased due to a faster cooking speed, higher thermal efficiency, and better stability thereof as compared with the gas ovens. Also, reducing the size of the electric ovens is easier than reducing the size of the gas ovens. Accordingly, the electric ovens in the form of mini ovens having a small size (hereinafter referred to as "mini ovens") have also been released.

The mini ovens have a small size and are thus not suitable for cooking food of a large size but are suitable for baking or warming a small amount of food which does not require the use of large-capacity ovens.

Particularly, the mini ovens have advantages of being conveniently usable in toasting bread and, in addition to being usable in toasting bread, being usable in cooking a small amount of food having a small size. Accordingly, the use of the mini ovens as cooking appliances for replacing conventional toasters has been increased.

In general, the mini oven includes an outer case for housing all components, a plurality of shelves for placing food during cooking, and a cooking compartment having an open front surface so that food may be put in the cooking compartment and cooked.

Also, the mini oven includes an oven heater for heating food to an appropriate temperature and a door for opening and closing the cooking compartment.

The oven heater may be disposed below the shelves, or may be disposed at an upper portion of the cooking compartment. The oven heater disposed below the shelf is mainly used to heat the shelves, and the oven heater disposed at the upper portion of the cooking compartment can be used to directly apply heat to food placed on the shelves.

Since the mini oven is small and lightweight, movement and installation thereof are convenient. However, since a power cable for supplying power is connected, it is unexpectedly inconvenient to change an installed position of the mini oven as needed.

It may be considered that the mini oven is wirelessly supplied with power to remove the power cable. However, according to this solution, since components required to wirelessly receive power increase a volume and weight of the mini oven, the advantages of the mini oven described above may be reduced by half.

Further, since the cooking appliance converts electricity into heat, power consumption thereof is high. Therefore, the cooling appliance needs to be wirelessly supplied with a large quantity of power. However, this causes a problem in that the volume and weight of the mini oven are increased.

Further, if a coil is disposed to reduce the volume, the coil is not easily cooled, which leads to a problem in that efficiency of the coil is lowered.

SUMMARY

Various embodiments are directed to providing a cooking appliance that wirelessly receives power as a portable cooking appliance among cooking appliances using electricity as a heat source, and is free from a power cable.

Also, various embodiments are directed to providing a cooking appliance which wirelessly receives power and in which a volume occupied by components for wirelessly receiving power is minimized.

Further, various embodiments are directed to providing a cooking appliance in which components for wirelessly receiving power are installed in a narrow space.

In addition, various embodiments are directed to providing a cooking appliance that is easily cooled in spite of installation in a narrow space.

These objects are solved by the subject-matter of the independent claim. Further advantageous embodiments and refinements are described in the respective dependent claims.

According to an embodiment of the present disclosure, a cooking appliance includes: a housing having a cooking compartment and a bottom part defining a bottom surface of the cooking compartment, a base below the bottom part; and an induction heating part installed between the bottom part and the base and including: a working coil for inductively heating an object in the cooking compartment installed adjacent to the bottom part, a receiver coil installed adjacent to the base and configured to wirelessly receive power for operating the cooking appliance and an electromagnetic shielding plate provided between the working coil and the receiver coil and configured to shield electromagnetic waves. The electromagnetic shielding plate may be configured to block electromagnetic coupling of the working coil and the receiver coil. The bottom part, the working coil, the shielding plate and the receiver coil may be stacked in this order.

Within the context of the present disclosure, the expression "bottom/side/back surface", may be understood as and substituted respectively by the expression "bottom/side/back wall", "bottom/side/back plate" or "bottom/side/back portion".

A door that opens and closes the cooking compartment may be further provided. The door may be rotatable about an upper edge of a back part of the housing or about an axis parallel thereto and/or about a rear edge of a door upper surface part of the door or about an axis parallel thereto.

An "up-down direction" may be understood as a vertical direction, and a "left-right direction" and a "front-rear direction" may be understood as horizontal directions, respectively, and are perpendicular to each other and perpendicular to the vertical direction, respectively.

The cooking appliance according to an embodiment of the present disclosure to achieve the objects has a working coil provided at a lower portion thereof. The working coil heats a cooking compartment and/or a tray disposed in the cooking compartment in an IH mode, that is by induction. A receiver coil for wirelessly receiving external power is stacked below the working coil.

An electromagnetic shielding plate is installed between the working coil and the receiver coil to partition a space in which the two coils are installed. The electromagnetic shielding plate shields an electromagnetic field or electromagnetic waves such that the electromagnetic field or electromagnetic waves in one of the two partitioned spaces does not leak to the other space located across the electromagnetic shielding plate.

The electromagnetic shielding plate may be formed of a piece of metal plate. The metal plate may contain an aluminum material.

The working coil, the electromagnetic shielding plate, and the receiver coil may be stacked in an up-down direction, and may be in close contact with one another.

The working coil may include a first coil installation base on which a first coil is supported.

The receiver coil may include a second coil installation base on which a second coil is supported.

A lower surface of the first coil installation base may be in contact with an upper surface of the electromagnetic shielding plate, and a lower surface of the electromagnetic shielding plate may be in contact with an upper surface of the second coil installation base.

The cooking appliance may be a mini oven that includes a housing in which a cooking compartment is formed, and a door that opens and closes the cooking compartment.

The cooking appliance according to an embodiment of the present disclosure includes a housing in which a cooking compartment is formed, and a door that opens and closes the cooking compartment.

The cooking appliance includes a working coil housed in a space provided below a bottom surface of the cooking compartment of the housing and installed adjacent to the bottom surface.

The cooking appliance includes a receiver coil tacked below the working coil, housed in a space provided above a base of the housing which is defined as a bottom of the cooking appliance, installed adjacent to the base, and wirelessly receiving power from a working coil of an another appliance located below the bottom of the cooking appliance.

The cooking appliance includes a second control board electrically connected to the receiver coil and supplying the working coil with the power received from the receiver coil).

The cooking appliance includes an electromagnetic shielding plate stacked between the working coil and the receiver coil and shielding electromagnetic waves.

The electromagnetic shielding plate prevents the electromagnetic waves generated from the working coil or the electromagnetic waves in a space in which the working coil is housed from being transmitted to the receiver coil, and prevents the electromagnetic waves generated from the receiver coil or the electromagnetic waves in a space in which the receiver coil is housed from being transmitted to the working coil.

The electromagnetic shielding plate may be a plate containing an aluminum material, and a piece of plate may be disposed between the working coil and the receiver coil.

The cooking appliance can prevent an electromagnetic field and electromagnetic waves in one of the two spaces divided by the one plate from moving to the other space.

The electromagnetic shielding plate may have a size that covers both the receiver coil and the working coil.

The working coil may include a plurality of first ferrites that radially extend from positions spaced apart from the center thereof by a prescribed distance, and the receiver coil may include a plurality of second ferrites that radially extend from positions spaced apart from the center thereof by a prescribed distance.

The working coil may include a first coil that surrounds the center thereof from a position spaced apart from the center thereof, and the receiver coil may include a second coil that surrounds the center thereof from a position spaced apart from the center thereof.

The first ferrites may extend in a direction orthogonal to a direction in which the first coil is wound, and the second ferrites may extend in a direction orthogonal to a direction in which the second coil is wound.

Among regions which the electromagnetic shielding plate has, first ferrite corresponding regions corresponding to regions in which the first ferrites are disposed and second ferrite corresponding regions corresponding to regions in which the second ferrites are disposed are all blocked or overlapped or covered. Therefore, the electromagnetic shielding is reliably performed by one piece of electromagnetic shielding plate.

The electromagnetic shielding plate may include a first coil corresponding region corresponding to a region in which the first coil is disposed, and a second coil corresponding region corresponding to a region in which the second coil is disposed.

The second coil corresponding region of the electromagnetic shielding plate may have a blocked shape. Thus, heat transmitted from the tray heated in the cooking compartment to the working coil again can be shielded by the electromagnetic shielding plate such that the heat is not transmitted to the second coil.

The first coil corresponding region and the second coil corresponding region of the electromagnetic shielding plate may at least partly overlap each other. Also, vents may be provided in regions of the second coil corresponding region which do not overlap the first coil corresponding region.

If the heat transmitted from the tray heated in the cooking compartment to the working coil again heats the first coil, there is concern over a reduction in IH (inductive heating)

efficiency. For this reason, the vents are provided in the electromagnetic shielding plate, such that the heat transmitted from the tray heated in the cooking compartment to the working coil again can be prevented from being transmitted to the second coil, and the first coil can be smoothly cooled.

The working coil may include a first coil installation base to which the first coil and the first ferrites are fixed. Open holes may be provided in regions in which the first coil is installed in the first coil installation base.

The regions of the open holes of the first coil installation base and the regions of the vents of the electromagnetic shielding plate may at least partly overlap each other. Thus, the first coil can be more smoothly cooled.

The receiver coil may have a circular shape. Then, the shape of the receiver coil is caused to correspond to that of a working coil provided in another appliance, for instance, an IH type cooktop, so that wireless power transmission efficiency can be enhanced.

The working coil may have a rectangular shape whose corner portions are rounded. Then, a tray having a rectangular shape can be rapidly heated and heating efficiency can be enhanced.

The center of the receiver coil may be aligned with the center of the working coil. If the receiver coil of the cooking appliance is aligned with a working coil of a cooktop that is an appliance different from the cooking appliance, power can be transmitted in the order of the working coil of the cooktop, and the receiver coil, the second control board, and the working coil of the cooking appliance, and the tray of the cooking appliance can be heated. In this case, a user can feel as if the working coil of the cooktop directly heats the tray of the cooking compartment. Therefore, when the user puts the cooking appliance on the working coil of the cooktop, the user can intuitively align the center of the working coil of the cooktop with the center of the cooking compartment, and put the cooking appliance.

The second control board may be installed, in an erected form, behind a back surface of the cooking compartment of the housing.

An insulating plate may be interposed between the back surface and the second control board. The insulating plate can electrically insulate the second control board and the housing formed of a metal material. The insulating plate can insulate heat such that heat of the cooking compartment is not transmitted to the second control board.

An inner space provided below the bottom surface of the cooking compartment of the housing and an inner space provided behind the back surface of the cooking compartment of the housing may be connected to communicate with each other. Thus, cable connection between the working coil and the second control board and between the receiver coil and the second control board can be easily performed.

That is, the first coil and the second control board may be connected by a first coil connecting wiring through the space connected to communicate with each other, and the second coil and the second control board may be connected by a second coil connecting wiring through the space connected to communicate with each other.

A first central hole may be provided in the center of the working coil, a third central hole may be provided in the center of the electromagnetic shielding plate, and a second central hole may be provided in the center of the receiver coil.

The centers of the first central hole, the second central hole, and the third central hole may be aligned and connected to communicate with one another up and down. A temperature measurement module may be inserted to pass through the first central hole, the second central hole, and the third central hole in an up-down direction.

An upper end of the temperature measurement module may come into contact with a bottom surface of the tray, and measure a temperature of the tray.

The second control board may be electrically connected to the temperature measurement module.

The second control board may control the working coil on the basis of the temperature measured by the temperature measurement module.

The cooking appliance of the present disclosure has no power cable because it is wirelessly supplied with power. Therefore, when a position of the cooking appliance is changed, a user does not need to worry about the power cable. Since the cooking appliance is free from connection of the power cable, a change in position thereof is easy. The power can be supplied to the cooking appliance only by putting the cooking appliance on a working coil of another appliance.

In the cooking appliance of the present disclosure, since a volume occupied by the receiver coil for wirelessly receiving power from another appliance is very small, an increase in a size of the cooking appliance can be prevented. Thus, advantages of a small cooking appliance can be maintained without a change.

In the cooking appliance of the present disclosure, even though a coil is installed in a narrow space, the coil is easily cooled, so that efficiency of the coil can be enhanced.

In the cooking appliance of the present disclosure, components for wirelessly receiving power can be compactly disposed, and smoothly cooled. Thus, heating efficiency and wireless power supply efficiency are not reduced due to heat generated in the process of actuating the cooking appliance.

DETAILED DESCRIPTION

Figure 1:
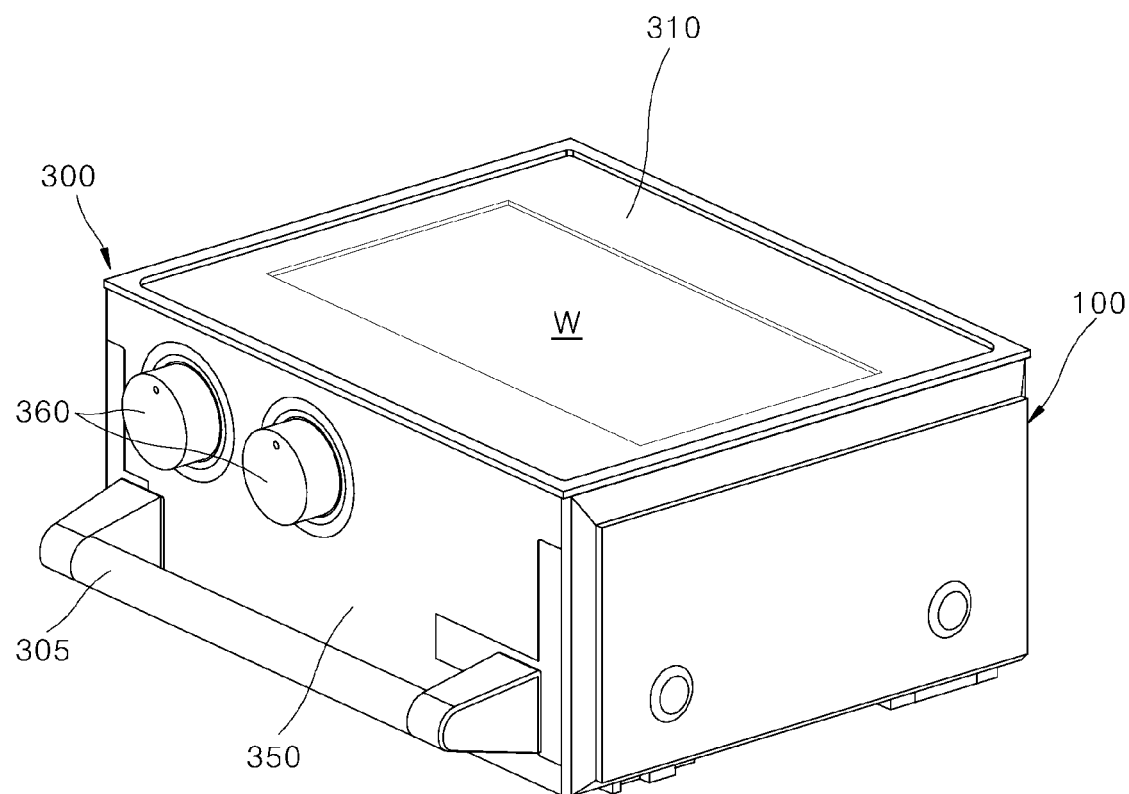
FIG. 1 is a perspective view illustrating a cooking appliance according to an embodiment of the present disclosure.

The above-mentioned objectives, features, and advantages will be described in detail with reference to the accompanying drawings, and accordingly, those of ordinary skill in the art to which the present disclosure pertains should be able to easily practice the technical idea of the present disclosure. In describing the present disclosure, when detailed description of known art related to the present disclosure is deemed as having a possibility of unnecessarily blurring the gist of the present disclosure, the detailed description will be omitted. Hereinafter, exemplary embodiments according to the present disclosure will be described in detail with reference to the accompanying drawings. Like reference numerals in the drawings refer to like or similar elements throughout.

Terms such as first and second are used to describe various elements, but the elements are of course not limited by the terms. The terms are merely used for distinguishing one element from another element, and a first element may also be a second element unless particularly described otherwise.

Hereinafter, when it is said that an arbitrary element is disposed at "an upper portion (or a lower portion)" of an element or disposed "above (or below)" an element, this may not only mean that the arbitrary element is disposed in contact with an upper surface (or a lower surface) of the element, but also mean that another element may be interposed between the element and the arbitrary element disposed above (or below) the element.

Also, when it is said that a certain element is "connected" or "coupled" to another element, this may mean that the elements are directly connected or coupled to each other, but it should be understood that another element may be "interposed" between the elements or the elements may be "connected" or "coupled" to each other via another element.

Through the specification, each element may be singular or plural unless particularly described otherwise.

A singular expression used herein encompasses a plural expression unless the context clearly indicates otherwise. In the present application, terms such as "consisting of" or "including" should not be interpreted as necessarily including all of various elements or various steps described herein and should be interpreted as indicating that some of the elements or some of the steps may not be included or additional elements or steps may be further included.

Throughout the specification, "A and/or B" may refer to A, B, or A and B unless particularly described otherwise, and "C to D" refers to C or more and D or less unless particularly described otherwise.

[Overall Structure of Cooking Appliance]

Figure 2:
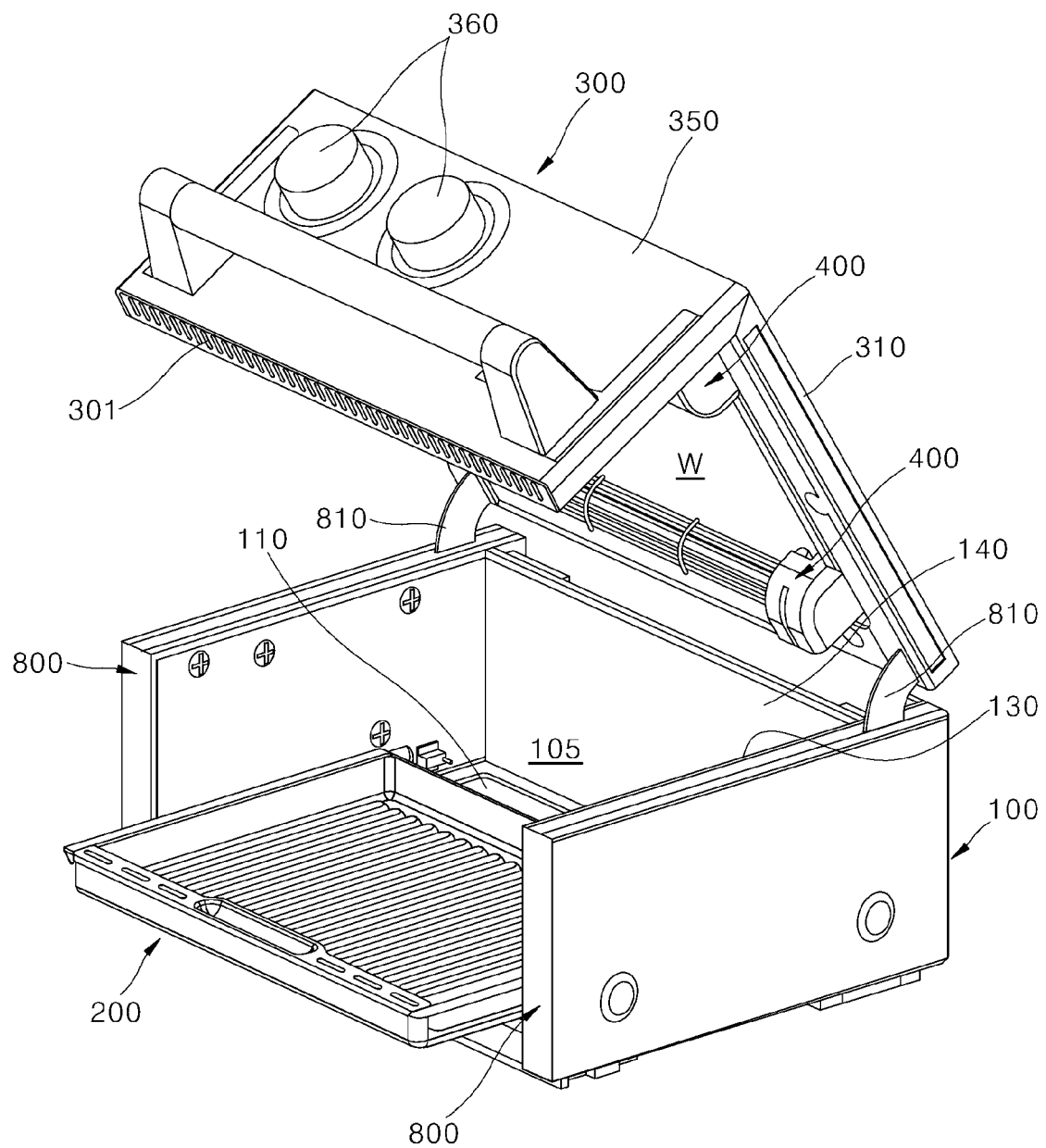
FIG. 2 is a perspective view illustrating a door-opened state of the cooking appliance illustrated in FIG. 1.
Figure 3:
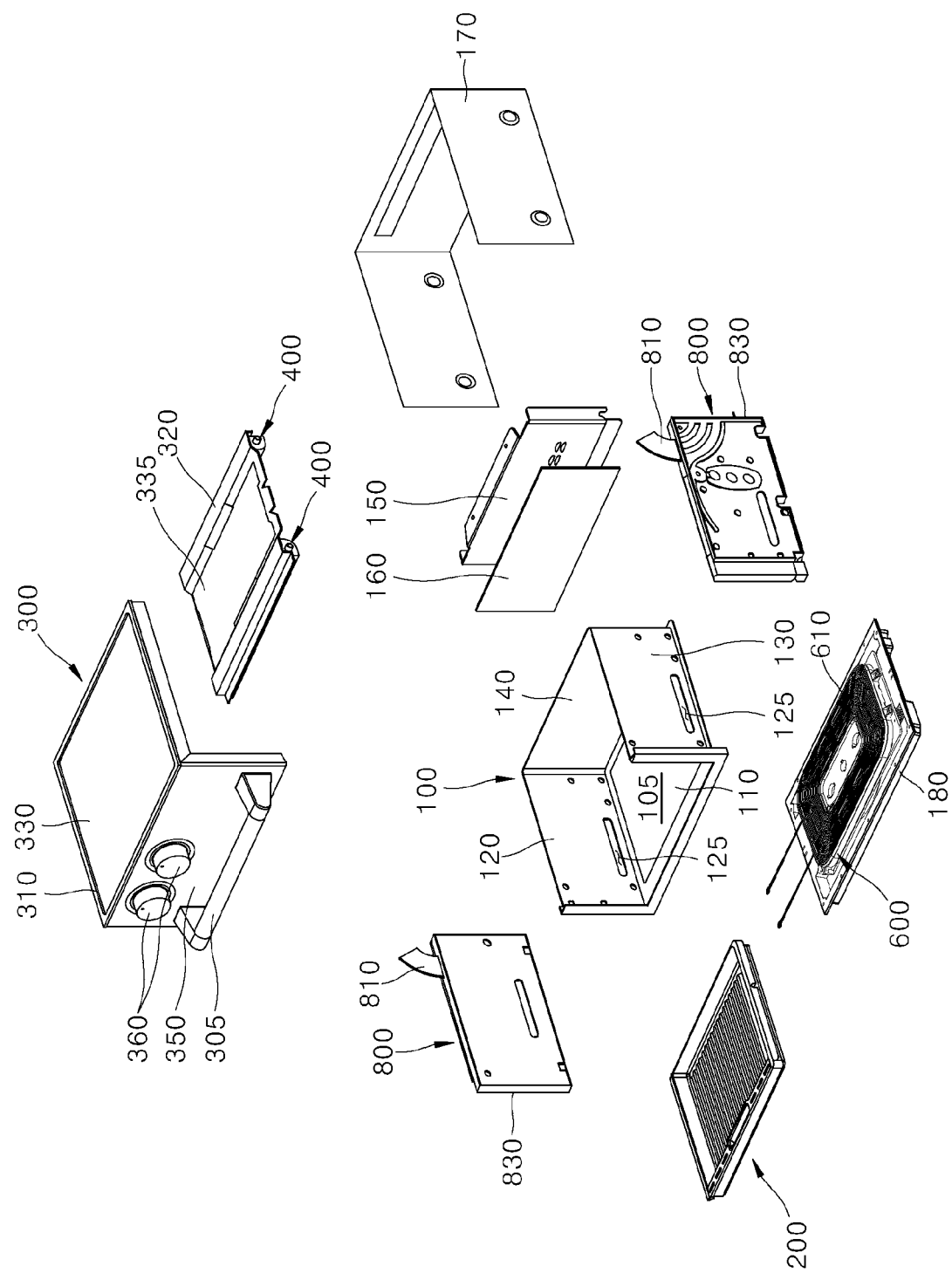
FIG. 3 is an exploded perspective view illustrating an exploded state of the cooking appliance illustrated in FIG. 1.

FIG. 1 is a perspective view illustrating a cooking appliance according to an embodiment of the present disclosure, FIG. 2 is a perspective view illustrating a door-opened state of the cooking appliance illustrated in FIG. 1, and FIG. 3 is an exploded perspective view illustrating an exploded state of the cooking appliance illustrated in FIG. 1.

Referring to FIGS. 1 to 3, the cooking appliance according to an embodiment of the present disclosure may include a housing 100, a door 300, a tray 200, and heating parts 400 and 600.

The housing 100 forms a frame of the cooking appliance according to the present embodiment. According to this, various components constituting the cooking appliance are installed in the housing 100, and a cooking compartment 105 which provides a space for cooking food is formed inside the housing 100.

In the present embodiment, the housing 100 is illustrated as being formed in a hexahedral shape with open upper and front surfaces. That is, the housing 100 includes a bottom surface 110, a pair of side surfaces 120 and 130, and a back surface 140, has a space formed therein, and is provided in a form in which the upper surface and the front surface are open. The cooking compartment 105 surrounded by the bottom surface 110, the both side surfaces 120 and 130, and the back surface 140 of the housing 100 is formed inside the housing 100.

The tray 200 is disposed in the cooking compartment 105 formed inside the housing 100. The tray 200 is provided so that an object to be cooked is seated thereon. The tray 200 may be detachably installed inside the cooking compartment 105. Also, for convenience of a user, the tray 200 may be provided to be withdrawable to the front of the cooking compartment 105.

The tray 200 may be installed to be movable in a front-rear direction by interlocking with an operation of opening or closing the door 300, and the movement of the tray 200 in the front-rear direction may be guided by hinge assemblies 800 which will be described below. This will be described in detail below.

The door 300 is provided to open or close the open upper and front surfaces of the housing 100. In the present embodiment, the housing 100 forms an exterior of a bottom surface, side surfaces, and a back surface of the cooking appliance while the door 300 forms an exterior of an upper surface and a front surface of the cooking appliance. The door 300 may include a door upper surface part 310 and a door front surface part 350.

The door upper surface part 310 forms an upper surface of the door 300 and corresponds to an element which covers the open upper surface of the housing 100 when the door 300 closes the cooking compartment 105 inside the housing 100. Also, the door front surface part 350 forms a front surface of the door 300 and corresponds to an element which covers the open front surface of the housing 100 when the door 300 closes the cooking compartment 105.

In the present embodiment, the door 300 is illustrated as being formed in an L-shape. That is, in the door 300, the door upper surface part 310 forming the upper surface of the door 300 and the door front surface part 350 forming the front surface of the door 300 are formed in the form of being connected to each other in an L-shape. The door 300 formed in this way opens or closes the cooking compartment 105 as the door upper surface part 310 and the door front surface part 350 connected to each other in an L-shape rotate together when the door 300 rotates for opening or closing the cooking compartment 105.

The door 300 is rotatably installed at an upper portion of the housing 100 and is rotatably coupled to the housing 100 via the hinge assemblies 800 installed at the housing 100. In this case, the hinge assemblies 800 are disposed at each of both side portions of the housing 100, and a rear side of the door upper surface part 310 is rotatably coupled to the hinge assemblies 800.

Also, a handle 305 may be provided at the front surface of the door 300, and a user may open or close the cooking compartment 105 by holding the handle 305 and rotating the door 300 in the up-down direction.

The heating parts 400 and 600 may be installed at the housing 100 or the door 300 and heat the tray 200 disposed in the cooking compartment 105. In the present embodiment, the heating parts 400 and 600 are illustrated as including a first heating part 400 disposed at the door 300 and a second heating part 600 disposed in the housing 100.

The first heating part 400 is installed at the door 300 such that, when the door 300 closes the cooking compartment 105, the first heating part 400 is housed inside the cooking compartment 105. The first heating part 400 is installed at the door upper surface part 310 in such a way that the first heating part 400 is disposed at a bottom surface side of the door upper surface part 310 facing the bottom surface of the housing 100.

In the present embodiment, the first heating part 400 is illustrated as being provided in the form including an electric heater. The first heating part 400 may heat the object to be cooked which is seated on the tray 200 from an upper portion of the tray 200.

The second heating part 600 is installed at the housing 100, and is disposed at a lower portion of the tray 200. The second heating part 600 is provided in the form of a heating part which heats the tray 200 using a different heating method from the first heating part 400, e.g., an induction heating part.

The second heating part 600 may be provided below the bottom surface 110 of the housing 110 and may be provided in the form including a working coil 610 installed at a lower portion of the bottom surface 110 of the housing 100 and/or below the bottom surface 110 and may induce heating of the tray 200 from the lower portion of the tray 200. To this end, the tray 200 may be formed of a material which may be inductively heated by the second heating part 600. Thus, the working coil 610 may be configured to transmit power to the bottom surface 110 and/or the tray by induction and thereby inductively heat the bottom surface 100, the tray 200 and/or the cooking compartment 105.

In summary, the cooking appliance according to the present embodiment includes the housing 100 in which the cooking compartment 105 is formed, the door 300 provided to be able to simultaneously open the front and the top of the cooking compartment 105, the first heating part 400 provided to be able to heat the inside of the cooking compartment 105 from the from the top, and the second heating part 600 provided to be able to inductively heat the tray 200 inside the cooking compartment 105, wherein the withdrawal and insertion of the tray 200 may be performed by interlocking with the operation of opening or closing the door 300.

Detailed descriptions of the above-mentioned elements and other elements not mentioned yet will be sequentially given below.

[Structure of Housing]

Figure 4:
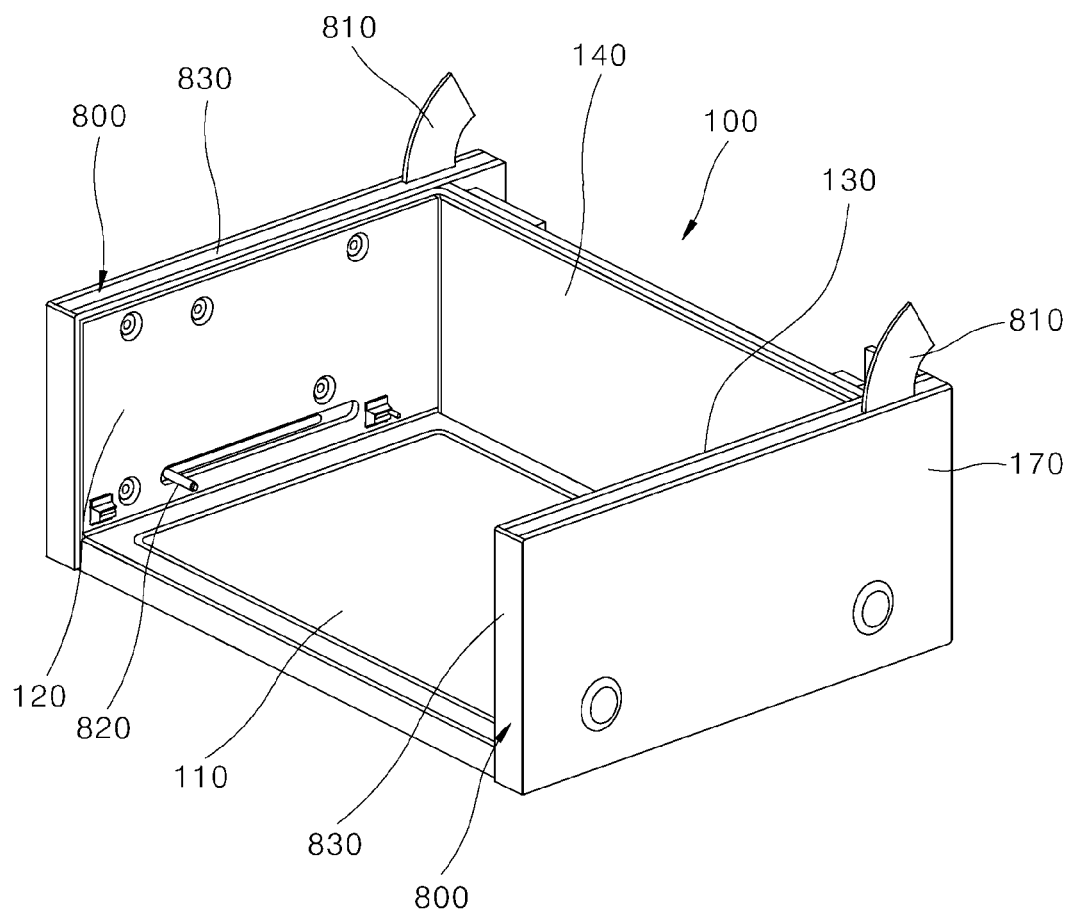
FIG. 4 is a perspective view separately illustrating a housing and hinge assemblies illustrated in FIG. 1.

FIG. 4 is a perspective view separately illustrating a housing and hinge assemblies illustrated in FIG. 1.

Referring to FIGS. 3 and 4, as described above, the housing 100 includes the bottom surface 110, the pair of side surfaces 120 and 130, and the back surface 140, has the space formed therein, and is provided in the form in which the upper surface and the front surface are open.

The cooking compartment 105 may be formed in the inner space surrounded by the bottom surface 110, the both side surfaces 120 and 130, and the back surface 140 of the housing 100, and the tray 200 may be installed in the cooking compartment 105 so as to be withdrawable therefrom.

Also, the second heating part 600 may be installed at the lower portion of the bottom surface of the housing 100, and an electronic component, e.g., a second control board 700 which will be described below, related to operation of the second heating part 600 may be installed at the rear of the back surface of the housing 100.

Further, the hinge assemblies 800 may be installed at outer sides of the both side surfaces 120 and 130 of the housing 100, and the door 300 may be rotatably installed at the housing 100 by being coupled to the hinge assemblies 800 installed as above.

Also, a back surface case 150 which houses the second control board 700 which will be described below is disposed at the rear of the back surface 140 of the housing 100. The second control board 700 is housed in the back surface case 150 and installed at the rear of the housing 100, and an insulating plate 160 is disposed between the back surface 140 of the housing 100 and the back surface case 150.

The insulating plate 160 serves to block transfer of hot air of the inside of the cooking compartment 105 to the second control board 700 via the back surface 140 of the housing 100 and insulate the housing 100 and the back surface case 150, in which the second control board 700 is installed, from each other.

Further, the housing 100 of the present embodiment may further include a cabinet 170. The cabinet 170 is provided to cover the both side surfaces 120 and 130 and the back surface 140 of the housing 100. The cabinet 170 may surround and protect the hinge assemblies 800 installed at the both side surfaces 120 and 130 of the housing 100 and the second control board 700 installed at the back surface 140 of the housing 100 from the outside and form an exterior of the side portions and the rear of the cooking appliance.

[Structure of Door]

Figure 5:
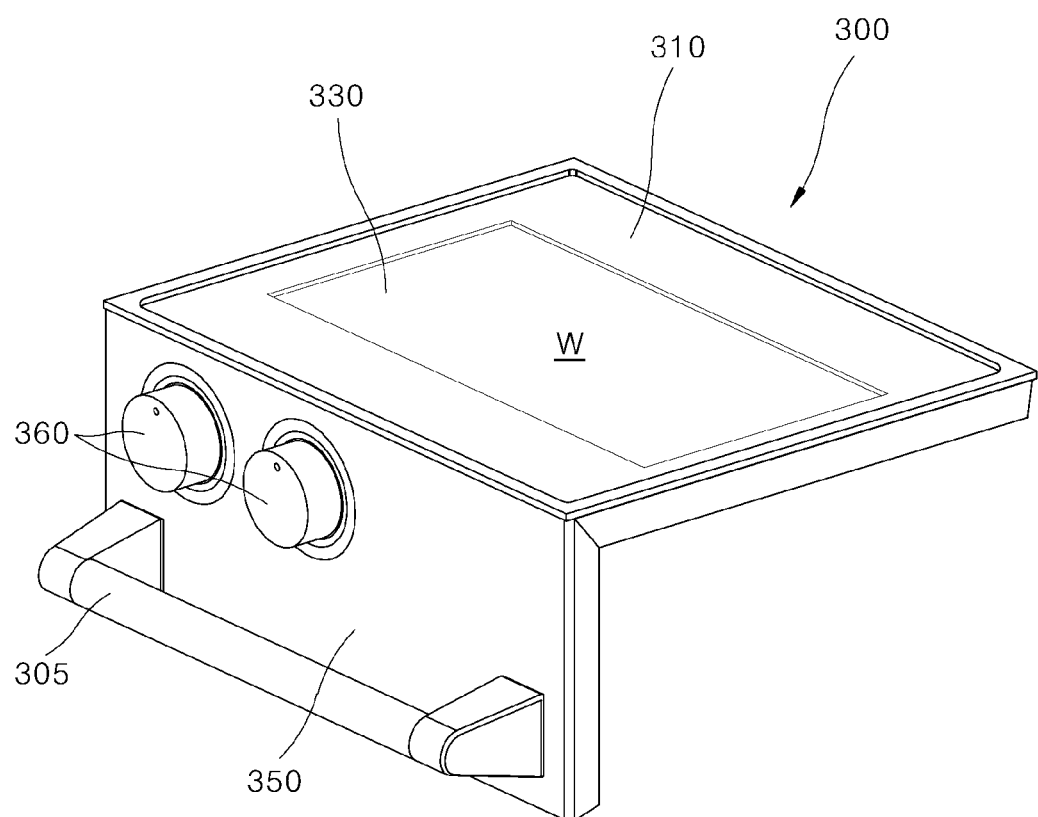
FIG. 5 is a perspective view separately illustrating a door according to an embodiment of the present disclosure.
Figure 6:
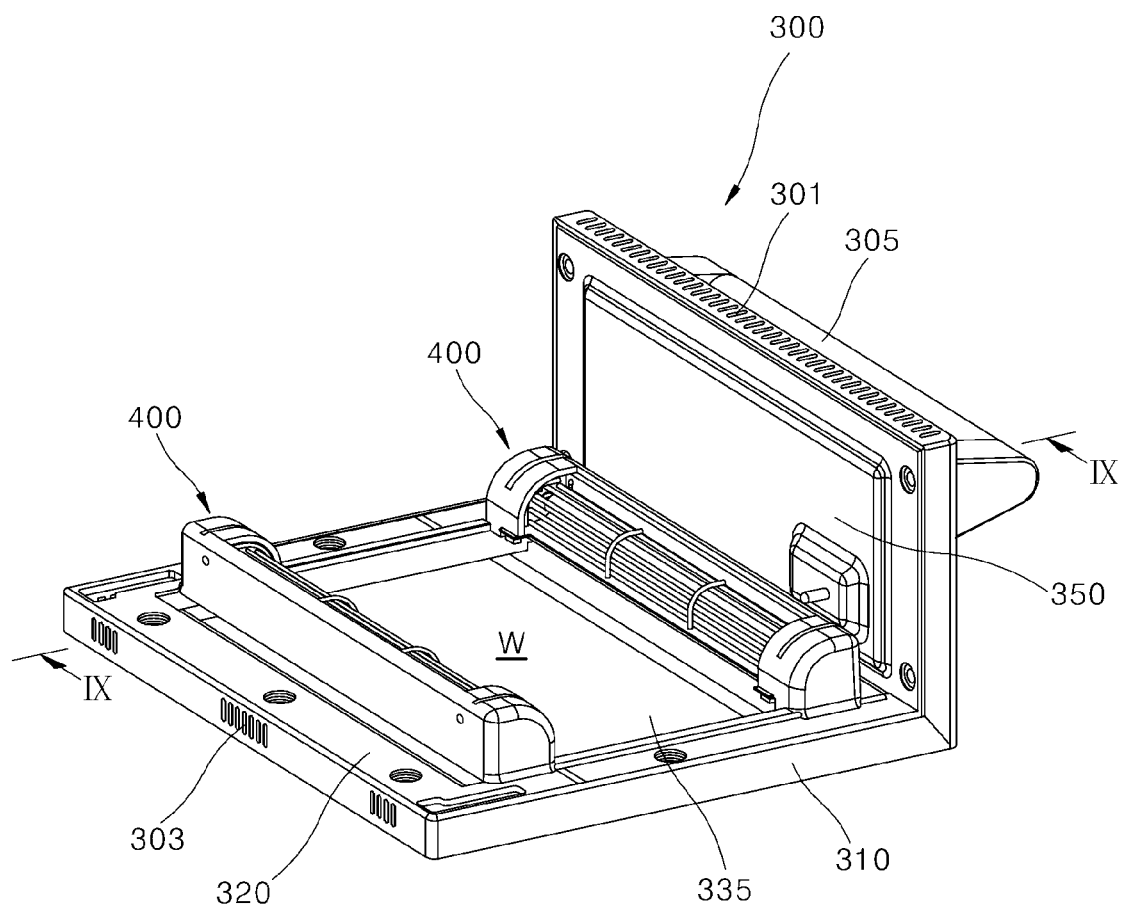
FIG. 6 is a bottom perspective view illustrating a bottom surface side of the door illustrated in FIG. 5.
Figure 7:
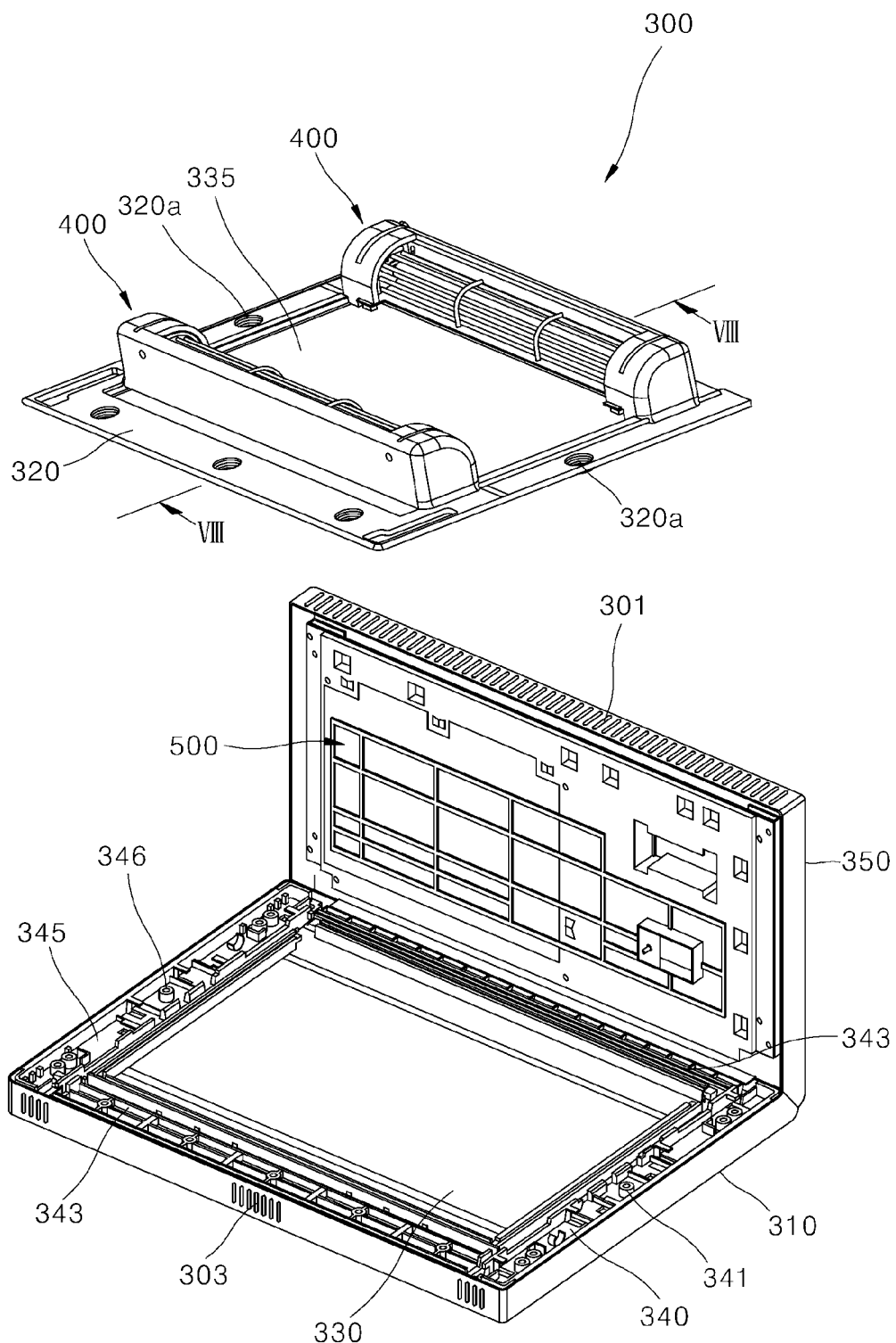
FIG. 7 is an exploded perspective view illustrating configuration of the door illustrated in FIG. 6 in an exploded manner.
Figure 8:
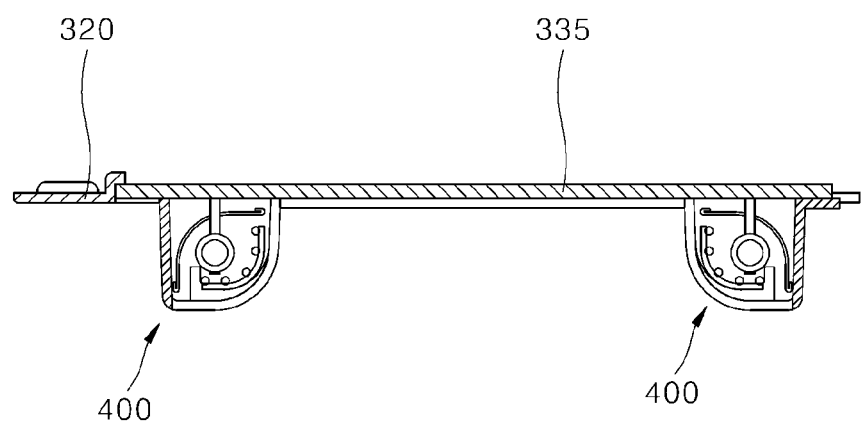
FIG. 8 is a cross-sectional view taken along line "VIII-VIII" of FIG. 7.
Figure 9:
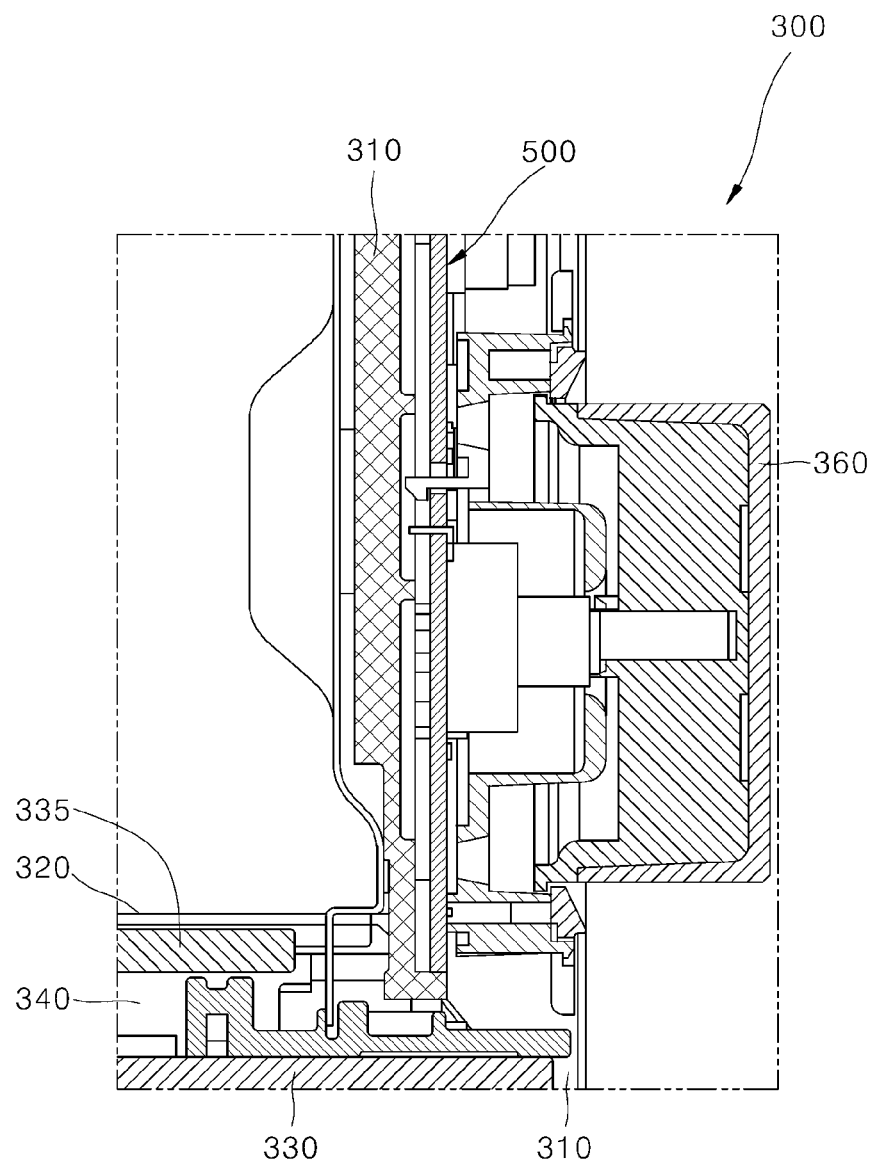
FIG. 9 is a cross-sectional view taken along line "IX-IX" of FIG. 6.
Figure 10:
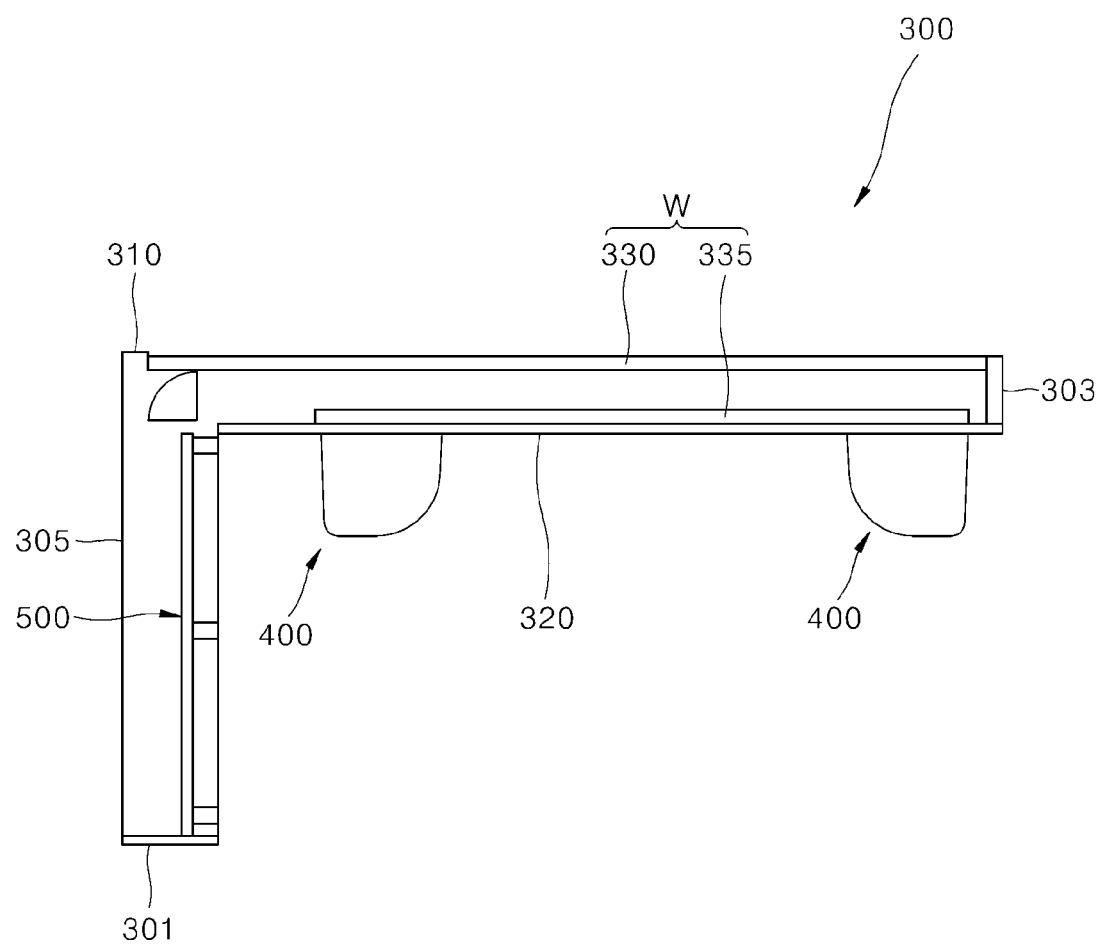
FIG. 10 is a cross-sectional view schematically illustrating a flow of air inside the door according to an embodiment of the present disclosure.

FIG. 5 is a perspective view separately illustrating a door according to an embodiment of the present disclosure, and FIG. 6 is a bottom perspective view illustrating a bottom surface side of the door illustrated in FIG. 5. Also, FIG. 7 is an exploded perspective view illustrating configuration of the door illustrated in FIG. 6 in an exploded manner, and FIG. 8 is a cross-sectional view taken along line "VIII-VIII" of FIG. 7. Also, FIG. 9 is a cross-sectional view taken along line "IX-IX" of FIG. 6, and FIG. 10 is a cross-sectional view schematically illustrating a flow of air inside the door according to an embodiment of the present disclosure.

Referring to FIGS. 5 to 9, the door 300 is provided in the form in which the door upper surface part 310 forming the upper surface of the door 300 and the door front surface part 350 forming the front surface of the door 300 are integrally connected to each other in an L-shape.

The door upper surface part 310 may be formed in a quadrilateral shape such that the door upper surface part 310 is formed in a rectangular shape in which a front-rear length is longer than a left-right length. A door frame 320 may be installed at the door upper surface part 310. The door frame 320 may be installed at a lower portion of the door upper surface part 310, and the first heating part 400 may be installed at the lower portion of the door upper surface part 310 while being coupled to the door frame 320.

The door 300 may include a see-through window W. The see-through window W may be disposed at the door upper surface part 310 such that the see-through window W is provided to be located at a central portion of the door upper surface part 310 in a planar direction.

The see-through window W may include a pair of glasses 330 and 335 which are disposed to be spaced a predetermined distance apart from each other in the up-down direction so that a space portion is formed inside the see-through window W. For example, of the glasses 330 and 335, the glass 330 (hereinafter referred to as "first glass") may be installed at the door upper surface part 310, and the other glass 335 (hereinafter referred to as "second glass") may be installed at the door frame 320.

A through-hole may be formed in each of the door upper surface part 310 and the door frame 320. The through-holes may be formed at the center of the door upper surface part 310 in the planar direction and at the center of the door frame 320 in the planar direction.

According to the present embodiment, the first glass 330 is installed in the door upper surface part 310 in such a way that the through-hole formed in the door upper surface part 310 is covered by the first glass 330 from the top, and the second glass 335 is installed in the door frame 320 in such a way that the through-hole formed in the door frame 320 is covered by the second glass 335 from the top.

The first glass 330 and the second glass 335 may be formed of glass formed of a transparent or translucent material. The see-through window W may be formed at portions of the through-holes covered by the first glass 330 and the second glass 335.

The user may view the inside of the cooking compartment 105 from the top through the see-through window W formed as above, and in this way, a cooking state of food inside the cooking compartment 105 may be checked. Due to characteristics of a mini oven, the cooking appliance of the present embodiment is often used at a point which is significantly lower than the user's face. Therefore, the see-through window W formed at the upper surface of the door 300 may be provided as a means that allows the user to easily and conveniently check the cooking state of food without lowering the posture or bending the waist forward.

Further, the pair of glasses 330 and 335 forming the see-through window W are coupled to different elements, that is, one is coupled to the door upper surface part 310 and the other is coupled to the door frame 320, and are disposed to be spaced a predetermined distance apart from each other. Accordingly, a separation space between the two glasses 330 and 335 is formed inside the see-through window W.

An air layer formed in the separation space formed in this way serves to block transfer of heat, which has heated the second glass 335 directly exposed to the cooking compartment 105, to the first glass 330 disposed at the outermost side.

In this way, the see-through window W provided in the double-window structure as described above has a function of preventing, to a significant level, the occurrence of safety accidents caused by the overheating of the see-through window W, the occurrence of steaming up of the see-through window W due to a temperature rise of the see-through window W, and the like.

Meanwhile, the first heating part 400 is installed at the door upper surface part 310 in such a way that the first heating part 400 is disposed in a region not exposed through the see-through window W when viewed from the top. The first heating part 400 is disposed at a front outer side and a rear outer side of the see-through window W on a plane in a horizontal direction formed by the door upper surface part 310. In other words, the first heating part 400 may be disposed at outer sides of the through-holes formed in the door upper surface part 310 and the door frame 320. That is, the cooking appliance of the present embodiment may include a pair of first heating parts 400 disposed at the front outer side and the rear outer side of the see-through window W.

When the first heating part 400 is disposed in a region exposed through the see-through window W, it is aesthetically not desirable, a problem may occur in securing the field of view through the see-through window W, and a problem in that a temperature of a portion of the see-through window W rises may also occur.

Also, in consideration of the shape of the door front surface part 350 having a rectangular shape in which a front-rear length is longer than a left-right length, the first heating part 400 should be disposed at the front outer side and the rear outer side of the see-through window W for a length of the first heating part 400 to be increased accordingly, and improvement in thermal power of the first heating part 400 may be expected as much as the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving thermal power of the first heating part 400.

The door front surface part 350 may be formed in a rectangular shape like the door upper surface part 310. However, when the door upper surface part 310 forms a plane in the horizontal direction, the door front surface part 350 forms a plane in a vertical direction.

For example, the door front surface part 350 may be formed in the form extending downward from a front end portion of the door upper surface part 310. Also, the door front surface part 350 and the door upper surface part 310 may be connected in the form in which an inner space of the door front surface part 350 and an inner space of the door upper surface part 310 are connected to each other. That is, the door 300 may be provided in the form in which the door front surface part 350 and the door upper surface part 310, whose inner spaces are connected to each other, are integrally connected in an L-shape.

An input part 360 and a first control board 500 may be disposed in the door front surface part 350. In the present embodiment, a space portion is illustrated as being formed inside the door front surface part 350. In the space portion, at least a portion of the input part 360 and the first control board 500 may be housed.

The input part 360 may include various manipulation switches for controlling and manipulating operation of the cooking appliance according to the present embodiment. For example, the input part 360 may include a manipulation switch for controlling on/off states or thermal power of the first heating part 400, a manipulation switch for controlling on/off states or thermal power of the second heating part 600, a timer manipulation switch for controlling operation time of the first heating part 400 or the second heating part 600 (see FIG. 3), and the like. The input part 360 may be provided to be exposed at the front surface of the door front surface part 350, and the user may directly manipulate the input part 360 to control operation of the cooking appliance.

The first control board 500 is installed inside the door front surface part 350. Various elements and circuits related to reception of manipulation signals input via the input part 360, generation of control signals for controlling operations of the first heating part 400 and the second heating part 600, and the like are provided in the first control board 500.

The first control board 500 is required to be electrically connected to the input part 360, the first heating part 400, and the second heating part 600. The first control board 500 is disposed in the door front surface part 350 like the input part 360 and is disposed at a position very close to the input part 360. The first control board 500 is disposed at a position which is also very close to the first heating part 400 disposed on the door 300.

According to the present embodiment, the input part 360 may be electrically connected to the first control board 500 in the form of being directly mounted on the first control board 500, and the first heating part 400 may be electrically connected to the input part 360 and the first control board 500 via a cable installed through the inside of the door front surface part 350 and the inside of the door upper surface part 310 which are connected to each other.

That is, since the first control board 500, the input part 360, and the first heating part 400 which have to be electrically connected to one another are disposed at positions very close and spatially connected to one another, not only is it possible to easily and promptly perform a task for electrically connecting the first control board 500, the input part 360, and the first heating part 400, but also it is possible to maintain a connection structure thereof in a very stable state.

Also, the cooking appliance of the present embodiment may further include cable mounting parts 340 and 345. The cable mounting parts 340 and 345 are disposed between the door upper surface part 310 and the door frame 320, which are disposed in the up-down direction, in such a way that the cable mounting parts 340 and 345 are disposed at both outer sides of the see-through window W.

Further, a connecting member 341 is disposed at each of the front outer side and the rear outer side of the see-through window W. The pair of connecting members 341 connect the pair of cable mounting parts 340 and 345 spaced apart from each other. That is, the pair of cable mounting parts 340 and 345 and the pair of connecting members 341 may be provided in a square shape surrounding the see-through window W from the outside.

An assembly of the cable mounting parts 340 and 345 and the connecting members 341 provided in this way is installed in the door upper surface part 310 in the form of being inserted into the space portion formed between the door upper surface part 310 and the door frame 320.

The inside of the door upper surface part 310 in which the cable mounting parts 340 and 345 are installed as described above is connected to the inside of the door front surface part 350. Also, cables C1 and C2 which connect the first control board 500 and the first heating part 400 through the inside of the door upper surface part 310 and the inside of the door front surface part 350, which are connected to each other, are installed at the cable mounting parts 340 and 345 installed in the door upper surface part 310.

The power cable C2 which supplies power to the first heating part 400 and the first control board 500 may be installed at any one of the cable mounting parts 340 and 345 disposed at both outer sides of the see-through window W. Also, the signal cable C1 which transmits a control signal generated in the first control board 500 to the first heating part 400 may be installed at the other one of the cable mounting parts 340 and 345 disposed at both outer sides of the see-through window W.

That is, in the door 300, the first heating part 400 is disposed at both sides of the see-through window W in the front-rear direction, and the power cable C2 and the signal cable C1 are disposed at both sides of the see-through window W in the left-right direction.

The arrangement structure of the first heating part 400, the power cable C2, and the signal cable C1 is a result of designing in consideration of the arrangement structure of the first heating part 400 and the hinge assemblies 800.

According to the present embodiment, each first heating part 400 is disposed in the form in which a heating element thereof extends longitudinally in the left-right direction. Also, the hinge assemblies 800 (see FIG. 2) are disposed at both sides of the see-through window W in the left-right direction.

Figure 34:
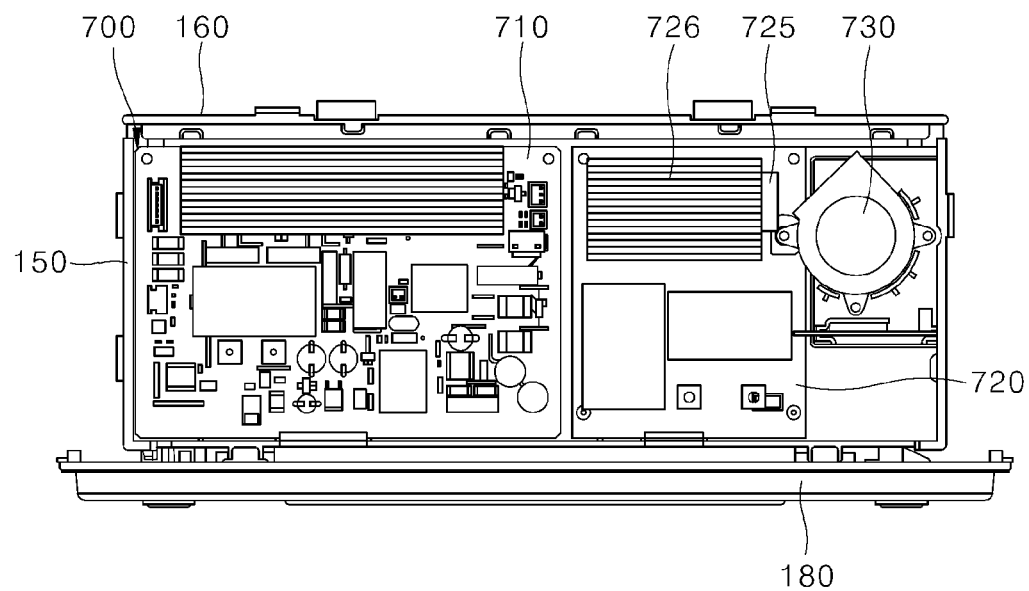
FIG. 34 is a rear view illustrating a second control board illustrated in FIG. 26.

The power cable C2 and the signal cable C1 are not only connected to the elements disposed in the door 300 such as the first heating part 400 and the first control board 500, but also connected to the elements disposed in the housing 100 such as the second control board 700 (see FIG. 34).

In order to pass through a portion between the door 300 and the housing 100 with the least possible exposure to the outside, the power cable C2 and the signal cable C1 may pass through the portion in which each of the hinge assemblies 800 is disposed, which is the only connecting portion between the door 300 and the housing 100.

For example, sections of the power cable C2 and the signal cable C1 connecting the housing 100 and the door 300 to each other may be disposed in the form of passing through the inside of each of the hinge assemblies 800. In this way, exposure of the power cable C2 and the signal cable C1 to the outside of the cooking appliance may be suppressed in a section between the housing 100 and the door 300, and the power cable C2 and the signal cable C1 may be protected from the risk of damage.

Further, considering that the heating element of the first heating part 400 extends longitudinally in the left-right direction, the power cable C2 and the signal cable C1 may be disposed at the farthest possible side from the heating element and disposed to extend in a direction different from a direction in which the heating element extends.

This is a result of designing to avoid an influence of heat generated in the first heating part 400 on the power cable C2 and the signal cable C1. Also, considering that a plurality of first heating parts 400 are disposed to be spaced apart from each other in the front-rear direction, a structure in which the power cable C2 and the signal cable C1 are disposed at both sides of the first heating parts 400 in the left and right direction may be advantageous for connecting the first heating parts 400 using the power cable C2 and the signal cable C1.

Also, in the present embodiment, the power cable C2 and the signal cable C1 may be disposed to be spaced apart from each other in the left-right direction with the see-through window W disposed therebetween and may be installed at the cable mounting parts 340 and 345 different from each other.

In this case, the power cable C2 passes through the inside of any one of the hinge assemblies 800 disposed at both side surfaces of the housing 100 and is installed at the cable mounting parts 340 and 345 adjacent thereto. Also, the signal cable C1 passes through the inside of the other one of the hinge assemblies 800 disposed at both side surfaces of the housing 100 and is installed at the cable mounting parts 340 and 345 adjacent thereto.

For example, the power cable may pass through the inside of each of the hinge assemblies 800 disposed at the left side of the housing 100 and be installed at the cable mounting parts 340 and 345 disposed at the left side of the door 300. Also, the signal cable C1 may pass through the inside of each of the hinge assemblies 800 disposed at the right side of the housing 100 and be installed at the cable mounting parts 340 and 345 disposed at the right side of the door 300.

Through the structure in which the cables having different functions are disposed at different positions, a wiring task for electrically connecting the components constituting the cooking appliance may be more easily and promptly performed, and maintenance and repair tasks related thereto may also be easily performed.

[Cooling Structure Inside Door]

FIG. 10 is a cross-sectional view schematically illustrating a flow of air inside the door according to an embodiment of the present disclosure.

Referring to FIG. 10, a space portion is formed inside each of the door upper surface part 310 and the door front surface part 350. Particularly, a space portion is formed between the pair of glasses 330 and 335, which are disposed to be spaced a predetermined distance apart from each other in the up-down direction, inside the see-through window W installed in the door upper surface part 310. Also, the space portion inside the door upper surface part 310 including the see-through window W and the space portion inside the door front surface part 350 are connected to each other.

An air intake port 301 is formed at a lower end of the door front surface part 350. The air intake port 301 is formed to pass through the lower end of the door front surface part 350 and forms a passage which opens the space portion inside the door front surface part 350 to the outside on the door front surface part 350.

An air exhaust port 303 is formed at a rear end of the door upper surface part 310. The air exhaust port 303 is formed to pass through the rear end of the door upper surface part 310 and forms a passage which opens the space portion inside the door upper surface part 310 to the outside on the door upper surface part 310.

Further, the cooking appliance of the present embodiment may further include a first cooling fan 370 disposed inside the door 300. The first cooling fan 370 may be installed inside the door upper surface part 310 or inside the door front surface part 350. In the present embodiment, the first cooling fan 370 is illustrated as being installed in the space portion inside the door front surface part 350. This is a design considering that, since the see-through window W, the first heating part 400, and the like are installed in the door upper surface part 310, an available space in the door upper surface part 310 is insufficient.

The first cooling fan 370 provided as above generates a flow of air which causes outside air to be introduced into the door 300 via the air intake port 301 and causes air inside the door to be discharged via the air exhaust port 303.

By the flow of air generated by the first cooling fan 370 as above, the outside air is introduced into the door front surface part 350 via the air intake port 301, and the outside air introduced into the door front surface part 350 cools the first control board 500. Also, the air which has cooled the first control board 500 is introduced into the door upper surface part 310, passes through the space portion inside the see-through window W, and then is discharged to the outside of the door 300 via the air exhaust port 303.

During operation of the cooling appliance, the temperature of the first control board 500 is at a level significantly lower than the temperature of the see-through window W heated by the first heating part 400. Therefore, the air which has cooled the first control board 500 after being introduced into the door 300 via the air intake port 301 may pass through the inside of the see-through window W while the temperature of the air is sufficiently low for cooling the see-through window W. Therefore, the cooling of the first control board 500 and the cooling of the see-through window W may be sufficiently efficiently performed by the flow of air generated by the first cooling fan 370.

By the cooling structure inside the door 300 formed as above, the occurrence of overheating and deterioration of the components inside the door 300 such as the first control board 500 is suppressed. In this way, the occurrence of breakdown of the cooking appliance, deterioration of performance of the cooking appliance, etc. may be effectively suppressed.

Also, since the cooling air passing through the inside of the door 300 blocks heat transfer between the pair of glasses 330 and 335 constituting the see-through window W and suppresses the occurrence of overheating of the see-through window W, the occurrence of accidents in which a user suffers an injury such as a burn due to coming into contact with the see-through window W may be effectively reduced.

[Tray Withdrawal Structure]

Figure 11:
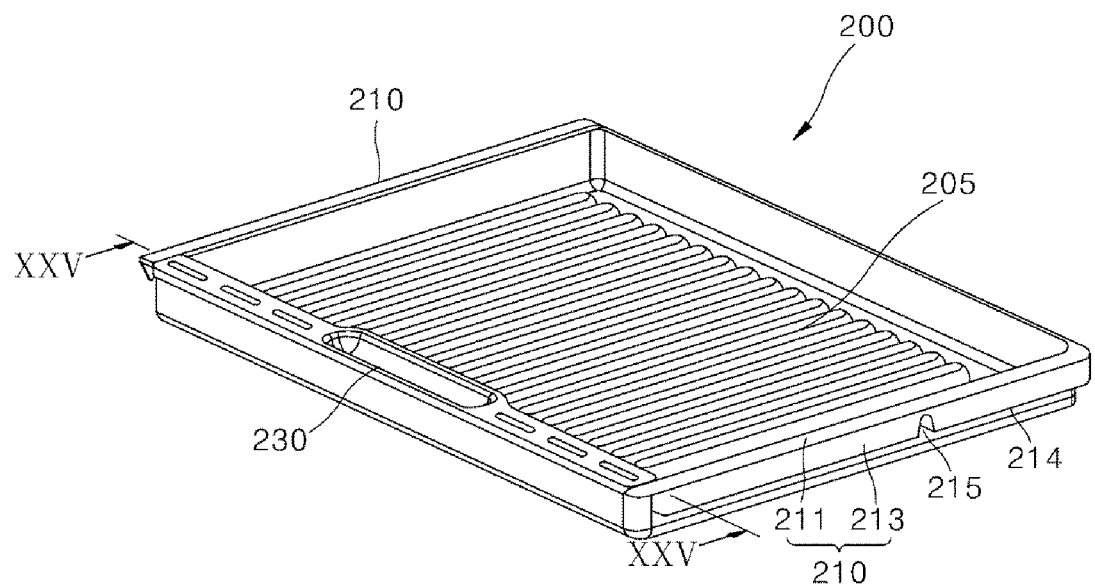
FIG. 11 is a perspective view illustrating a tray according to an embodiment of the present disclosure.
Figure 12:
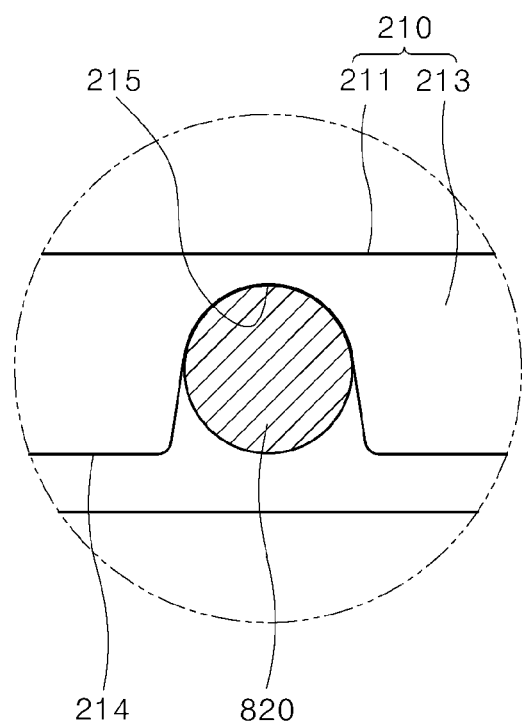
FIG. 12 is a cross-sectional view schematically illustrating a coupling structure between the tray illustrated in FIG. 11 and a mounting protrusion.

FIG. 11 is a perspective view illustrating a tray according to an embodiment of the present disclosure, and FIG. 12 is a cross-sectional view schematically illustrating a coupling structure between the tray illustrated in FIG. 11 and a mounting protrusion.

Referring to FIGS. 2 and 3 and FIGS. 11 and 12, the tray 200 is disposed in the cooking compartment 105 formed inside the housing 100. The tray 200 may be installed to be movable in the front-rear direction by interlocking with an operation of opening or closing the door 300, and the movement of the tray 200 in the front-rear direction may be guided by the hinge assembly 800.

The tray 200 may include a tray main body 205 and a mounting part 210.

The tray main body 205 has a bottom surface formed in a shape corresponding to the bottom surface 110 of the housing 100. In the present embodiment, the tray main body 205 is illustrated as being formed in the shape of a box which has an open upper portion and is flat in the up-down direction. The bottom surface of the tray main body 205 is formed in a shape corresponding to the bottom surface 110 of the housing 100, e.g., the shape of a quadrilateral plate, and four side surfaces of the tray 200 are formed in the form of extending in upward from edges of the bottom surface of the tray 200.

The mounting part 210 is provided at each of a pair of side surfaces facing both side surfaces of the housing 100 in the left-right direction among the four side surfaces of the tray 200. The mounting part 210 may include a first protrusion 211 protruding toward the outside of the tray 200 from an upper end portion of the side surface of the tray 200 and a second protrusion 213 extending downward from an outer end portion of the first protrusion 211. For example, the mounting part 210 may be formed in the form in which the first protrusion 211 and the second protrusion 213 are connected to each other in an L-shape.

The hinge assemblies 800 interlock with rotation of the door 300 and cause the tray 200 to be withdrawn forward from the inside of the cooking compartment 105 when the door is opened. Also, the hinge assemblies 800 may interlock with the rotation of the door 300 and cause the tray 200 to be inserted rearward toward the inside of the cooking compartment 105 when the door is closed. The hinge assemblies 800 may be installed at both sides of the housing 100 in the left-right direction so that the hinge assemblies 800 are disposed at both outer sides of the tray 200 in the left-right direction. Also, each of the hinge assemblies 800 may include a hinge part 810 and a mounting protrusion 820.

The hinge part 810 is provided to be hinge-coupled to the rear side of the door upper surface part 310. A state of the hinge part 810 may be changed by the hinge part 810 interlocking with rotation of the door 300.

The mounting protrusion 820 is connected to one of the connecting members of the hinge part 810 inside the hinge case 830 and protrudes toward the inside of the cooking compartment 105 via the first slot 835 formed in the hinge case 830 and a second slot 125 formed in the housing 100. Here, the second slot 125 may be formed in a side surface of the housing 100 and formed with a shape overlapping the first slot 835 and at a position overlapping the first slot 835.

The tray 200 may be mounted on the mounting protrusion 820. Specifically, the tray 200 may be mounted on the mounting protrusion 820 by the mounting protrusion 820 being fitted to the mounting groove 215 formed in the side portion of the tray 200.

According to the present embodiment, the mounting groove 215 is formed in the mounting part 210 provided at each of both side surfaces of the tray 200. The mounting groove 215 may be formed in the form in which the mounting part 210, more specifically, the second protrusion 213, is cut out from the lower end thereof. The mounting protrusion 820 may be fitted into the mounting groove 215 through the cut-out lower portion of the mounting groove 215, and the tray 200 and the mounting protrusion 820 may be fitted and coupled to each other by the mounting groove 215 and the mounting protrusion 820 being fitted and coupled to each other.

Further, a sliding surface 214 may be formed at the mounting part 210, more specifically, at the lower end of the second protrusion 213. The sliding surface 214 is provided to allow sliding of the mounting protrusion 820 coming into contact with the lower end of the second protrusion 213. The sliding surface 214 may extend in the front-rear direction and be connected to the mounting groove 215.

The user may perform cooking using the cooking appliance while the tray 200 is installed inside the cooking compartment 105 or take the tray 200 out of the cooking compartment 105 in order to take out the cooked food or wash the tray 200.

When taking the tray 200 out of the cooking compartment 105, the tray 200 may be taken out after slightly lifting the tray 200 upward so that the mounting protrusion 820 may fall out of the mounting groove 215.

Also, when attempting to install the withdrawn tray 200 back into the cooking compartment 105, the tray 200 may be pushed to the inside of the cooking compartment 105 so that the mounting protrusion 820 is fitted to the mounting groove 215.

However, since the mounting groove 215 is disposed at the lower portion of the tray 200 and the mounting protrusion 820 is covered by the tray 200, it is difficult for the user to accurately grasp the positions of the mounting groove 215 and the mounting protrusion 820.

In consideration of such an aspect, in the present embodiment, the sliding surface 214 is formed at the lower end of the second protrusion 213 so as to extend in the front-rear direction, and the sliding surface 214 is connected to the mounting groove 215.

Accordingly, when pushing the tray 200 back into the cooking compartment 105, the user does not have to accurately fit the mounting protrusion 820 into the mounting groove 215 from the beginning. The user just has to push the tray 200 into the cooking compartment 105 so that the sliding surface 214 is placed on the mounting protrusion 820 and then move the tray 200 in the front-rear direction.

In this process, the mounting protrusion 820 may slide on the sliding surface 214 due to the tray 200 moving in the front-rear direction and then be fitted to the mounting groove 215.

That is, the mounting protrusion 820 does not have to be accurately fitted to the mounting groove 215 for installing the tray 200 back into the cooking compartment 105. Simply by placing the tray 200 on the mounting protrusion 820 and then moving the tray 200 in the front-rear direction, fitting and coupling the mounting protrusion 820 and the mounting groove 215 to each other and, in this way, fitting and coupling the mounting protrusion 820 and the tray 200 to each other may be easily and promptly performed.

The above-described structure for fitting and coupling the mounting groove 215 and the mounting protrusion 820 to each other is merely an example, and various other modifications may be possible.

Figure 13:
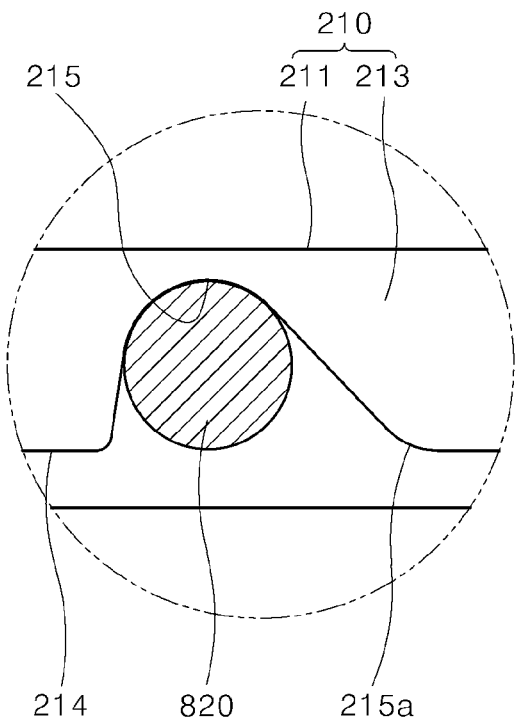
FIG. 13 is a cross-sectional view schematically illustrating another example of the coupling structure between the tray and the mounting protrusion illustrated in FIG. 12.
Figure 14:
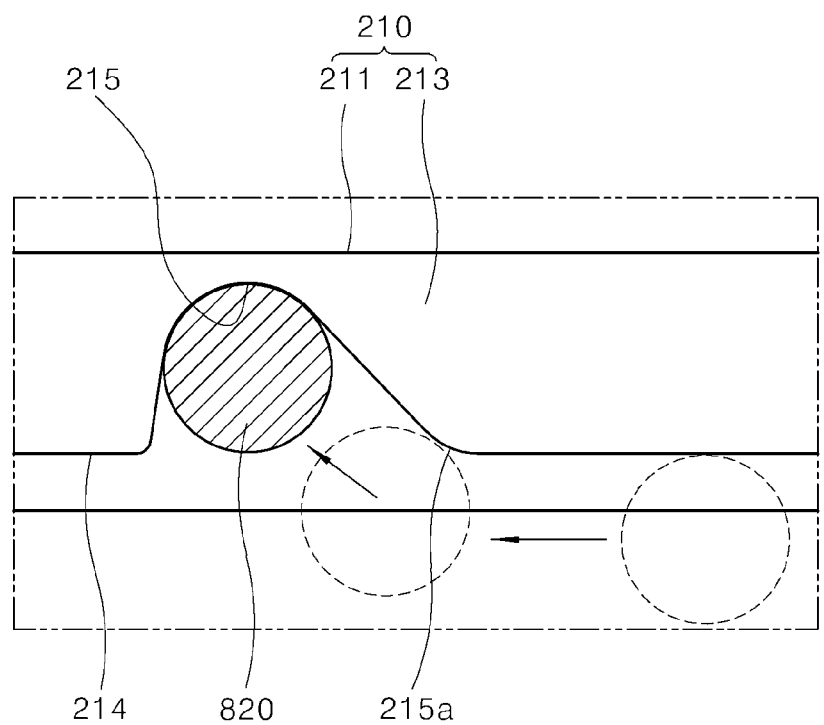
FIG. 14 is a view illustrating a coupling process between the tray and the mounting protrusion illustrated in FIG. 13.
Figure 15:
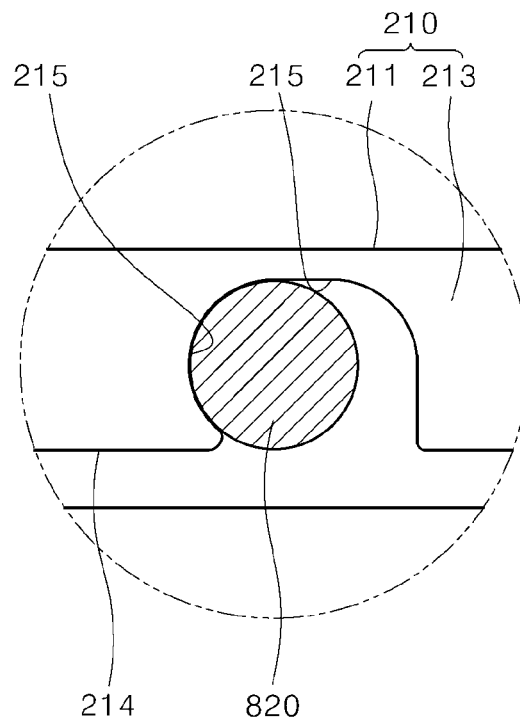
FIG. 15 is a cross-sectional view schematically illustrating still another example of the coupling structure between the tray and the mounting protrusion illustrated in FIG. 12.
Figure 16:
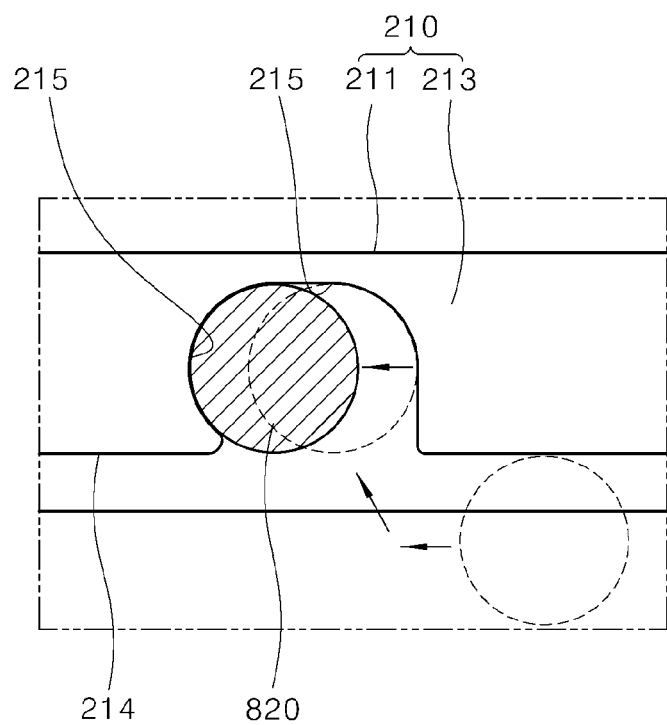
FIG. 16 is a view illustrating a coupling process between the tray and the mounting protrusion illustrated in FIG. 15.

FIG. 13 is a cross-sectional view schematically illustrating another example of the coupling structure between the tray and the mounting protrusion illustrated in FIG. 12, and FIG. 14 is a view illustrating a coupling process between the tray and the mounting protrusion illustrated in FIG. 13. Also, FIG. 15 is a cross-sectional view schematically illustrating still another example of the coupling structure between the tray and the mounting protrusion illustrated in FIG. 12, and FIG. 16 is a view illustrating a coupling process between the tray and the mounting protrusion illustrated in FIG. 15.

As one of the modifications of the structure for fitting and coupling the mounting groove 215 and the mounting protrusion 820 to each other, as illustrated in FIG. 13, an inclined surface 215a may be formed between the mounting groove 215 and the sliding surface 214. As illustrated in FIG. 14, the inclined surface 215a may be formed on a path along which the mounting protrusion 820, which slides while in contact with the sliding surface 214, is inserted into the mounting groove 215 and may guide movement of the mounting protrusion 820.

When the inclined surface 215a is formed between the mounting groove 215 and the sliding surface 214 as described above, impact and noise that may be generated in the process in which the mounting protrusion 820 is fitted to the mounting groove 215 may be reduced, and, in this way, fitting and coupling the tray 200 and the mounting protrusion 820 to each other may be more smoothly and stably performed.

The inclined surface 215a may be disposed at a rear side of the mounting groove 215. This is a result of designing in consideration of the fact that, when the user pushes the tray 200 into the cooking compartment 105 in order to install the tray 200 inside the cooking compartment 105, the tray 200 is often not pushed enough to the position where the mounting groove 215 and the mounting protrusion 820 are fitted and coupled to each other.

When the inclined surface 215a is formed at the rear side of the mounting groove 215 as described above, fitting and coupling between the mounting groove 215 and the mounting protrusion 820 may be smoothly and stably guided even when the tray 200 is mounted on the mounting protrusion 820 in a state in which the tray 200 is not pushed enough to position where the mounting groove 215 and the mounting protrusion 820 are fitted and coupled to each other.

As another one of the modifications of the structure for fitting and coupling the mounting groove 215 and the mounting protrusion 820 to each other, as illustrated in FIG. 15, a fitting groove 215b may be further provided in the second protrusion 213. The fitting groove 215b may be formed in the form in which a portion of the second protrusion 213 is cut out. The fitting groove 215b may be formed in the form of a groove which is concavely depressed in the front-rear direction. The fitting groove 215b may be formed to be connected to the mounting groove 215 in such a way that the fitting groove 215b is concavely depressed in the front-rear direction at an upper end of the mounting groove 215.

The fitting groove 215b may be disposed at a front side of the mounting groove 215. Accordingly, when, while the mounting protrusion 820 is fitted to the mounting groove 215, the user further pushes the tray 200 rearward toward the inside of the cooking compartment 105 as illustrated in FIG. 16, the mounting protrusion 820 which has been fitted to the mounting groove 215 may be fitted to the fitting groove 215b extending to the front of the mounting groove 215.

When the mounting protrusion 820 and the fitting groove 215b are fitted and coupled to each other as described above, since movement of the tray 200 in the up-down direction is restricted by the coupling between the mounting protrusion 820 and the fitting groove 215b, the risk of the tray 200 falling forward is significantly lowered.

Meanwhile, the mounting protrusion 820 may interlock with a change in the state of the hinge part 810 and move in the front-rear direction. The mounting protrusion 820 may move the tray 200 mounted on the mounting protrusion 820 in the front-rear direction. That is, the tray 200 mounted on the mounting protrusion 820 may be moved in the front-rear direction by interlocking with the movement of the mounting protrusion 820 in the front-rear direction.

Figure 17:
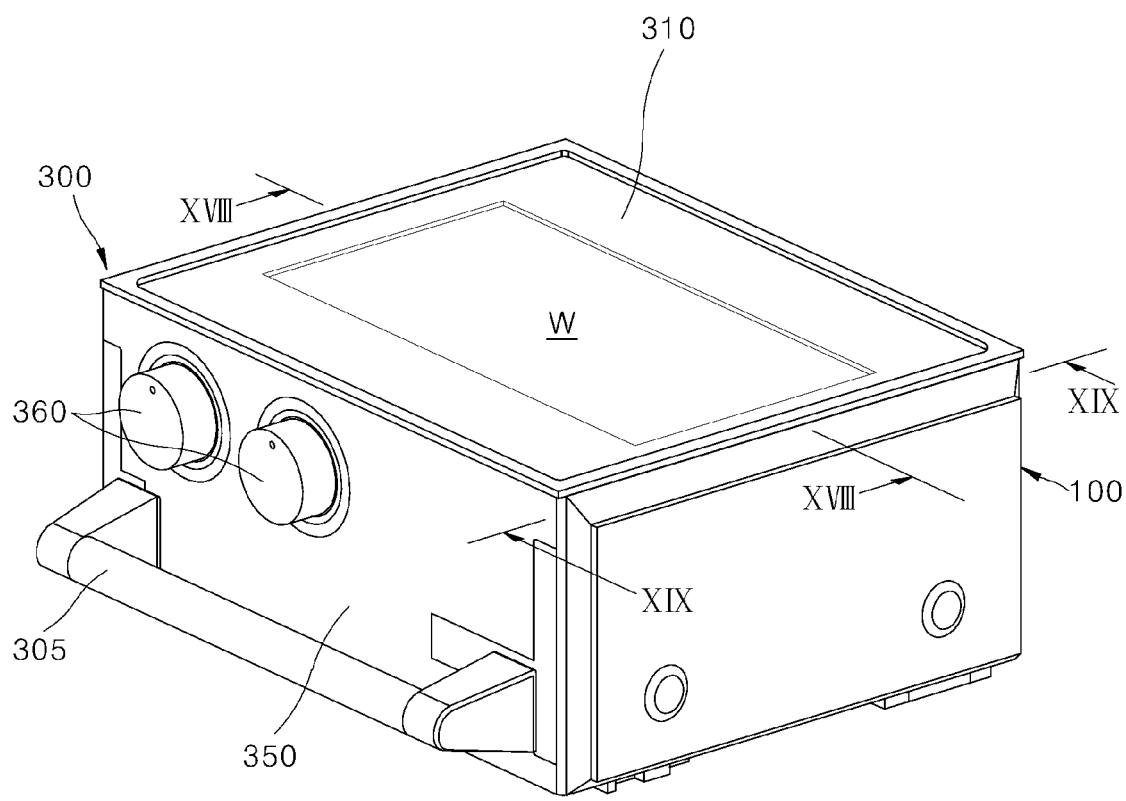
FIG. 17 is a perspective view illustrating a door-closed state of the cooking appliance according to an embodiment of the present disclosure.
Figure 18:
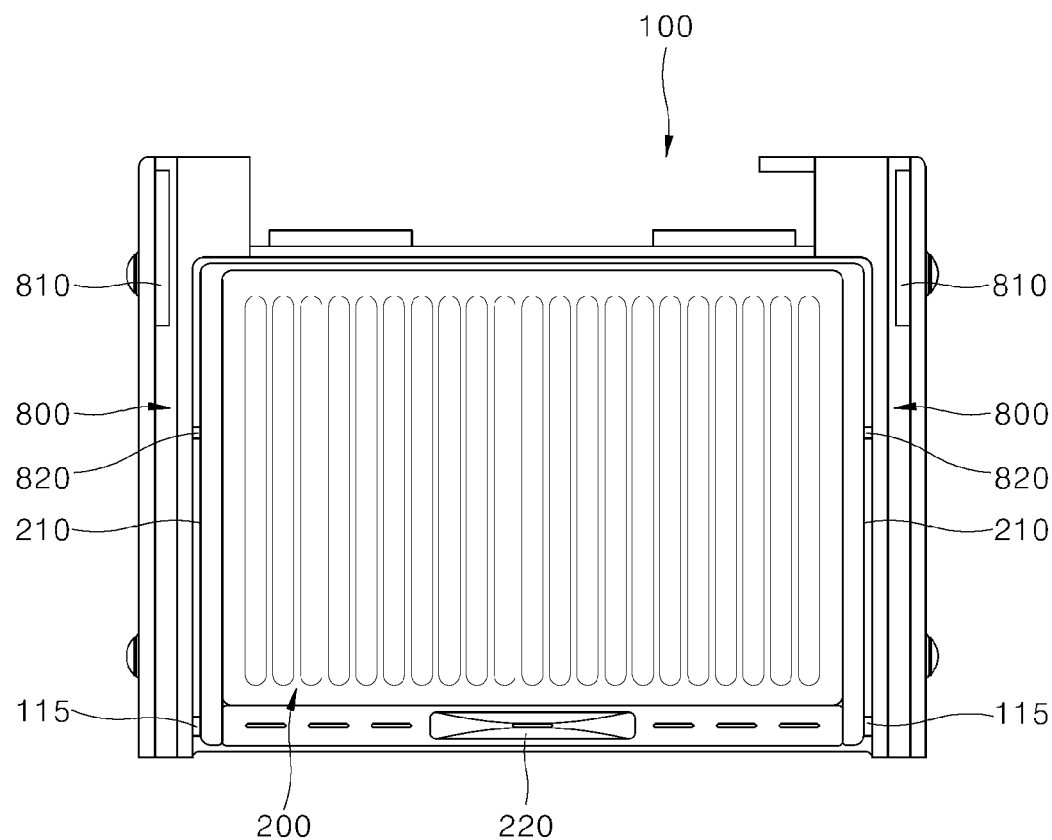
FIG. 18 is a cross-sectional view taken along line "XVIII-XVIII" of FIG. 17.
Figure 19:
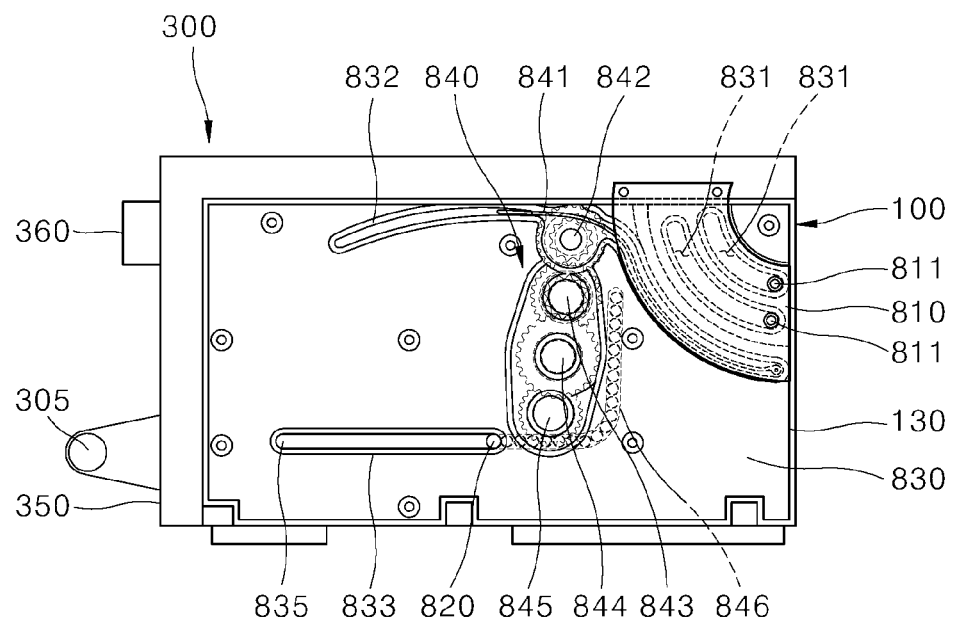
FIG. 19 is a cross-sectional view taken along line "XIX-XIX" of FIG. 17.
Figure 21:
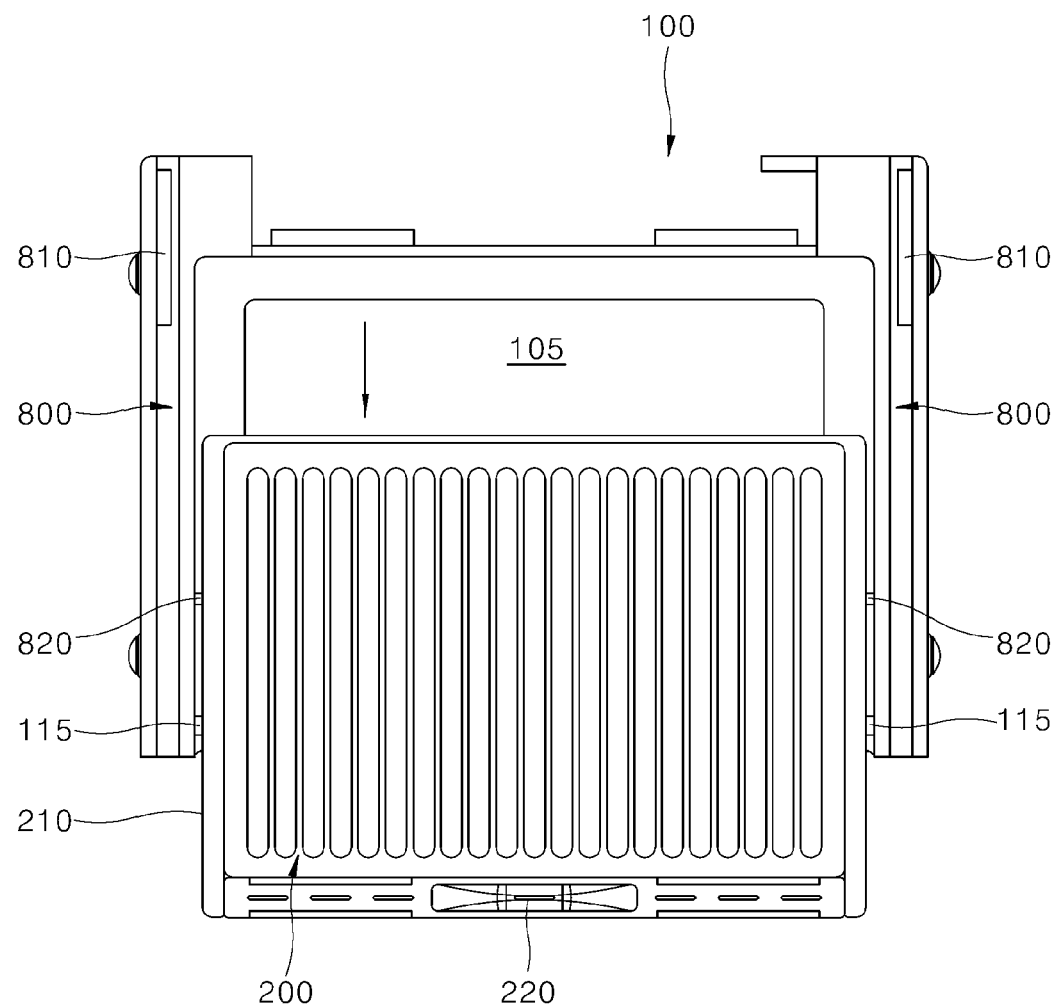
FIG. 21 is a cross-sectional view taken along line "XXI-XXI" of FIG. 20.
Figure 22:
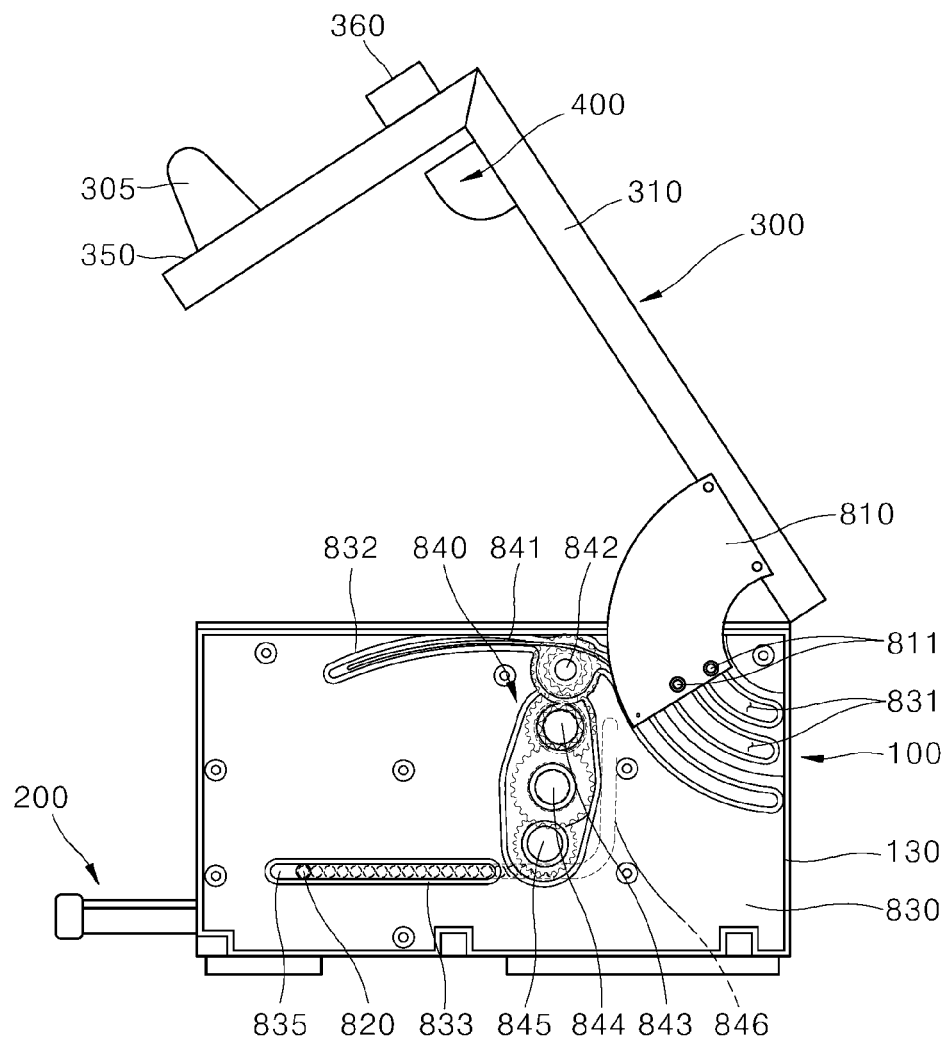
FIG. 22 is a cross-sectional view taken along line "XXII-XXII" of FIG. 20.

FIG. 17 is a perspective view illustrating a door-closed state of the cooking appliance according to an embodiment of the present disclosure, FIG. 18 is a cross-sectional view taken along line "XIII-XIII" of FIG. 17, and FIG. 19 is a cross-sectional view taken along line "XIX-XIX" of FIG. 17. Also, FIG. 20 is a perspective view illustrating a door-opened state of the cooking appliance illustrated in FIG. 17, FIG. 21 is a cross-sectional view taken along line "XXI-XXI" of FIG. 20, and FIG. 22 is a cross-sectional view taken along line "XXII-XXII" of FIG. 20.

Figure 20:
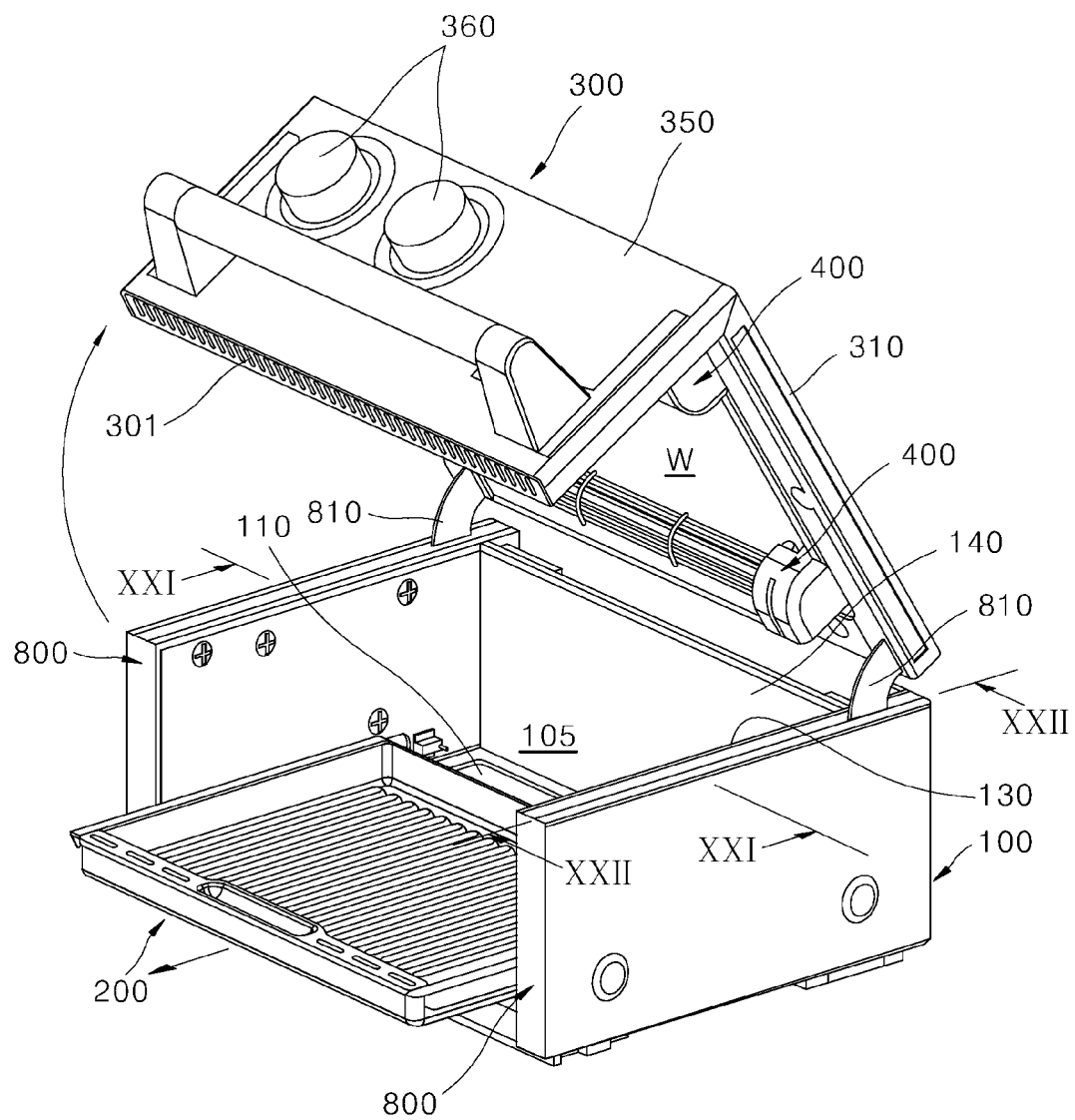
FIG. 20 is a perspective view illustrating a door-opened state of the cooking appliance illustrated in FIG. 17.

According to the present embodiment, in a state in which the cooking compartment 105 is closed by the door 300 as illustrated in FIGS. 17 and 18, the tray 200 is inserted into the cooking compartment 105 (see FIG. 20). Also, the mounting protrusion 820 on which the tray 200 is mounted is disposed at a position biased toward the rear side of the cooking compartment 105.

The rear side of the tray 200 may be supported by a pair of mounting protrusions 820. Also, the front side of the tray 200 may be supported by a pair of support rollers 115.

That is, the tray 200 may be stably supported by the pair of mounting protrusions 820 disposed at the rear side and the pair of support rollers 115 disposed at the front side and may be installed in the cooking compartment 105 so as to be movable in the front-rear direction.

The support rollers 115 may be disposed at the both side surfaces 120 and 130 of the housing 100 in such a way that the support rollers 115 are disposed at the front side of the housing 100 adjacent to the door 300. The mounting part 210, more specifically, the sliding surface 214 (see FIG. 11), of the tray 200 may be seated on the support roller 115. The support roller 115 may rotate along with the movement of the tray 200 and support the tray 200 so that the tray 200 may move smoothly.

Also, the door 300 may be rotatably installed at the housing 100 via the hinge assemblies 800 and rotate in the up-down direction to open or close the cooking compartment 105.

The hinge assemblies 800 are disposed at both side portions of the housing 100, and a rear side of the door upper surface part 310 is rotatably coupled to the hinge assemblies 800.

That is, a left side corner portion and a right side corner portion at the rear side of the door upper surface part 310 are rotatably coupled to the hinge assemblies 800 disposed at both the side portions of the housing 100. The door 300 opens or closes the upper surface and the front surface of the housing 100 by rotating in an up-down direction about the rear side of the door upper surface part 310 rotatably coupled to the hinge assemblies 800.

Referring to FIGS. 17 to 19, each of the hinge assemblies 800 may include a hinge case 830, the hinge part 810, the mounting protrusion 820, and a converting and outputting part 840.

The hinge case 830 forms an exterior of the hinge assembly 800 and houses portions of the hinge part 10 and the mounting protrusion 820 and the converting and outputting part 840 therein. Various structures for supporting the hinge part 810, the mounting protrusion 820, and the converting and outputting part 840 may be formed in the hinge case 830.

The hinge part 810 is installed in the hinge case 830 such that the position of the hinge part 810 is changeable. The hinge part 810 may be installed in the hinge case 830 such that the hinge part 810 may rotate along a trajectory corresponding to a rotation trajectory of the door 300. An upper end of the hinge part 810 may be coupled to the door 300. The posture of the hinge part 810 coupled to the door 300 in this way may be changed by the hinge part 810 interlocking with rotation of the door 300. Also, the trajectory and range of rotation of the door 300 coupled to the hinge part 810 may be guided by the hinge part 810.

For example, the hinge part 810 may be provided in the form of a flat plate. The hinge part 810 maybe formed to be bent along the shape corresponding to the rotation trajectory of the door 300.

Also, a guide hole 831 formed in the shape corresponding to the rotation trajectory of the door 300 may be provided in the hinge case 830. The guide hole 831 may be formed in the hinge case 830 to pass through the hinge case 830 in the left-right direction. The guide hole 831 formed in this way may provide a passage for guiding a rotation path of the hinge part 810 in the hinge case 830.

For example, the guide hole 831 may be provided to form a passage which gradually ascends toward the front and gradually descends toward the rear.

A stopper 811 may be provided in the hinge part 810. The stopper 811 may be provided to protrude from the hinge part 810 so as to protrude in the left-right direction. The stopper 811 may be inserted into the guide hole 831 and move along the passage formed by the guide hole 831. That is, the stopper 811 may guide rotation of the hinge part 810 by moving along the guide hole 831.

Also, at front and upper end portions of the guide hole 831, the stopper 811 may interfere with the hinge case 830 and restrict further forward and upward movements of the hinge part 810, and, at rear and lower end portions of the guide hole 831, the stopper 811 may interfere with the hinge case 830 and restrict further rearward and downward movements of the hinge part 810. That is, the stopper 811 may limit the range of movement of the hinge part 810 to a range corresponding to the range in which the guide hole 831 is formed.

The mounting protrusion 820 is connected to any one of elements constituting the converting and outputting part 840 inside the hinge case 830 and protrudes toward the inside of the cooking compartment 105 via the first slot 835 formed in the hinge case 830 and the second slot 125 formed in the housing 100. Here, the second slot 125 may be formed in the side surface of the housing 100 and formed with a shape overlapping the first slot 835 and at a position overlapping the first slot 835.

The converting and outputting part 840 is provided inside the hinge case 830. The converting and outputting part 840 may convert a force input by a change in the posture of the hinge part 810 to a linear force for moving the mounting protrusion 820 in the front-rear direction. The converting and outputting part 840 may include a moving member and a converting member.

The moving member corresponds to an element which moves the mounting protrusion 820 in the front-rear direction. Also, the converting member corresponds to an element which moves the moving member in the front-rear direction by interlocking with a change in the posture of the hinge part 810, that is, movement of the hinge part 810.

For example, the converting and outputting part 840 may include a belt 841, a plurality of rotary gears 842, 843, 844, and 845, and a rack gear 846. Among the elements, the belt 841 and the plurality of rotary gears 842, 843, 844, and 845 are illustrated as corresponding to the converting members. Also, the rack gear 846 is illustrated as corresponding to the moving member.

The belt 841 is provided in the form of an open timing belt in which teeth are formed on at least one of an upper surface and a lower surface. A first guide rib 832 provided to protrude from an inner side surface of the hinge case 830 may restrict a vertical position of the belt 841 and guide a front-rear movement path of the belt 841.

A rear side end portion of the belt 841 may be connected to the hinge part 810. The belt 841 may be moved in the front-rear direction by interlocking with a change in the posture of the hinge part 810. For example, when the hinge part 810 moves forward and upward, the belt 841 may move forward by interlocking with the movement of the hinge part 810. Also, when the hinge part 810 moves rearward and downward, the belt 841 may move rearward by interlocking with the movement of the hinge part 810.

The teeth formed at the belt 841 may be engaged with the plurality of rotary gears 842, 843, 844, and 845.

The first rotary gear 842 is disposed most adjacent to the belt 841 among the plurality of rotary gears 842, 843, 844, and 845. In the present embodiment, the first rotary gear 842 is illustrated as including a timing gear. The first rotary gear 842 may be engaged with the belt 841 and be rotated by interlocking with the movement of the belt 841.

The second rotary gear 843 and the third rotary gear 844 are disposed between the first rotary gear 842 and the fourth rotary gear 845 to transmit rotation of the first rotary gear 842 to the fourth rotary gear 845.

That is, the movement of the belt 841 is performed by interlocking with a change in the posture of the hinge part 810, and the rotation of the plurality of rotary gears 842, 843, 844, and 845 is performed by interlocking with the movement of the belt 841. Therefore, it can be said that a change in the posture of the hinge part 810 causes rotation of the fourth rotary gear 845.

The fourth rotary gear 845 rotated as described above may be engaged with the rack gear 846 disposed below the fourth rotary gear 845. A second guide rib 833 provided to protrude from the inner side surface of the hinge case 830 may restrict a vertical position of the rack gear 846 and guide a front-rear movement path of the rack gear 846.

The rack gear 846 may be moved in the front-rear direction by interlocking with rotation of the fourth rotary gear 845. For example, when the hinge part 810 moves forward and upward and the fourth rotary gear 845 is rotated in a first direction according to the movement of the hinge part 810, the rack gear 846 may interlock therewith and move forward (see FIG. 22). Also, when the hinge part 810 moves rearward and downward and the fourth rotary gear 845 is rotated in a second direction, which is the reverse of the first direction, according to the movement of the hinge part 810, the rack gear 846 may interlock therewith and move rearward (see FIG. 21).

The mounting protrusion 820 is coupled to the rack gear 846. Accordingly, the mounting protrusion 820 may interlock with movement of the rack gear 846 and move in the front-rear direction. For example, when the rack gear 846 moves forward, the mounting protrusion 820 may also move forward according to the movement of the rack gear 846, and, when the rack gear 846 moves rearward, the mounting protrusion 820 may also move rearward according to the movement of the rack gear 846.

In summary, the hinge assembly 800 having the above-described configuration is provided so that states of the elements constituting the hinge assembly 800, that is, the hinge part 810 and the converting and outputting part 840, may be changed by interlocking with rotation of the door 300 and the elements whose states are changed in this way may move the mounting protrusion 820 in the front-rear direction.

As illustrated in FIGS. 20 to 22, when the door 300 rotates upward to open the cooking compartment 105, a rotary force due to the rotation of the door 300 changes the state of the hinge part 810 of the hinge assembly 800, and the mounting protrusion 820 moves forward as a result. Also, the tray 200 may move forward due to the mounting protrusion 820 moving forward and be withdrawn to the outside of the cooking compartment 105.

That is, when the door 300 is opened, the tray 200 is automatically withdrawn. Accordingly, the user may easily and safely put food to be cooked on the tray 200 or take out the cooked food placed on the tray 200 from the tray 200 and may easily take out the tray 200, which is withdrawn forward, from the inside of the cooking compartment 105 and move the tray 200.

Furthermore, in the cooking appliance of the present embodiment, the door 300 is provided to be able to open both the front surface and the upper surface of the cooking compartment 105. Accordingly, the user may insert or withdraw food or the tray 200 into or from the cooking compartment 105 through a much larger passage as compared with when the door 300 only opens the front surface or the upper surface of the cooking compartment 105.

That is, the cooking appliance of the present embodiment may not only provide a much larger passage for allowing the user to easily and conveniently insert or withdraw food or the tray 200 into or from the cooking compartment 105 but also provide a function of allowing the food or the tray 200 to be more easily and conveniently withdrawn by the automatic withdrawal of the tray 200 when the door 300 is opened.

The cooking appliance of the present embodiment may also provide a function of allowing the tray 200 to be automatically inserted into the cooking compartment 105 when the door 300 is closed as long as the tray 200 is mounted on the mounting protrusion 820. The function may contribute to improving convenience and safety of the cooking appliance by eliminating the need for a user to put his or her hand inside the cooking compartment 105 filled with hot air when the user wants to put the tray 200 back into the cooking compartment 105 after taking out the tray 200 from the cooking compartment 105 while cooking is performed.

Further, according to the cooking appliance of the present embodiment, since the door 300 is opened by rotating upward without being unfolded forward, there is little concern about the center of mass of the cooking appliance being biased toward the front even when the door 300 is opened. Rather, when the door 300 is opened, the center of mass of the door 300 moves further to the rear than when the door 300 is closed.

In the structure in which the center of mass of the cooking appliance moves to the rear when the door 300 is opened, the risk of the cooking appliance falling forward when the door 300 is opened is significantly lowered. Also, in the structure, the weight of the tray 200 may be freely increased because the risk of the cooking appliance falling forward is low even when the weight of the tray is increased. That is, in the above structure, it is possible to use the tray 200 which is thicker and heavier than that used in the structure in which the door is unfolded forward.

The thicker and heavier the tray 200, the better the high-temperature cooking performance and the easier it is to maintain warmth for a long time. Therefore, better cooking performance may be expected to an extent that the tray 200 is thicker and heavier.

Also, the tray 200 usable in an environment heated by the induction heating part generally weighs more than an ordinary tray. Therefore, when it becomes possible to use the tray 200 which is much thicker and heavier than the ordinary tray, even when the second heating part 600 is provided in the form of an induction heating part, it is possible to provide the tray 200 suitable for the second heating part 600.

[Structure for Suppressing Occurrence of Cooking Appliance Falling Forward]

As described above, in the cooking appliance of the present embodiment, the tray 200 may be withdrawn forward when the door 300 is opened. Also, the tray 200 may be provided in the form extremely thicker and heavier than ordinary trays in order to improve high-temperature cooking performance and warmth maintaining performance.

In a state in which the tray 200 is withdrawn forward, the center of mass of the cooking appliance is biased toward the front as much as the extent to which the tray 200 is withdrawn, and thus a risk of the cooking appliance falling forward is inevitably increased.

In consideration of such an aspect, the cooking appliance of the present embodiment includes various forms of configurations for preventing the cooking appliance from falling forward when the door 300 is opened.

Hereinafter, configurations for preventing the cooking appliance from falling forward when the door 300 is opened will be described in detail.

Figure 23:
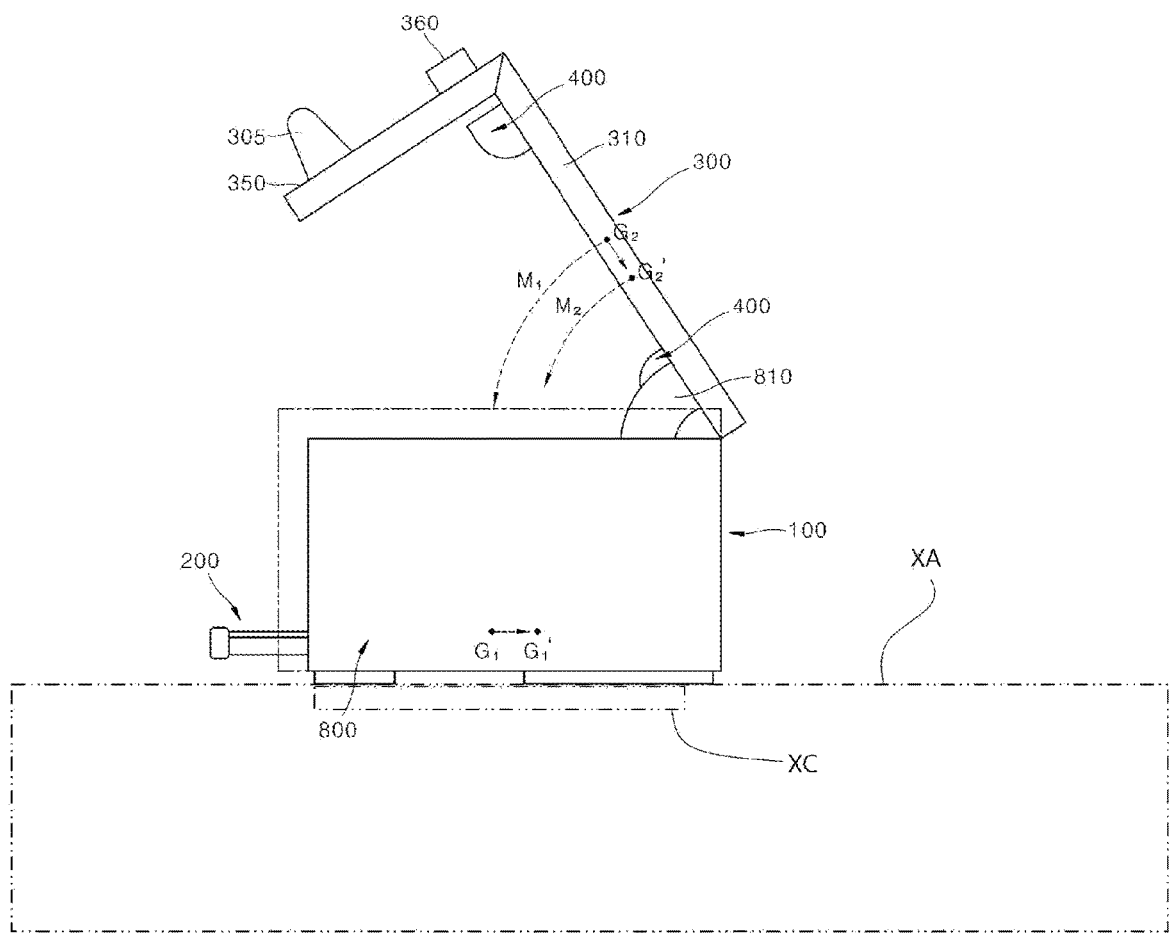
FIG. 23 is a view illustrating a center-of-mass change state in the door-opened state of the cooking appliance.

FIG. 23 is a view illustrating a center-of-mass change state in the door-opened state of the cooking appliance.

Referring to FIGS. 20 to 23, the hinge part 810 is disposed at the both side surfaces 120 and 130 of the housing 100 in such a way that the hinge part 810 is disposed at sides adjacent to the back surface 140 of the housing 100. That is, the hinge part 810 is disposed at the rear of both sides of the housing 100.

The hinge part 810 is coupled to the door 300 in such a way that the hinge part 810 is coupled to the rear side of the door upper surface part 310. That is, the hinge part 810 is coupled to the rear of each of both sides of the door upper surface part 310, and the door 300 may open or close the cooking compartment 105 by rotating in the up-down direction about the rear side of the door upper surface part 310 coupled to the hinge part 810 as described above.

The door 300 may rotate about the rear side of the door upper surface part 310 such that, in a state in which the front surface and the upper surface of the housing 100 are opened (hereinafter referred to as "opened state"), the door 300 is located more behind than in a state in which the front surface and the upper surface of the housing 100 are closed (hereinafter referred to as "closed state").

By the door 300 rotating about the rear side of the door upper surface part 310 as described above, the position of the door 300 may be further biased toward the rear in the opened state than in the closed state.

The door 300 whose position is relatively further biased toward the rear in the opened state as described above may cause the center of mass of the cooking device to be biased toward the rear from the center of the cooking appliance in the front-rear direction when the door 300 is in the opened state.

That is, the first configuration provided for preventing the cooking appliance from falling forward when the door 300 is opened is allowing the door 300 to rotate about the rear side of the door upper surface part 310. Accordingly, the position of the door 300 may be further biased toward the rear in the opened state than in the closed state, and, in this way, the center of mass of the cooking appliance may be formed to be biased toward the rear from the center of the cooking appliance in the front-rear direction when the door 300 is in the opened state.

Meanwhile, when looking at the configuration of the door 300 itself, the door 300 is provided in the form in which the up-down length of the door front surface part 350 is shorter than the front-rear length of the door upper surface part 310. That is, when the door 300 is in the closed state, the up-down length of the door front surface part 350 is shorter than the front-rear length of the door upper surface part 310.

Accordingly, in the door 300, the proportion occupied by the volume of the door upper surface part 310 is larger than the proportion occupied by the volume of the door front surface part 350. Accordingly, in the total weight of the door 300, the proportion occupied by the weight of the door upper surface part 310 is larger than the proportion occupied by the weight of the door front surface part 350.

When the door 300 is rotated rearward to be opened, the center of mass of the door 300 gradually moves rearward. In the door 300, the door front surface part 350 is disposed at the front side, and the door upper surface part 310 is disposed behind the door front surface part 350.

Accordingly, the larger the proportion occupied by the weight of the door upper surface part 310 in the total weight of the door 300, the greater the extent to which the center of mass of the door 300 moves rearward when the door 300 rotates rearward.

In other words, the greater the proportion occupied by the weight of the door upper surface part 310 in the total weight of the door 300, the easier it is for the center of mass of the door 300 to promptly move rearward when the door 300 rotates rearward. Also, as the center of mass of the door 300 moves rearward in this way, the center of mass of the overall cooking appliance may also move rearward more promptly.

That is, the second configuration provided for preventing the cooking appliance from falling forward when the door 300 is opened is providing the door 300 in the form in which the up-down length of the door front surface part 350 is shorter than the front-rear length of the door upper surface part 310. Accordingly, when the door 300 rotates rearward, the center of mass of the door 300 and the center of mass of the cooking appliance may move further rearward more promptly.

Meanwhile, the first heating part 400 and the see-through window W are provided in the door 300, and the first heating part 400 and the see-through window W are disposed in the door upper surface part 310.

As described above, the see-through window W may include the pair of glasses 330 and 335 (see FIG. 10). Generally, glasses are formed of a heavyweight material. Therefore, when the see-through window W formed of glass is disposed in the door upper surface part 310, the weight of the door upper surface part 310 is inevitably increased as much as the weight of the see-through window W.

Furthermore, the see-through window W of the present embodiment may include the pair of glasses 330 and 335, i.e., two layers of glasses. Therefore, the weight of the door upper surface part 310 is inevitably increased as much as the weight of the see-through window W.

Since the see-through window W is disposed in the door upper surface part 310 as described above, the proportion occupied by the weight of the door upper surface part 310 in the total weight of the door 300 is increased as much as the weight of the glasses forming the see-through window W.

Accordingly, when the door 300 rotates rearward, the center of mass of the door 300 and the center of mass of the cooking appliance may more promptly move further rearward as much as the increase in the weight of the door upper surface part 310 due to the first heating part 400.

Further, the pair of first heating parts 400 are disposed at the bottom surface side of the door upper surface part 310. In this case, the first heating part 400 is disposed at each of the front outer side and the rear outer side of the see-through window W. One of the pair of first heating parts 400 is disposed at the rear side of the door upper surface part 310 adjacent to the hinge part 810.

Since the first heating part 400 is disposed in the door upper surface part 310 as described above, the proportion occupied by the weight of the door upper surface part 310 in the total weight of the door 300 is further increased as much as the weight of the first heating part 400.

Accordingly, when the door 300 rotates rearward, the center of mass of the door 300 and the center of mass of the cooking appliance may more promptly move further rearward as much as the increase in the weight of the door upper surface part 310 due to the first heating part 400.

Furthermore, due to the first heating part 400 disposed at the rear side of the door upper surface part 310 adjacent to the hinge part 810, the center of mass of the door 300 may move further rearward. In this way, when the door 300 rotates rearward, the center of mass of the door 300 and the center of mass of the cooking appliance may more promptly move further rearward.

That is, the third configuration provided for preventing the cooking appliance from falling forward when the door 300 is opened is placing the first heating part 400 and the see-through window W in the door upper surface part 310. Accordingly, when the door 300 rotates rearward, the center of mass of the door 300 may more promptly move further rearward.

In summary, the door 300 of the present embodiment is provided in the form in which the position of the door 300 moves rearward when the door 300 rotates rearward, the up-down length of the door front surface part 350 is shorter than the front-rear length of the door upper surface part 310, and the first heating part 400 and the see-through window W are disposed in the door upper surface part 310.

The door 300 is provided so that, when the cooking compartment 105 is opened and the tray 200 is withdrawn forward as a result, the door 300 itself is moved toward the rear of the cooking appliance, and the center of mass of the door 300 promptly moves rearward according to the rearward rotation of the door 300.

Since the door 300 provided as described above causes the center of mass of the cooking appliance to be biased toward the rear from the center in the front-rear direction when the cooking compartment 105 is opened and the tray 200 is withdrawn forward as a result, the door 300 may contribute to significantly lowering the risk of the occurrence of the cooking appliance falling forward.

Meanwhile, the door 300 rotates about the rear side of the door upper surface part 310 coupled to the hinge part 810. When the door 300 is in the opened state, most of the load of the door 300 acts toward the hinge part 810.

Since the hinge part 810 is disposed at the rear side of the cooking appliance, when the door 300 is in the opened state, most of the load of the door 300 is concentrated on the rear side of the cooking appliance.

Therefore, when the door 300 is in the opened state, the center of mass of the cooking appliance moves toward the rear side of the cooking appliance to the extent that most of the load of the door 300 is concentrated on the rear side of the cooking appliance.

In other words, when the door 300 is in the opened state, in addition to the influence of the change in the position of the door 300 itself and the change in the center of mass of the door 300 itself, an additional influence is caused by most of the load of the door 300 being concentrated on the rear side of the cooking appliance. In this way, the center of mass of the cooking appliance may be further biased toward the rear side.

That is, the fourth configuration provided for preventing the cooking appliance from falling forward when the door 300 is opened is a configuration in which a coupling point between the door 300 and the hinge part 810 is disposed at the rear side of the cooking appliance so that an additional influence is caused by most of the load of the door 300 being concentrated on the rear side of the cooking appliance.

Also, when the door 300 is in the opened state, moment is applied to the cooking appliance around a portion where the door 300 and the hinge part 810 are coupled to each other. The moment acts as a force rotating the cooking appliance forward. That is, as the moment is greater, since the force attempting to rotate the cooking appliance forward becomes larger, the risk of the cooking appliance falling forward is also increased.

Further, when the door 300 is in the opened state, the tray 200 is withdrawn forward, and moment acting from the tray 200 withdrawn in this way is applied to the cooking appliance. The moment also acts as the force rotating the cooking appliance forward.

Accordingly, the force equivalent to the sum of the moment acting from the door 300 and the moment acting from the tray 200 may act as a force further increasing the risk of the cooking appliance falling forward.

The size of the moment acting from the door 300 may be determined by a force acting on the door 300 and a distance between a position on which the force acts and a rotation shaft (portion where the door and the hinge part are coupled to each other). In this case, only gravity acts on the door 300 unless a separate force is applied thereto. Since gravity acts on the entire part of the door 300, it can be seen that gravity acts on the center of mass of the door 300. Therefore, it can be said that the moment increases ($M_1$) as the center of mass of the door 300 moves away from the portion where the door 300 and the hinge part 810 are coupled to each other and decreases ($M_2$) as the center of mass of the door 300 approaches the portion where the door 300 and the hinge part 810 are coupled to each other.

According to the present embodiment, as the door 300 rotates rearward to open the cooking compartment 105, the center of mass of the door 300 also moves rearward, and, as a result, the size of the moment acting from the door 300 may be decreased together.

That is, when the door 300 is in the opened state, the moment acting from the tray 200 may increase due to the tray 200 being withdrawn forward, but the moment acting from the door 300 may relatively decrease.

In this way, since the cooking appliance of the present embodiment allows the size of the moment acting on the cooking appliance due to the door 300 to be decreased, the risk of the occurrence of the cooking appliance falling forward due to the tray 200 withdrawn forward may be significantly lowered.

That is, the fifth configuration provided for preventing the cooking appliance from falling forward when the door 300 is opened is a configuration in which the center of mass of the door 300 is allowed to be more biased toward the rear so that the size of the moment acting on the cooking appliance due to the door 300 is decreased.

Meanwhile, the mounting protrusion 820 may protrude toward the inside of the cooking compartment 105 via the first slot 835 formed in the hinge case 830 and the second slot 125 formed in the housing 100.

The first slot 835 and the second slot 125 may provide a passage for allowing the mounting protrusion 820, which is connected to the converting and outputting part 840 inside the hinge case 830, to protrude toward the inside of the cooking compartment 105 and provide a passage required for the mounting protrusion 820 to move in the front-rear direction.

To this end, the first slot 835 and the second slot 125 may be formed to pass through the hinge case 830 and the side surface 120 of the housing 100, respectively, and each of the first slot 835 and the second slot 125 may be formed in the form of a slot having an up-down width corresponding to the thickness of the mounting protrusion 820 and a length extending in the front-rear direction.

Preferably, the front-rear lengths of the first slot 835 and the second slot 125 may be less than ½ of the front-rear length of the tray 200.

The lengths of the first slot 835 and the second slot 125 are related to a withdrawal range of the tray 200. That is, the tray 200 may be withdrawn as the mounting protrusion 820 moves forward. Since a forward movement range of the mounting protrusion 820 is limited by the first slot 835 and the second slot 125, the withdrawal range of the tray 200 may be determined by the first slot 835 and the second slot 125.

Therefore, when the front-rear lengths of the first slot 835 and the second slot 125 are less than ½ of the front-rear length of the tray 200, a distance along which the tray 200 is movable is limited to less than ½ of the front-rear length of the tray 200.

Accordingly, when it is assumed that the tray 200 is completely inserted into the cooking compartment 105 when the mounting protrusion 820 is disposed at the rearmost end portions of the first slot 835 and the second slot 125, in a case in which the mounting protrusion 820 is disposed at the foremost end portions of the first slot 835 and the second slot 125, the tray 200 may be withdrawn to the outside of the cooking compartment 105 only as much as a length less than ½ of the longitudinal length of the tray 200.

This is a result of designing so that the center of mass of the tray 200 is located inside the cooking compartment 105 even when the tray 200 is withdrawn. That is, in consideration of the fact that, when the tray 200 is excessively withdrawn, the risk of the tray 200 falling forward increases to the extent that the tray 200 is excessively withdrawn, the center of mass of the tray 200 is allowed to be located inside the cooking compartment 105 even when the tray 200 is withdrawn. Also, when the tray 200 is excessively withdrawn and the center of mass of the cooking appliance is biased to the front, the size of the moment acting on the cooking appliance increases to the extent that the center of mass of the cooking appliance is biased to the front, and, as a result, the risk of the cooking appliance itself falling forward also increases.

In consideration of such an aspect, in the present embodiment, the tray 200 is allowed to be withdrawn to the outside of the cooking compartment 105 only as much as a length less than ½ of the longitudinal length of the tray 200. In this way, since the tray 200 is automatically withdrawn when the door 300 is opened, advantageous effects in that withdrawal of food or the tray 200 is more easily and conveniently performed and the risk of the tray 200 and the cooking appliance falling forward is lowered may be provided.

In the case of a conventional cooking appliance in which a door only opens the front of a cooking compartment, when, as described above, the tray 200 is withdrawn to the outside of the cooking compartment 105 only as much as the length less than ½ of the longitudinal length of the tray 200, various inconveniences may occur.

That is, since the tray 200 is not completely exposed to the outside of the cooking compartment, it is difficult to properly check the cooking state of food placed on the tray 200, and there is an inconvenience in placing food on the tray 200 or taking out the food placed on the tray 200.

In contrast, in the cooking appliance of the present embodiment, since the upper surface of the cooking compartment 105 as well as the front surface thereof are opened together when the door 300 is opened, the entire tray 200 may be exposed to the outside even when, as described above, the tray 200 is withdrawn to the outside of the cooking compartment 105 only as much as the length less than ½ of the longitudinal length of the tray 200.

Therefore, even when the tray 200 is withdrawn to the outside of the cooking compartment 105 only as much as the length less than ½ of the longitudinal length of the tray 200, it is easy to check the cooking state of the entire food placed on the tray 200, and placing food on the tray 200 or taking out the food placed on the tray 200 may be easily and promptly performed.

That is, the sixth configuration provided for preventing the cooking appliance from falling forward when the door 300 is opened is a configuration in which the tray 200 is allowed to be withdrawn to the outside of the cooking compartment 105 only as much as the length less than ½ of the longitudinal length of the tray 200 so that the entire tray 200 may be exposed to the outside while the risk of the occurrence of the cooking appliance falling forward is lowered.

[Steam Generating Structure of Tray]

Figure 24:
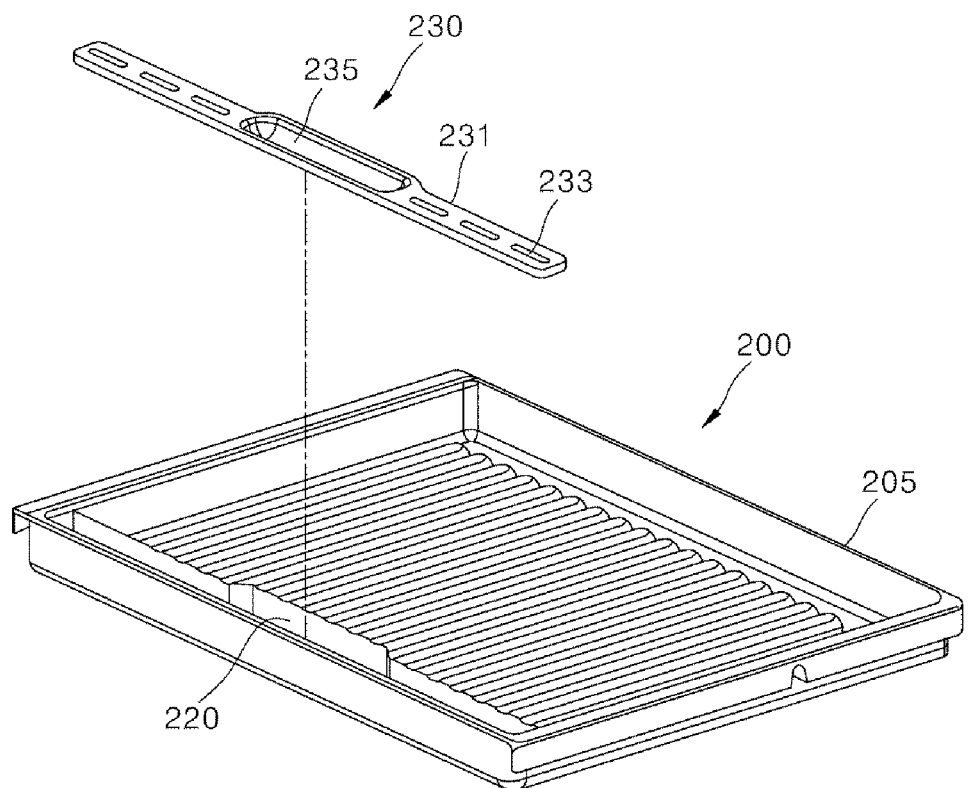
FIG. 24 is an exploded perspective view illustrating a partial configuration of the tray illustrated in FIG. 11.
Figure 25:
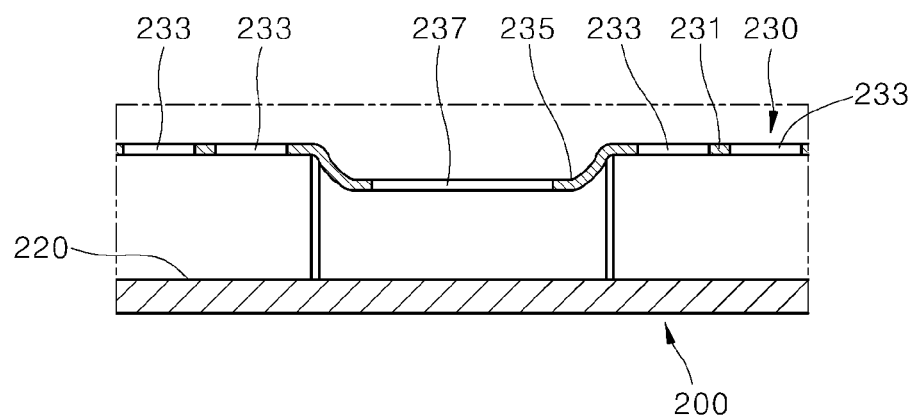
FIG. 25 is a cross-sectional view taken along line "XXV-XXV" of FIG. 11.

FIG. 24 is an exploded perspective view illustrating a partial configuration of the tray illustrated in FIG. 11, and FIG. 25 is a cross-sectional view taken along line "XXV-XXV" of FIG. 11.

Referring to FIG. 3 and FIGS. 24 and 25, a water receiving groove 220 may be formed in the tray 200. The water receiving groove 220 may be disposed in at least one of the four side surfaces of the tray 200. In the present embodiment, the water receiving groove 220 is illustrated as being disposed in the side surface disposed at the front of the tray main body 205. The water receiving groove 220 may be formed in the form of a groove which is concavely depressed downward from an upper end of the side surface of the tray 200.

Water may be held in the water receiving groove 220, and the water held in the water receiving groove 220 may be evaporated when the inside of the cooking compartment 105 or the tray 200 is heated and then be provided as steam acting in the cooking compartment 105.

Further, the tray 200 may further include a steam cover 230. The steam cover 230 may be provided as an element which covers the water receiving groove 220 from the top and may include a cover main body part 231 and a water entrance guide surface 235.

The cover main body part 231 may cover the water receiving groove 220 from the top and be detachably coupled to the tray 200. A plurality of steam holes 233 may be disposed in the cover main body part 231. Each steam hole 233 is formed in the cover main body part 231 to pass through the cover main body part 231 in the up-down direction. By each steam hole 233 formed in this way, a passage connecting the cooking compartment 105 and the inside of the water receiving groove 220 covered by the steam cover 230 may be formed in the steam cover 230.

According to the present embodiment, the water receiving groove 220 and the steam cover 230 are disposed in front of the tray 200 and extend in the left-right direction. Also, the plurality of steam holes 233 are disposed in the cover main body part 231 of the steam cover 230 in such a way that the plurality of steam holes 233 are arranged to be spaced a predetermined distance apart from each other in the left-right direction. That is, the steam holes 233 are provided to be evenly disposed inside the cooking compartment 105 in the left-right direction.

Also, the water entrance guide surface 235 is formed on the cover main body part 231 so as to be concave in the up-down direction. A water entrance hole 237 is formed in the water entrance guide surface 235 to pass through the water entrance guide surface 235 in the up-down direction.

The water entrance hole 237 forms a passage connecting the water receiving groove 220 and an upper surface of the steam cover 230 to each other in the steam cover 230. Also, the water entrance guide surface 235 guides the flow of water so that the flow of water supplied through the upper surface of the steam cover 230 is guided toward the water entrance hole 237.

Preferably, the water entrance hole 233 may be disposed at a central side of the water entrance guide surface 235 in the left-right direction, and the water entrance guide surface 235 may be inclined to connect the cover main body part 231 and the water entrance hole 237 to each other. Accordingly, water supplied to the water entrance guide surface 235 may flow toward the water entrance hole 237 by an inclined surface formed by the water entrance guide surface 235 and then be supplied into the water receiving groove 220 through the water entrance hole 237.

The water supplied into the water receiving groove 220 as described above may be used as water for generating steam to be supplied into the cooking appliance.

For example, when operation of the cooking appliance begins in a state in which water is housed in the water receiving groove 220 and the tray 200 is inserted into the cooking compartment 105, heating of the tray 200 is performed by operation of at least one of the first heating part 400 and the second heating part 600.

When the tray 200 is heated in this way, the water housed in the water receiving groove 220 is heated and steam is generated. The steam generated inside the water receiving groove 220 may pass through the steam cover 230 through the steam holes 233 and be introduced into the cooking compartment 105. In this case, since the water receiving groove 220 is formed to extend in the left-right direction, and the plurality of steam holes 233 are evenly disposed inside the cooking compartment 105 in the left-right direction, steam may be evenly spread inside the cooking compartment 105. The steam may also be discharged through the water entrance hole 237 disposed at the center of the steam cover 230 in the left-right direction.

Since the steam is evenly spread inside the cooking compartment 105 as described above instead of being concentrated on any one portion of the cooking compartment 105, the steam may be evenly supplied to the entire food which is an object to be cooked. In this way, the cooking appliance of the present embodiment may provide a cooking function which allows moisture to be effectively maintained in the food by the steam evenly supplied to the inside of the cooking compartment 105.

Also, since the steam cover 230 is provided to be separable from the tray 200, the inside of the water receiving groove 220 may be easily washed, and, when necessary, only the steam cover 230 may be replaced easily and promptly. Therefore, it is possible to provide a cooking appliance which facilitates hygiene care and maintenance and repair.

[Structures of Second Heating Part, Receiver Coil, and Second Control Board]

Figure 26:
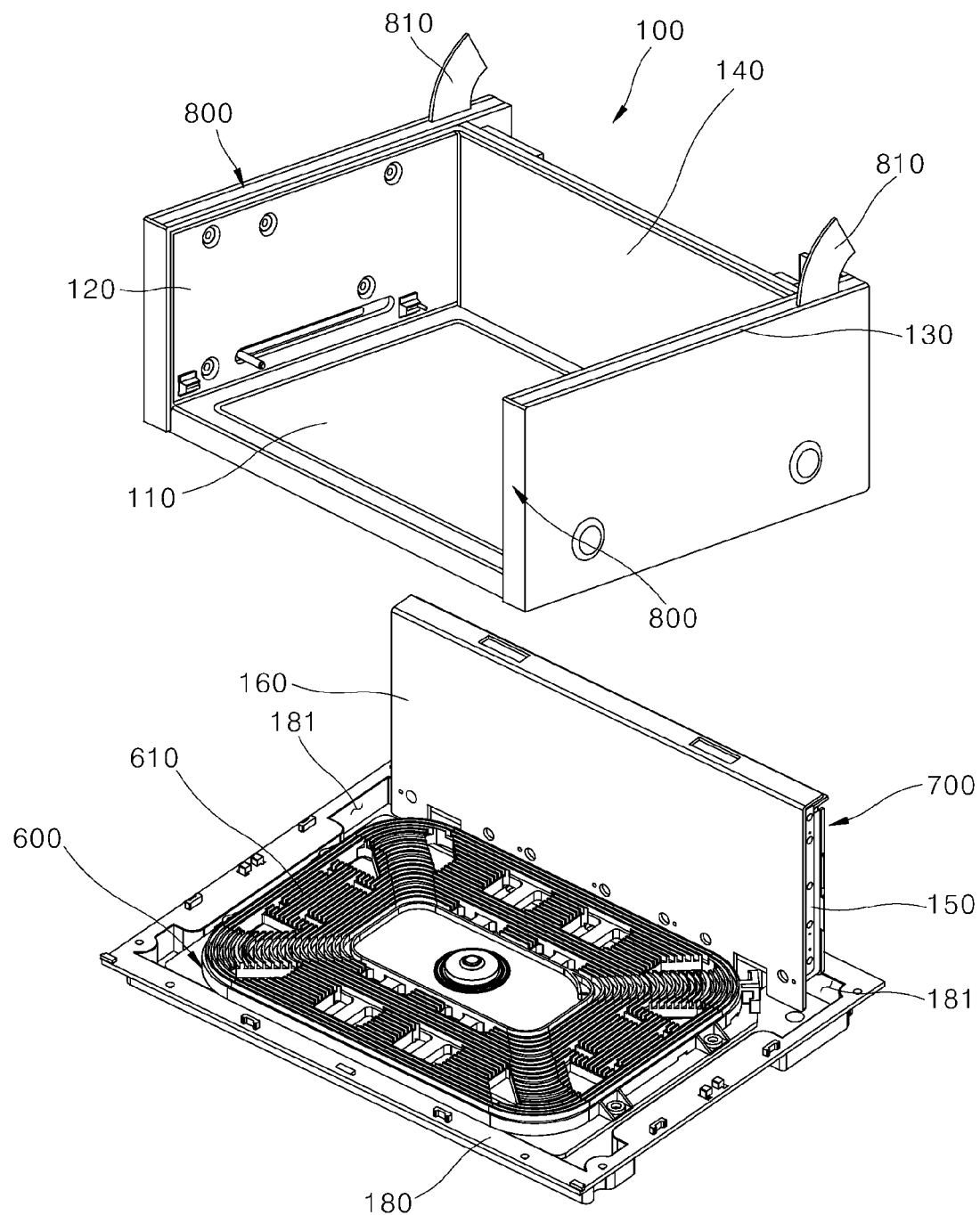
FIG. 26 is an exploded perspective view separately illustrating a housing and a second heating part according to an embodiment of the present disclosure.
Figure 27:
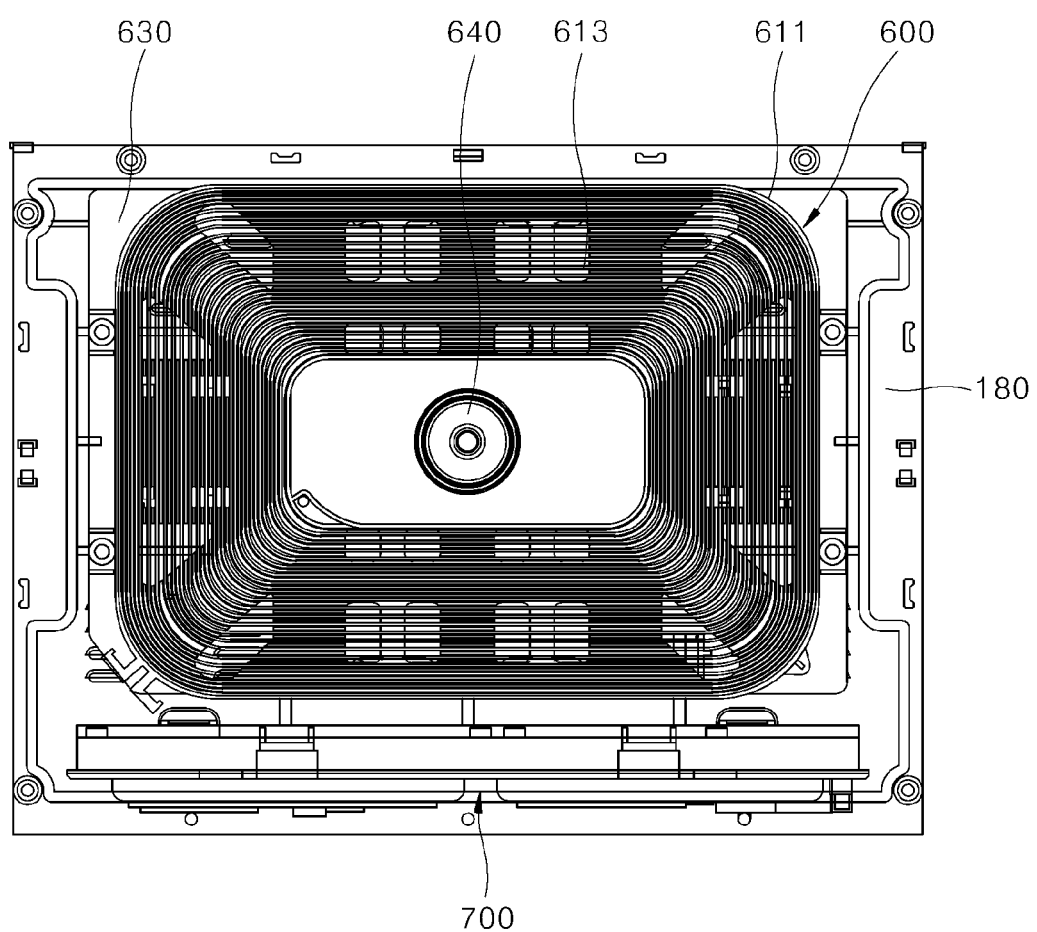
FIG. 27 is a plan view illustrating the second heating part illustrated in FIG. 26.
Figure 28:
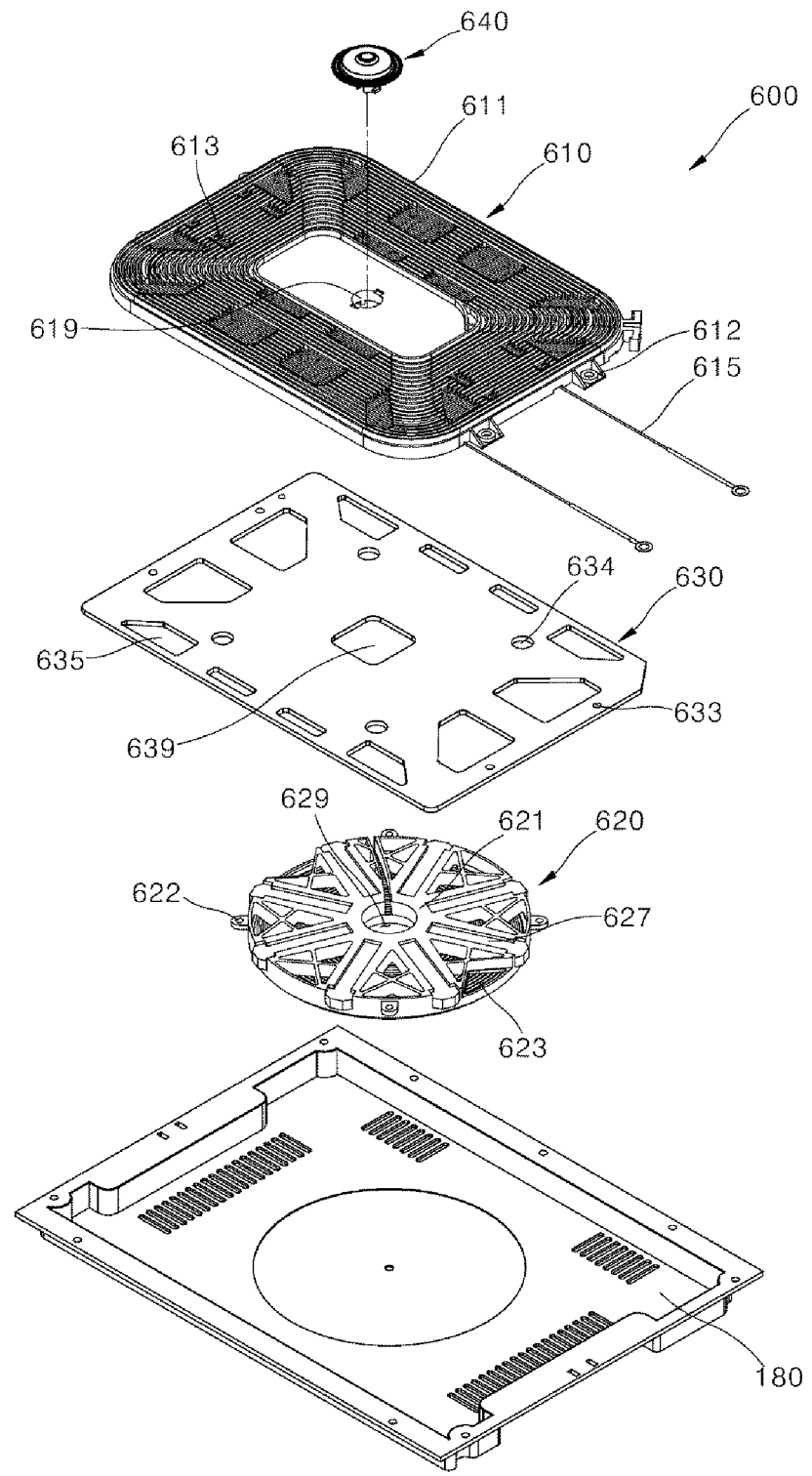
FIG. 28 is an exploded perspective view separately illustrating the second heating part illustrated in FIG. 26, a receiver coil, and an electromagnetic shielding plate.
Figure 29:
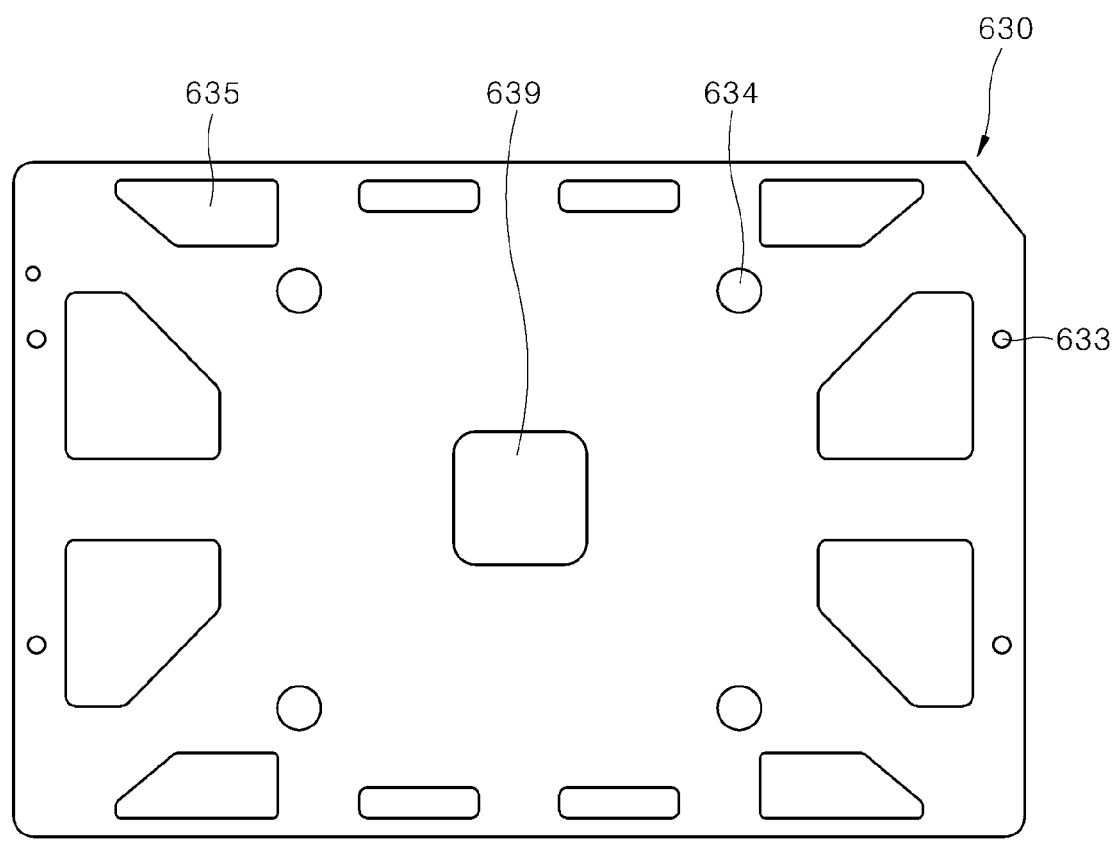
FIG. 29 is a plan view illustrating the electromagnetic shielding plate.
Figure 30:
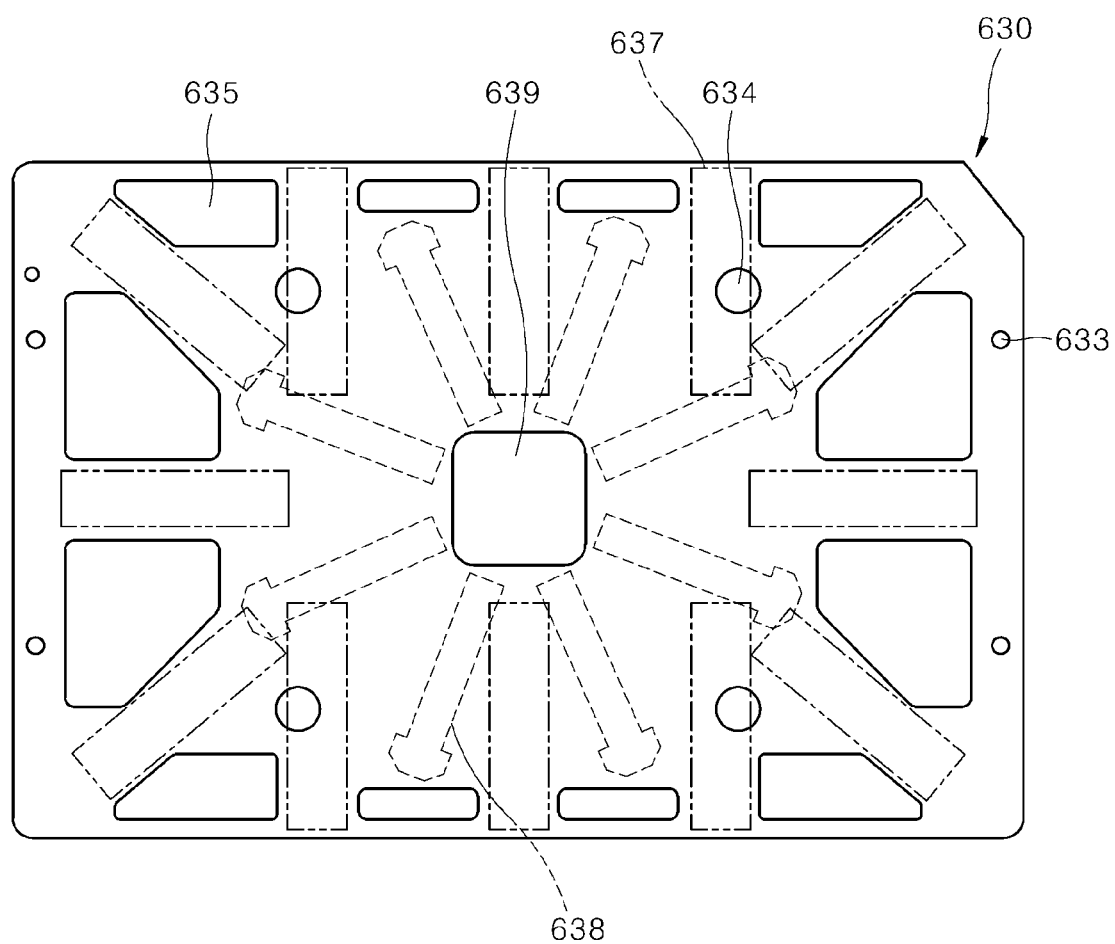
FIG. 30 is a plan view illustrating first and second ferrite corresponding regions of the electromagnetic shielding plate of FIG. 29.
Figure 31:
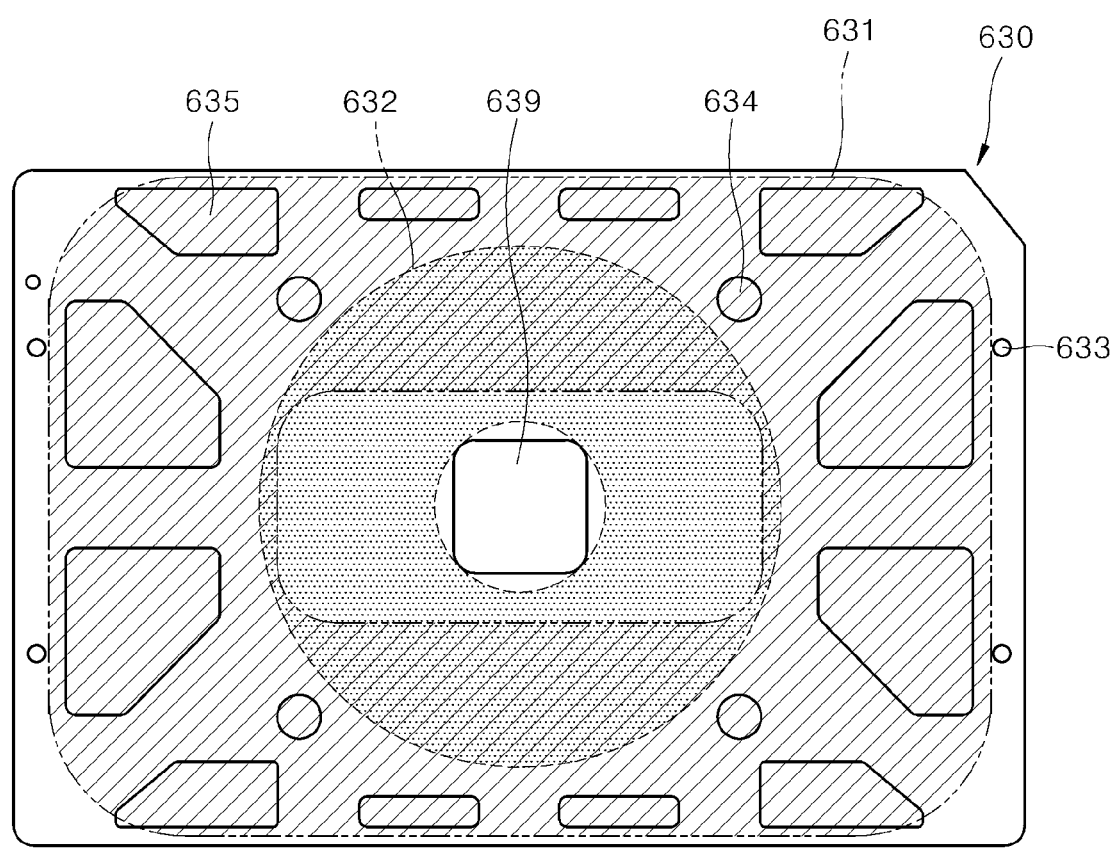
FIG. 31 is a plan view illustrating first and second coil corresponding regions of the electromagnetic shielding plate of FIG. 29.
Figure 32:
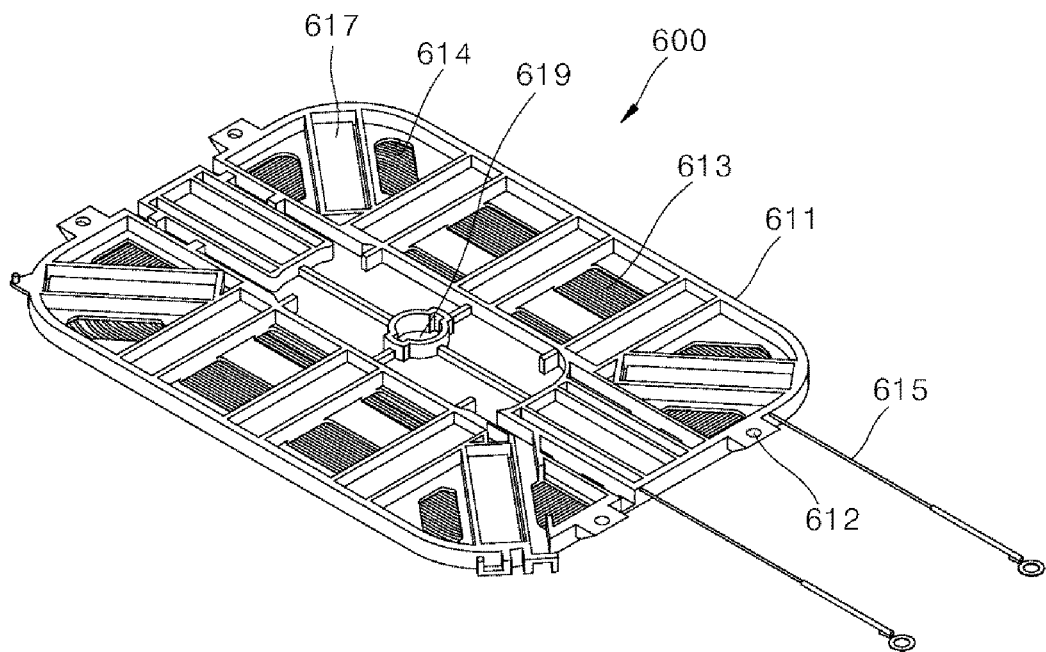
FIG. 32 is a perspective view illustrating a bottom surface of a working coil.
Figure 33:
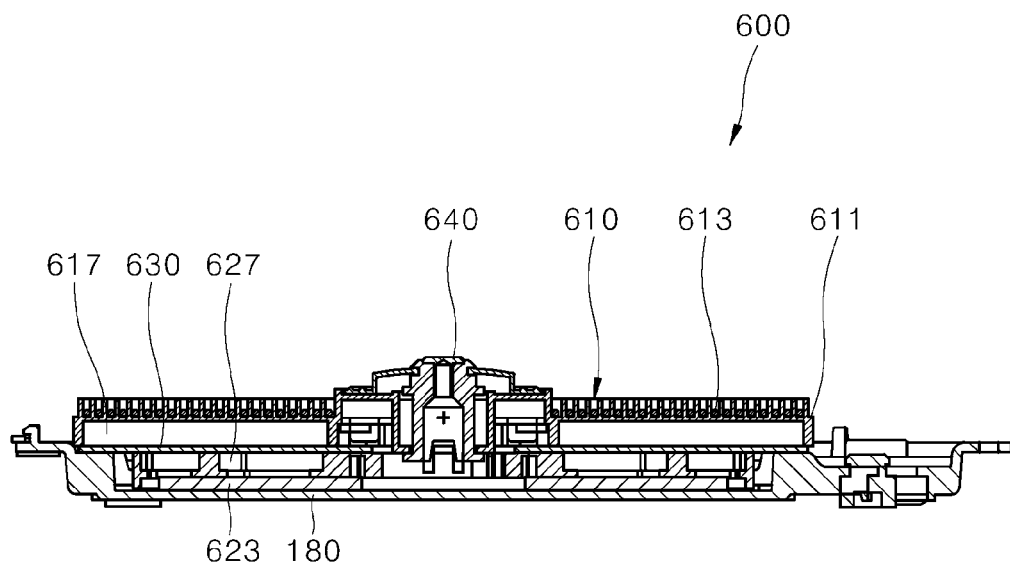
FIG. 33 is a cross-sectional view illustrating a coupled state between the second heating part illustrated in FIG. 26, a temperature sensor, a receiver coil, and the electromagnetic shielding plate.

FIG. 26 is an exploded perspective view separately illustrating a housing and a second heating part according to an embodiment of the present disclosure, and FIG. 27 is a plan view illustrating the second heating part illustrated in FIG. 26. FIG. 28 is an exploded perspective view separately illustrating the second heating part illustrated in FIG. 26, a receiver coil, and an electromagnetic shielding plate. FIG. 29 is a plan view illustrating the electromagnetic shielding plate. FIG. 30 is a plan view illustrating first and second ferrite corresponding regions of the electromagnetic shielding plate of FIG. 29. FIG. 31 is a plan view illustrating first and second coil corresponding regions of the electromagnetic shielding plate of FIG. 29. FIG. 32 is a perspective view illustrating a bottom surface of a working coil. FIG. 33 is a cross-sectional view illustrating a coupled state between the second heating part illustrated in FIG. 26, a temperature sensor, a receiver coil, and the electromagnetic shielding plate. FIG. 34 is a rear view illustrating a second control board illustrated in FIG. 26.

Referring to FIG. 3, FIGS. 26 and 27 and FIG. 32, the second heating part 600 is disposed at the lower portion of the tray 200. The second heating part 600 is installed at the lower portion of the bottom surface 110 of the housing 100 and is provided in the form of a heating part which heats the tray 200 using a heating method different from that of the first heating part 400, e.g., an induction heating part. The induction heating part may be provided in the form including the working coil 610 installed at the lower portion of the bottom surface 110 of the housing 100 and may induce heating of the tray 200 from the lower portion of the tray 200.

The working coil 610 includes a first coil installation base 611. In the present embodiment, the first coil installation base 611 is illustrated as being formed in a quadrilateral shape similar to the shape of the tray 200. This is a result of designing the size and shape of the working coil 610 to be similar to those of the tray 200 so that the entire region of the tray 200 may be heated by the working coil 610.

As illustrated in FIGS. 28 and 33, an upper portion of the first coil installation base 611 is provided with a spiral groove, in which a first coil 613 may be installed, at the center thereof. The first coil 613 is housed in the spiral groove and fixed by being densely wound at an upper portion of the first coil installation base 611. A first coil connection wiring 615 connected to a coil control printed circuit board (PCB) for controlling the first coil 613 is provided at an end portion of the first coil 613.

The first coil 613 is installed at the upper portion of the first coil installation base 611. The first coil installation base 611 is installed adjacent to the bottom surface 110 of the housing 100 below the bottom surface 110. The first coil installation base 611 may be in close contact with the bottom surface 110. Thus, a distance between the working coil 610 and the tray 200 can be minimized, and heating efficiency of the tray can be enhanced.

The first coil 613 is disposed in a region having a shape of a rectangular ring whose corners are rounded.

As illustrated in FIG. 32, a plurality of first ferrites 617 are installed at a lower portion of the first coil installation base 611. The first ferrites 617 radially extend outward from a position apart from the center of the first coil installation base 611 by a prescribed distance. The first ferrites 617 radially extend to overlap a region in which the first coil 613 is installed. Extending directions of the first ferrites 617 intersect to be perpendicular to a winding direction of the first coil.

Further, the second heating part 600 may further include a receiver coil 620. The receiver coil 620 is an element provided to receive wirelessly-transmitted power and is disposed at a lower portion of the second heating part 600. Also, a base 180 is disposed at a lower portion of the receiver coil 620. The base 180 is coupled to the lower portion of the bottom surface 110 of the housing 100 and supports the working coil 610, the receiver coil 620, and the like from the lower portion of the receiver coil 620 while forming an exterior of the bottom surface of the cooking appliance.

Like the working coil 610, the receiver coil 620 may include a second coil installation base 621 and a second coil 623. Unlike the first coil installation base 611 of the working coil 610, the second coil installation base 621 of the receiver coil 620 may be formed in a substantially circular shape. This is a result of designing the shape of the receiver coil 620 to be similar to the shape of a working coil of an induction heating part provided at a cooktop.

The second coil 623 is installed at a lower portion of the second coil installation base 621. The second coil installation base 621 is installed adjacent to the base 180 above the base 180. The second coil installation base 621 may be in close contact with the base 180. Thus, a distance between the receiver coil 620 and the working coil of the cooktop can be minimized, and wireless power transmission efficiency can be enhanced.

The second coil 623 is disposed in a region having a shape of a circular ring.

As illustrated in FIGS. 28 and 33, a plurality of second ferrites 627 are installed at an upper portion of the second coil installation base 621. The second ferrites 627 radially extend outward from a position apart from the center of the second coil installation base 621 by a prescribed distance. The second ferrites 627 radially extend to overlap a region in which the second coil 623 is installed. Extending directions of the second ferrites 627 intersect to be perpendicular to a winding direction of the second coil.

According to the present embodiment, the receiver coil 620 is provided to be able to receive power from an induction heating part of another cooking appliance that is separately provided from the cooking appliance of the present embodiment.

For example, the cooking appliance of the present embodiment may be used while being placed on a cooktop XA as illustrated in FIG. 23. In this case, power required for operation of the cooking appliance may be received from an induction heating part of the cooktop.

For example, when the working coil XC of the cooktop XA and the cooking appliance of the present embodiment are operated together while the cooking appliance of the present embodiment is placed on the cooktop, power supplied through the cooktop may be transmitted to the receiver coil 620.

In this case, a current is induced toward the receiver coil 620 through a magnetic field which changes in the working coil of the cooktop due to the magnetic induction phenomenon. In this way, power supplied through the cooktop may be transmitted to the receiver coil 620. In this process, in order to improve power reception efficiency of the receiver coil 620, the cooking appliance of the present embodiment may be placed on the cooktop such that the position of the receiver coil 620 overlaps the position of the working coil provided in the induction heating part of the cooktop in the up-down direction.

Further, the induction heating part may further include an electromagnetic shielding plate 630 disposed between the working coil 610 and the receiver coil 620. The electromagnetic shielding plate 630 may be provided in the form of a metal plate. The metal may include aluminum. That is, the electromagnetic shielding plate 630 may be an aluminum plate. The electromagnetic shielding plate 630 is disposed between the working coil 610 and the receiver coil 620 and serves to minimize an influence of electromagnetic interference (EMI) due to the working coil 610 on the receiver coil 620 or an influence of EMI due to the receiver coil 620 on the working coil 610.

That is, the electromagnetic shielding plate 630 shields an electromagnetic field and electromagnetic waves in the space above the electromagnetic shielding plate 630 from affecting the lower space of the electromagnetic shielding plate 630, and shields an electromagnetic field and electromagnetic waves in the space below the electromagnetic shielding plate 630 from affecting the upper space of the electromagnetic shielding plate 630.

The electromagnetic shielding plate 630 may be formed of a piece of metal plate. The electromagnetic shielding plate 630 may be an aluminum plate having a thickness of about 1.5 mm.

The electromagnetic shielding plate 630 has a size that covers the working coil 610 and that covers the receiver coil 620. The electromagnetic shielding plate 630 covers both the working coil 610 and the receiver coil 620. The electromagnetic shielding plate 630 may have a rectangular shape corresponding to the working coil 610.

A plurality of first fastening holes 612 are provided in both ends of the first coil installation base 611, and third fastening holes 633 are provided in the electromagnetic shielding plate 630. In a state in which the first fastening holes 612 and the third fastening holes 633 face each other, these fastening holes are fastened by, for instance, screws (not illustrated). Thereby, the first coil installation base 611 can be fixed in close contact with the upper surface of the electromagnetic shielding plate 630.

A plurality of second fastening holes 622 are provided in an outer end of the second coil installation base 621 in a radial direction, and fourth fastening holes 634 are provided in the electromagnetic shielding plate 630. In a state in which the second fastening holes 622 and the fourth fastening holes 634 face each other, these fastening holes are fastened by, for instance, screws (not illustrated). Thereby, the second coil installation base 621 can be fixed in close contact with the bottom surface of the electromagnetic shielding plate 630.

That is, the working coil 610 and the receiver coil 620 can be fixed to the single electromagnetic shielding plate 630.

The first ferrites 617 and the second ferrites 627 are disposed to face each other on the basis of the electromagnetic shielding plate 630. The first coil 613 and the second coil 623 are disposed to face each other outside the first ferrites 617 and the second ferrites 627.

Referring to FIGS. 29 to 31, in a state in which the working coil 610, the electromagnetic shielding plate 630, and the receiver coil 620 are stacked, regions 637 corresponding to the first ferrites 617 and regions 638 corresponding to the second ferrites 627 are present in the electromagnetic shielding plate 630. A region 631 corresponding to the first coil 613 and a region 632 corresponding to the second coil 623 are present in the electromagnetic shielding plate 630.

Referring to FIG. 30, portions of the electromagnetic shielding plate 630 which correspond to the first and second ferrite corresponding regions 637 and 638 are all blocked. Thus, the electromagnetic field and the electromagnetic waves, which are present in one of the two spaces partitioned by the electromagnetic shielding plate 630, can be efficiently prevented from affecting the other space located across the electromagnetic shielding plate 630.

Referring to FIG. 31, the first coil corresponding region 631 partly overlaps the second coil corresponding region 632.

The tray 200 is housed in the cooking compartment of the cooking appliance. Since the cooking compartment is disposed in the front of the cooking appliance, the tray 200 is also disposed adjacent to the front of the cooking appliance. The working coil 610 is also disposed below the tray 200 in an up-down direction.

According to the embodiment, all the center of the first coil 613, the center of the second coil 623, and the center of the electromagnetic shielding plate 630 are aligned. An outline of the first coil 613 includes that of the second coil 623. In that case, the size of the electromagnetic shielding plate 630 need not be larger than that of the tray 200 housed in the cooking appliance after all. Therefore, the volume of the cooking appliance does not increase. That is, this becomes a way that can secure the widest region of the second coil 623 without increasing the size of the cooking appliance. Further, since all the center of the working coil 610, the center of the electromagnetic shielding plate 630, and the center of the receiver coil 620 are aligned, there is an advantage in that an installation structure of a temperature measurement module 640 to be described below is simplified.

On the other hand, if the outline of the second coil 623 protrudes outward beyond the outline of the first coil 613, the size of the electromagnetic shielding plate 630 needs to be correspondingly increased. Then, the size of the cooking appliance also results in increasing to a size corresponding thereto.

The second coil corresponding region 632 may have a blocked shape in the electromagnetic shielding plate 630. In that case, even if the heat inside the cooking compartment 105 is transmitted to the lower space of the bottom surface 110 (the space in which the working coil and the receiver coil are mounted) through the bottom surface 110, the electromagnetic shielding plate 630 shields a heat transfer path directed to the second coil 623, thereby allowing the second coil 623 not to be heated.

On the other hand, vents 635 may be provided in regions of the first coil corresponding region 631 which do not overlap the second coil corresponding region 632. Since the lower and upper spaces of the electromagnetic shielding plate 630 communicate with each other in the regions in which the vents 635 are provided, a flow of air is smooth. Therefore, cooling of the first coil 613 can be accelerated in the corresponding regions.

Referring to FIG. 32, open holes 614 may be provided in regions in which the first coil 613 is wound in the first coil installation base 611. At least some of the regions of the open holes 614 may overlap the vents 635. Therefore, the cooling of the first coil 613 can be further accelerated in the corresponding regions. The open holes 614 may overlap the second coil corresponding region 632.

The cooking appliance of the present embodiment may be operated by wirelessly receiving power from the induction heating part of the cooktop. Since the cooking appliance does not require untidy power cables and thus may be provided in a simple and neat exterior, and the cooking appliance may be operated by wirelessly receiving power just by being placed on the cooktop, a user's satisfaction may be further improved.

According to the embodiment, since the center of the working coil 610 and the center of the receiver coil 620 are aligned, the center of the tray 200 and the center of the receiver coil 620 are also aligned. Therefore, when a user puts the cooking appliance on a working coil of the cooktop, the user has only to intuitively align the center of the working coil of the cooktop and the center of the cooking compartment. Then, the receiver coil 620 of the cooking appliance is aligned with the working coil of the cooktop that is an appliance different from the cooking appliance, and wireless power transmission efficiency can be enhanced.

As illustrated in FIGS. 26, 27, and 34, the receiver coil 620 is electrically connected to the second control board 700 disposed behind the working coil 610 and the receiver coil 620. The receiver coil 620 is electrically connected to the second control board 700 through a second coil connection wiring (not illustrated), and the second control board 700 is electrically connected to the working coil 610 through the first coil connection wiring 615.

The power wirelessly transmitted from the working coil of the cooktop to the receiver coil 620 is transmitted to the second control board 700 electrically connected to the receiver coil 620. The second control board 700 transmits power to the working coil 610.

According to the present embodiment, the inner space at the lower portion of the bottom surface 110 of the housing 100 and the inner space at the rear of the back surface 140 of the housing 100 are connected to communicate with each other. The working coil 610 of the induction heating part disposed at the lower portion of the bottom surface 110 of the housing 100 and the second control board 700 disposed at the rear of the back surface 140 of the housing 100 may be electrically connected to each other by the first coil connection wiring 615 which connects the working coil 610 and the second control board 700 through the inner spaces that communicate with each other. This is equally applied to the receiver coil 620.

A power processing part to which power required for operation of the induction heating part and the like of the second heating part 600 is supplied is provided at the second control board 700. The power processing part is connected to the receiver coil 620 and receives power from the receiver coil 620 and processes the received power to a form suitable for use in the second heating part 600 and the like. The power processing part may include a noise filter PCB 710, and a coil control PCB 720 for controlling operation of the working coil 610 may be further provided at the second control board 700.

The noise filter PCB 710 serves to remove noise from power to be supplied to the working coil 610, and the coil control PCB 720 controls operation of the working coil 610. A chip for controlling the operation of the working coil 610, e.g., an insulated gate bipolar transistor (IGBT) chip 725, may be mounted on the coil control PCB 720.

The IGBT chip 725 is a kind of high heat generation chip that requires temperature management. When the IGBT chip 725 is overheated to a predetermined temperature or more, the IGBT chip 725 is unable to control the working coil 610.

In consideration of such an aspect, a second cooling fan 730 is installed at the second control board 700. The second cooling fan 730 may be a sirocco fan which suctions air from an outer space of the housing 100 and discharges the air toward the IGBT chip 725.

The second cooling fan 730 may be disposed at the side of the IGBT chip 725 and may suction air from the rear side of the housing 100 and discharge the air sideward toward the IGBT chip 725.

The air introduced into the space portion at the rear of the back surface of the housing 100 through the second cooling fan 730 may first come into contact with the IGBT chip 725 and a heat sink 726 for cooling the IGBT chip 725, cool the IGBT chip 725 and the heat sink 726, cool a portion of the noise filter PCB 710, and then be discharged to the outside.

Meanwhile, as illustrated in FIGS. 26 to 33, the second heating part 600 of the present embodiment may further include a temperature measurement module 640. The temperature measurement module 640 is provided to measure a temperature of the tray or a temperature of the inside of the cooking compartment 105 in which the tray is disposed.

The temperature measurement module 640 may be disposed at the center of the working coil 610. Specifically, the temperature measurement module 640 may be disposed at a portion where the first coil 613 is not disposed on the first coil installation base 611, e.g., a central portion of the first coil installation base 611.

The temperature measurement module 640 may be fitted and coupled to the working coil 610 via a through-hole formed in the central portion of the first coil installation base 611. Also, the temperature measurement module 640 installed in this way may include a temperature sensor such as a thermistor and may be disposed at the lower portion of the bottom surface 110 of the housing 100 and measure the temperature of the tray or the temperature of the inside of the cooking compartment 105 in which the tray is disposed.

All of the center of the working coil 610, the center of the electromagnetic shielding plate 630, and the center of the receiver coil 620 are aligned. A first central hole 619 is provided in the center of the working coil 610, and a second central hole 629 is provided in the center of the receiver coil 620, and a third central hole 639 is provided in the center of the electromagnetic shielding plate 630. Furthermore, since all the central holes are aligned, a space communicating up and down is provided. The temperature measurement module 640 is inserted and installed in the space.

The second control board 700 is electrically connected to the temperature measurement module 640, and receives a temperature measured by the temperature measurement module 640. A cable connecting the temperature measurement module 640 and the second control board 700 may be wired from a lower end of the temperature measurement module 640 to the second control board 700 through a space between the receiver coil 620 and the base 180.

The temperature measurement module 640 is elastically biased upward and comes into contact with the bottom surface of the tray 200 on an upper end thereof, thereby measuring a temperature of the tray 200 in a contact way.

[Arrangement Relationship Among Hinge Assembly, Second Heating Part, Second Control Board, See-Through Window, First Heating Part, Input Part, and First Control Board]

Referring to FIG. 3 and FIGS. 26 to 34, the hinge assembly 800, the second heating part 600, and the second control board 700 are disposed in the housing 100.

The cooking compartment 105 may be formed inside the housing 100, and the tray 200 may be installed in the cooking compartment so as to be withdrawable therefrom. The second heating part 600 for heating the tray 200 is disposed at the lower portion of the housing 100. Also, the hinge assembly 800 which rotatably supports the door 300 is disposed at each of both side portions of the housing 100.

The hinge assembly 800 is disposed at both side portions of the housing 100 in order to stably support the door 300 from both sides of the door 300. Also, the hinge assembly 800 interlocks with rotation of the door 300 and causes the tray 200 to be withdrawn. To allow the hinge assembly 800 to be coupled to the tray 200 so that the hinge assembly 800 may move the tray 200 in the front-rear direction, the hinge assembly 800 is disposed at both side portions of the housing 100.

That is, the hinge assembly 800 should be disposed at both side portions of the housing 100 for the hinge assembly 800 to be coupled to the tray 200 so that the hinge assembly 800 may stably support the door 300 and move the tray 200 in the front-rear direction.

Further, since the upper surface and the front surface of the housing 100 are open and the second heating part 600 is installed at the lower portion of the housing 100, the hinge assembly 800 is inevitably disposed at the rear or both side portions of the housing 100. Due to the above-described reasons, in many ways, it is advantageous for the hinge assembly 800 to be disposed at both side portions of the housing 100.

The receiver coil 620 is disposed at the lower portion of the housing 100, more specifically, at the lower portion of the second heating part 600. Since the receiver coil 620 has to be disposed at a position most adjacent to a target of wireless power transmission, e.g., the working coil of the cooktop, the receiver coil 620 is disposed at the lower portion of the housing 100.

When the receiver coil 620 is disposed at the lower portion of the housing 100 together with the working coil 610 of the second heating part 600 as described above, the EMI of the working coil 610 or the receiver coil 620 may affect each other. In consideration of such an aspect, the electromagnetic shielding plate 630 is disposed between the working coil 610 and the receiver coil 620.

Since the second control board 700 is an element closely related to the power reception through the receiver coil 620 and the operation of the working coil 610, the second control board 700 may be disposed at a position adjacent to the receiver coil 620 and the working coil 610.

Since the working coil 610 and the receiver coil 620 of the second heating part 600 are disposed at the lower portion of the housing 100, and the hinge assembly 800 is disposed at both side portions of the housing 100, the rear of the housing 100 may be the most efficient position for arrangement of the second control board 700.

In consideration of such an aspect, the second control board 700 is installed in a space at the rear of the back surface 140 of the housing 100. The second control board 700 installed in this way may be disposed at a position very close to the working coil 610 and the receiver coil 620. Accordingly, wires for connecting the second control board 700, the working coil 610, and the receiver coil 620 may be simply configured.

Also, the position of the second control board 700 disposed at the rear of the housing 100 as described above is also close to the hinge assembly 800. Accordingly, since, when configuring wires for connecting the second control board 700 and the elements disposed in the door 300, the wires may be easily concealed inside the hinge assembly 800, there is an advantage in that it is possible to configure the wires in a neat and simple manner such that the wires are not easily exposed to the outside.

As described above, the second heating part 600 and the receiver coil 620, the hinge assembly 800, and the second control board 700 are disposed at the lower portion of the housing 100, both side portions of the housing 100, and the rear of the housing 100, respectively. The elements are those suitable to be disposed in the housing 100 and are disposed at optimal positions that allow the elements to function optimally, have high structural stability, have neat and simple wiring configurations, and efficiently avoid interference therebetween.

Meanwhile, referring to FIGS. 3 to 5, the see-through window W, the first heating part 400, the input part 360, and the first control board 500 are disposed in the door 300. The elements are those more suitable to be disposed in the door 300 than in the housing 100 due to functions thereof. Also in consideration of an aspect that various other elements are already disposed in the housing 100 and thus it is difficult for other elements to be disposed in the housing 100, the see-through window W, the first heating part 400, the input part 360, and the first control board 500 are more suitable to be disposed in the door 300 than in the housing 100.

The see-through window W is disposed at the upper portion of the cooking appliance. In consideration of a characteristic of the cooking appliance provided in the form of a mini oven in that the cooking appliance is generally used at a position lower than a user's gaze, the see-through window W may be disposed at the upper portion of the cooking appliance rather than being disposed at the front of the cooking appliance.

The see-through window W is disposed at the upper surface of the door 300, more specifically, at the door upper surface part 310. In this case, the larger the size of the see-through window W, the more advantageous it is for securing the field of view for the inside of the cooking compartment 105. However, the size of the see-through window W may be set to a size that allows a space required for installation of the first heating part 400 and the cable mounting parts 340 and 345 to be secured in the door upper surface part 310.

Like the see-through window W, the first heating part 400 is disposed in the door upper surface part 310. This is a result of designing the first heating part 400 to be disposed at an upper portion facing the second heating part 600 with the tray 200 disposed therebetween. That is, the first heating part 400 is disposed on the door upper surface part 310 so as to be disposed at a higher portion than the tray 200.

The first heating part 400 installed in the door upper surface part 310 together with the see-through window W as described above should be disposed at a position at which the first heating part 400 is not exposed through the see-through window W when viewed from the top. When the first heating part 400 is disposed in a region exposed through the see-through window W, it is aesthetically not desirable, a problem may occur in securing the field of view through the see-through window W, and a problem in that a temperature of a portion of the see-through window W rises may also occur.

Also, in consideration of the shape of the door front surface part 350 having a rectangular shape in which a front-rear length is longer than a left-right length, the first heating part 400 should be disposed at the front outer side and the rear outer side of the see-through window W for a length of the first heating part 400 to be increased accordingly, and improvement in thermal power of the first heating part 400 may be expected as much as the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving thermal power of the first heating part 400.

Since the see-through window W and the first heating part 400 are disposed in the door upper surface part 310 as described above, most of the region of the door upper surface part 310 is occupied by the see-through window W and the first heating part 400. Also, the input part 360 and the first control board 500 are disposed in the door front surface part 350 instead of the door upper surface part 310.

In consideration of the state in which most of the region of the door upper surface part 310 is occupied by the see-through window W and the first heating part 400, it is not easy to secure a space for installing the input part 360 in the door upper surface part 310. Also, when the input part 360 is disposed in the door upper surface part 310, in the process of opening the door 300, a collision occurs between the input part 360 and an obstacle disposed at the upper portion of the cooking appliance, and there is a risk of damage of the input part 360. Particularly, when the input part 360 is provided in the form protruding from the door 300, the risk is even greater.

Also, the door upper surface part 310 in which the first heating part 400 is disposed is likely to have a higher temperature than the door front surface part 350. Considering that the input part 360 is an element held by the user's hand and manipulated, when the input part 360 is disposed in the door upper surface part 310, the possibility that the user will come into contact with a hot portion of the door upper surface part 310 in the process of manipulating the input part 360 will be increased. That is, when the input part 360 is disposed in the door upper surface part 310, a risk that the user will suffer an injury such as a burn in the process of manipulating the input part 360 may be increased.

In consideration of such an aspect, the input part 360 is disposed in the door front surface part 350 instead of the door upper surface part 310. Since the input part 360 is disposed in the door front surface part 350, the user may safely and conveniently control the operation of the cooking appliance from the front of the cooking appliance.

In addition to the input part 360, the first control board 500 is also disposed in the door front surface part 350. Various elements and circuits related to reception of manipulation signals input via the input part 360, generation of control signals for controlling operations of the first heating part 400 and the second heating part 600, and the like are provided in the first control board 500. Therefore, in particular, the first control board 500 is required to be electrically connected to the input part 360.

According to the present embodiment, like the input part 360, the first control board 500 is installed in the door front surface part 350 and disposed at a position very close to the input part 360. Therefore, connection between the input part 360 and the first control board 500 may be configured in the form in which the input part 360 is directly connected to the first control board 500, and, accordingly, a very simple and stable connection structure may be provided for the input part 360 and the first control board 500.

Also, since the first control board 500 is installed in the door front surface part 350 instead of the door upper surface part 310 in which the first heating part 400, which is a heat generating component, is disposed, the first control board 500 may be disposed at a position deviated, to some extent, from an influence of heat generated by the first heating part 400. In this way, since an influence of heat, which is generated during operation of the first heating part 400, on the first control board 500 may be reduced accordingly, the stability and operational reliability of the cooking appliance may be further improved.

[Structure of Door Frame]

Figure 35:
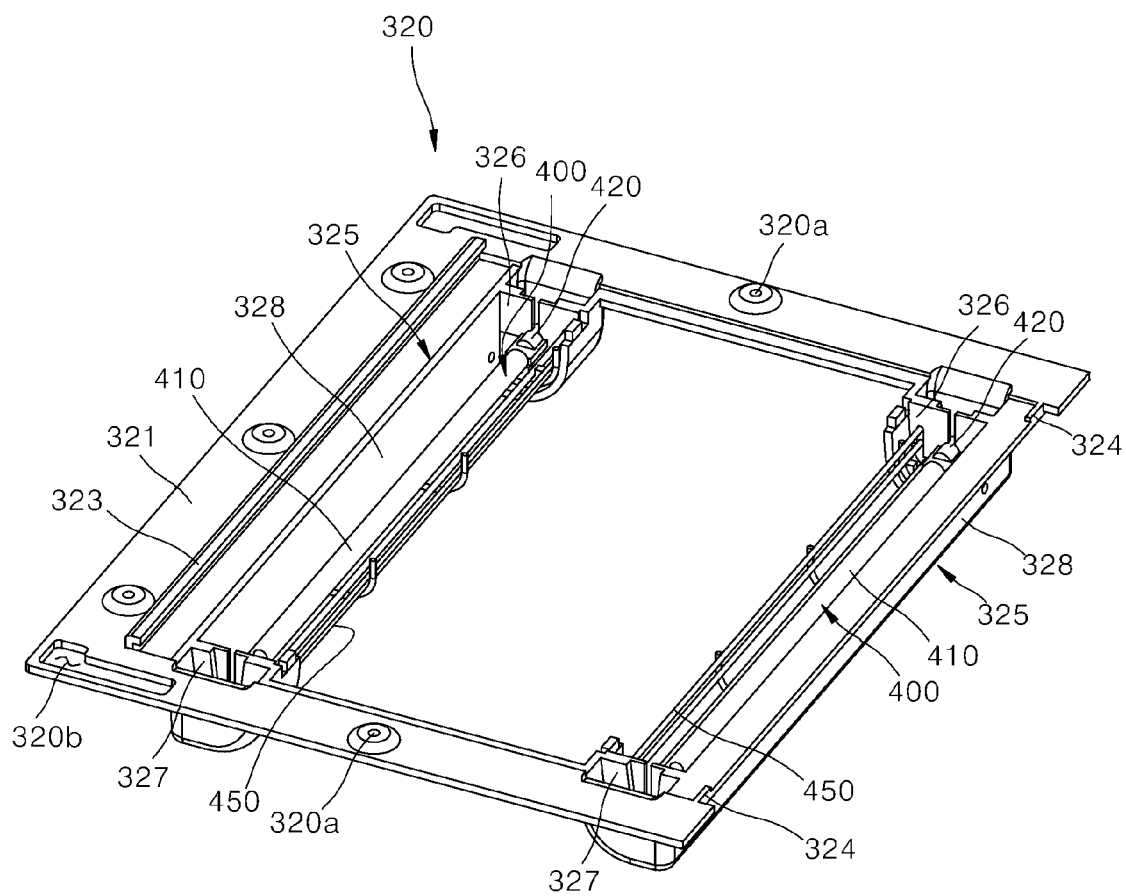
FIG. 35 is an exploded perspective view illustrating a door frame and components installed on the door frame according to an embodiment of the present disclosure.
Figure 36:
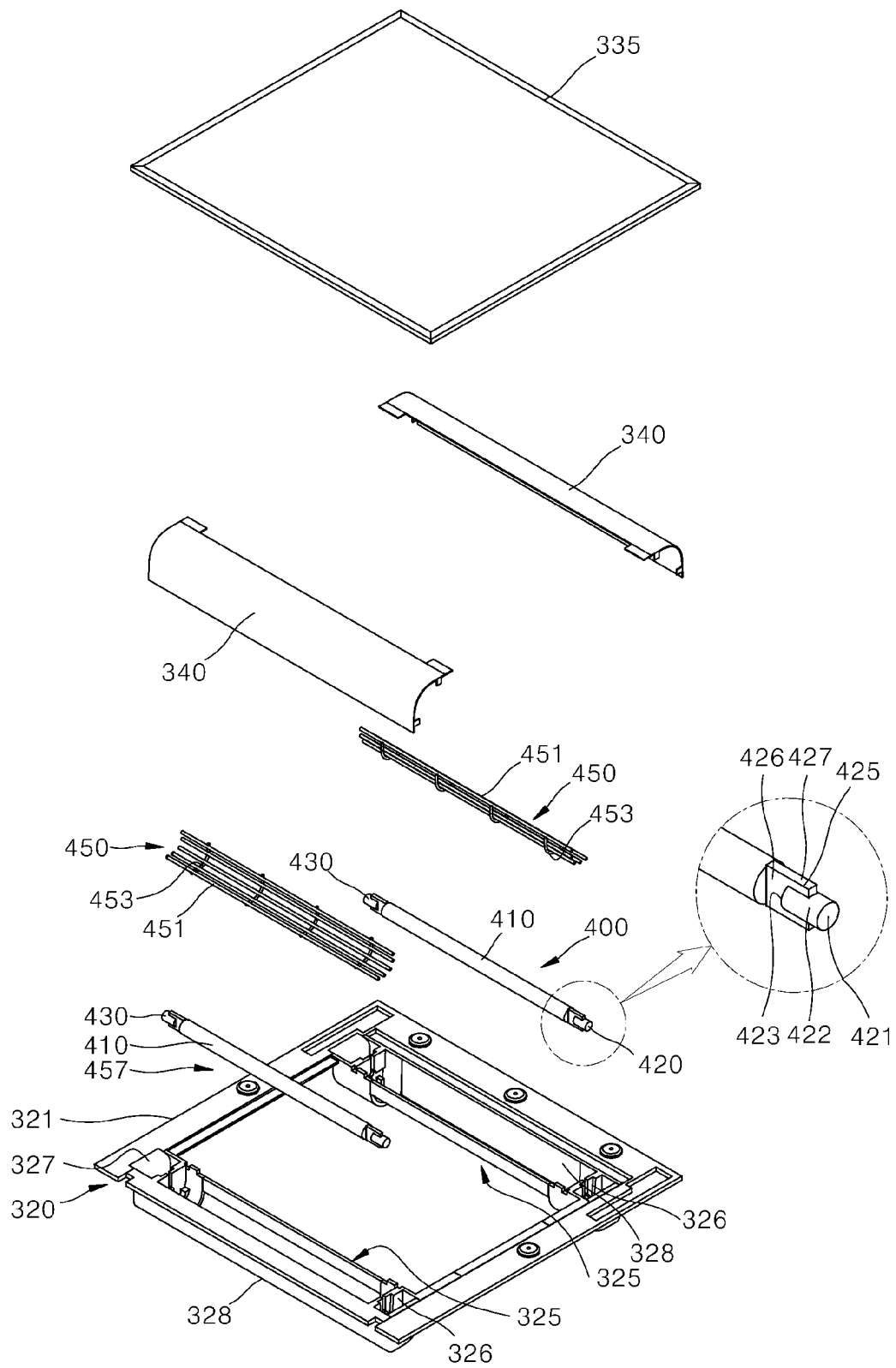
FIG. 36 is an exploded perspective view illustrating the door frame and the components installed on the door frame, which are illustrated in FIG. 35.

FIG. 35 is a perspective view separately illustrating a door frame and elements installed in the door frame according to an embodiment of the present disclosure, and FIG. 36 is an exploded perspective view illustrating the door frame and the elements installed in the door frame, which are illustrated in FIG. 35, in an exploded manner. Also, FIG. 37 is an enlarged view of portions of the door frame and the elements installed in the door frame, which are illustrated in FIG. 35, and FIG. 38 is a view illustrating a state in which a first heating part and a protective grille are removed from the door frame illustrated in FIG. 37.

Figure 37:
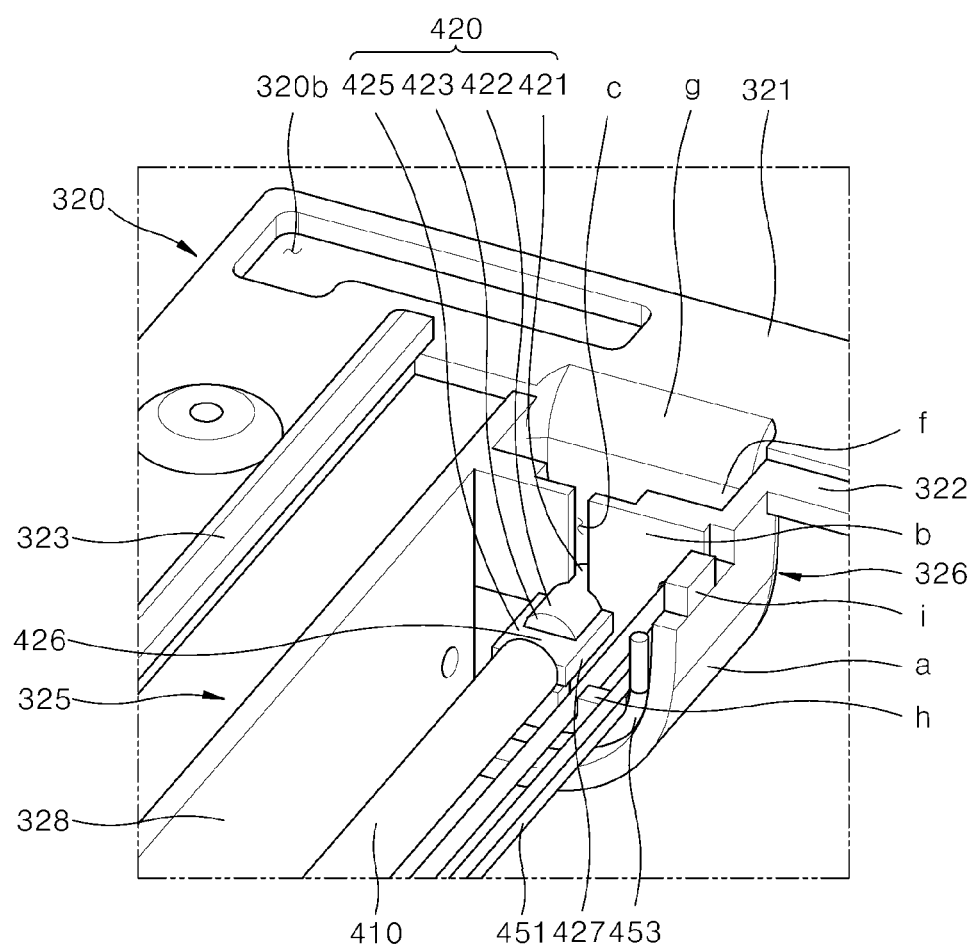
FIG. 37 is an enlarged view illustrating a part of the door frame and some of the components installed on the door frame, which are illustrated in FIG. 35.
Figure 38:
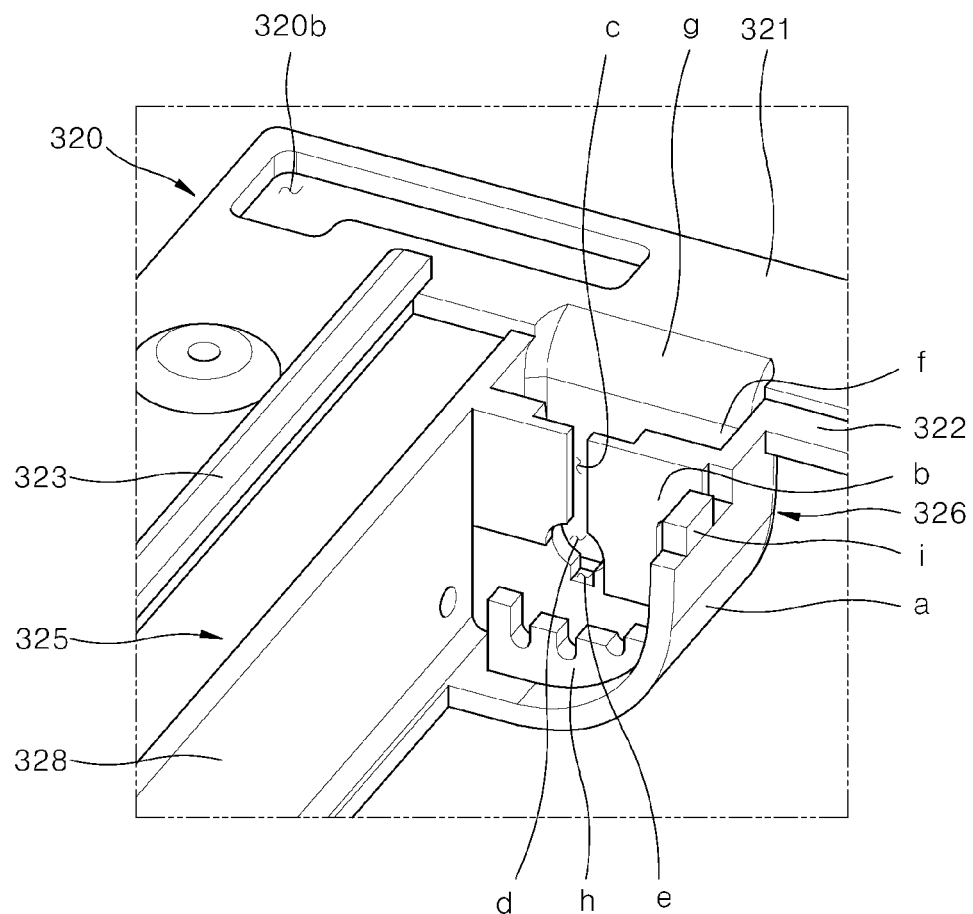
FIG. 38 is a view illustrating a state in which a first heating part and a protective grille are removed from the door frame illustrated in FIG. 37.

In FIGS. 35, 37, and 38, a glass and a reflector are not illustrated.

Referring to FIGS. 35 to 38, the door frame 320 is coupled to the door 300 in such a way that the door frame 320 covers the lower portion of the door upper surface part 310. The door frame 320 may be coupled to the door 300 in such a way that the door frame 320 supports the first heating part 400. Also, the first heating part 400 coupled to the door frame 320 may be maintained in a state of being disposed in the door 300, more specifically, at the lower portion of the door upper surface part 310.

The door frame 320 may include a coupling part 321 and a heater mounting part 325. The heater mounting part 325 may be provided in the form protruding from the coupling part 321, and the first heating part 400 may be coupled to the heater mounting part 325.

The coupling part 321 may be coupled to the door upper surface part 310 so that the heater mounting part 325 is supported by the door upper surface part 310. The coupling part 321 may be provided in the form of a hollow square-shaped frame in which a through-hole is formed.

A seating surface 322 may be formed at an inner side surface of the coupling part 321 adjacent to the through-hole. The seating surface 322 may form a concave plane whose height is lower than that of an upper surface of the coupling part 321, and surrounding portions of edges of the glass 335 may be seated on the seating surface 322.

In this way, the glass 335 seated on the seating surface 322 may be disposed at upper portions of the heater mounting part 325 and the first heating part 400 installed at the heater mounting part 325 in such a way that the glass 335 covers the through-hole from the top. In this case, the seating surface 322 may form a plane whose height is lower than that of the upper surface of the coupling part 321. The seating surface 322 may form a plane whose height is lower than that of the coupling part 321 as much as a height substantially corresponding to a thickness of the glass 335. In this way, the glass 335 may be installed in the door frame 320 while being disposed at a position where the glass 335 does not protrude upward past the upper surface of the coupling part 321.

The seating surface 322 may be disposed at both sides of the through-hole in the left-right direction. The seating surface 322 may also be disposed at one side or the other side of the through-hole in the front-rear direction. In the present embodiment, the seating surface 322 is illustrated as being disposed at both sides of the through hole in the left-right direction and the front side of the through-hole. Accordingly, the glass 335 may be stably installed in the door frame 320 such that surrounding portions of three edges of the glass 335 are supported by the seating surface 322.

Also, since movement of the glass 335 in the left-right direction is restricted by the inner side surface of the coupling part 321 surrounding the seating surface 322, an installation position of the glass 335 may be guided in the left-right direction, and shaking of the glass 335 may be suppressed in the left-right direction such that the installation of the glass 335 may be stably performed.

Further, a restricting rib 323 and a stopper 324 may be further provided in the door frame 320. The restricting rib 323 may be disposed at one side of the through-hole in the front-rear direction, and the stopper 324 may be disposed at the other side of the through-hole in the front-rear direction. In the present embodiment, the restricting rib 323 is illustrated as being disposed at the rear of the through-hole, and the stopper 324 is illustrated as being disposed at the front of the through-hole.

The restricting rib 323 may be formed to protrude from the coupling part 321. Specifically, the restricting rib 323 may be formed in a shape in which a portion protruding upward from the coupling part 3321 and a portion protruding toward the through-hole from the portion protruding upward are connected in an L-shape. The restricting rib 323 interferes with a rear edge and an upper surface of the glass 335 from the rear of the glass 335, thereby restricting rearward and upward movements of the glass 335.

The stopper 324 may be formed to protrude upward from the coupling part 321. The stopper 324 interferes with a front edge of the glass 335 from the front of the glass 335, thereby restricting forward movement of the glass 335.

That is, the glass 335 may be seated on the seating surface 322 such that the surrounding portions of the three edges of the glass 335 are supported by the seating surface 322 and both sides of the glass 335 in the left-right direction are supported by the inner side surface of the coupling part 321. Also, the forward movement of the glass 335 may be restricted by the stopper 324, and the rearward and upward movements of the glass may be restricted by the restricting rib 323. In this way, the glass 335 may be stably supported and installed in the door frame 320.

Meanwhile, the first heating part 400 may include a heating element 410, a first connecting end 420, and a second connecting end 430.

The heating element 410 corresponds to a portion emitting heat in the first heating part 400 provided in the form of an electric heater. The heating element 410 may be formed in the shape of a rod having a predetermined length.

The first connecting end 420 is disposed at an end of one side of the heating element 410 in the longitudinal direction, and the second connecting end 430 is disposed at an end of the other side of the heating element 410 in the longitudinal direction.

At least one of the first connecting end 420 and the second connecting end 430 includes a cylindrical part 421 and a key-shaped part 425. In the present embodiment, both the first connecting end 420 and the second connecting end 430 are illustrated as including the cylindrical part 421 and the key-shaped part 425.

The cylindrical part 421 is disposed at an end of the heating element 410 in the longitudinal direction. The cylindrical part 421 may be formed in a cylindrical shape in which an underside of a circular shape is disposed at the outermost end portion of the first heating part 410.

The key-shaped part 425 is disposed between the heating element 410 and the cylindrical part 421. That is, the key-shaped part 425 is disposed at both side ends of the heating element 410 in the longitudinal direction, and the cylindrical part 421 is disposed at the outermost side of the heating element 410 in the longitudinal direction.

The key-shaped part 425 may be formed in a flat hexahedral shape whose thickness is smaller than a diameter of the cylindrical part 421 and whose width is larger than the diameter of the cylindrical part 421. For example, a pair of quadrilateral surfaces 426 (hereinafter referred to as "first surfaces") parallel to a width direction of the key-shaped part 425 may be disposed to be spaced apart from each other in a thickness direction of the key-shaped part 425 and form an upper surface and a lower surface of the key-shaped part 425. Also, two pairs of quadrilateral surfaces 427 (hereinafter referred to as "second surfaces") parallel to the thickness direction of the key-shaped part 425 may be disposed between the pair of first surfaces 426 and form four side surfaces of the key-shaped part 425.

In this case, the first surface 426 may be formed of a quadrilateral surface having a side longer than the diameter of the cylindrical part 421, and the second surface 427 may be formed of a quadrilateral surface having a side shorter than the diameter of the cylindrical part 421.

Therefore, when the first connecting end 420 or the second connecting end 430 is viewed in the longitudinal direction of the first heating part 410, the cylindrical part 421 may protrude outward past the key-shaped part 425 in the radial direction of the cylindrical part 421 in most of the region, and the key-shaped part 425 may protrude outward past the cylindrical part 421 in the radial direction of the cylindrical part 421 only in a portion of the region.

The heater mounting part 325 is provided to fix the first connecting end 420 and the second connecting end 430 which are provided as described above. The heater mounting part 325 may include a first connecting end fixing part 326 which fixes the first connecting end 420 and a second connecting end fixing part 327 which fixes the second connecting end 430.

At least one of the first connecting end fixing part 326 and the second connecting end fixing part 327 may include a cover a and a support wall b. In the present embodiment, both the first connecting end fixing part 326 and the second connecting end fixing part 327 are illustrated as identically including the cover a and the support wall b.

The cover a is provided in the form of surrounding the surrounding portions of the connecting end from the outer side of the connecting end in the circumferential direction. The cover a may be formed in a curved shape surrounding a lower portion and one side portion of the connecting end and may be formed in a length corresponding to a length of each connecting end or in a length slightly longer than the length of each connecting end.

Further, the heater mounting part 325 may further include a shielding plate 328. The shielding plate 328 is disposed at a side farther from the center of the cooking compartment in the front-rear direction than the first heating part 400 and connects the first connecting end fixing part 326 and the second connecting end fixing part 327 to each other. The shielding plate 328 may be formed in the shape of a plate having a length extending in the longitudinal direction of the first heating part 400.

According to the present embodiment, the first connecting end fixing part 326 and the second connecting end fixing part 327 are disposed at both end portions of the first heating part 400 in the longitudinal direction. Also, the shielding plate 328 is disposed at a side farther from the center of the cooking compartment in the front-rear direction than the first heating part 400, of a front side and a rear side of the first heating part 400.

Also, the cover a is disposed at a side closer to the center of the cooking compartment in the front-rear direction than the first heating part 400, of the front side and the rear side of the first heating part 400. The cover a may surround the connecting end at a lower portion of the first heating part 400 and at the side closer to the center of the cooking compartment in the front-rear direction than the first heating part 400.

A lower side of the cover a is connected to the shielding plate 328. Accordingly, a space surrounded by the cover a and the shielding plate 328, which are connected in a U-shape, is formed around the connecting end.

The support wall b is disposed in the space surrounded by the cover a and the shielding plate 328 as described above. The support wall b may be formed in the form protruding toward the space from the cover a and the shielding plate 328. The support wall b formed in this way may divide the space surrounded by the cover a and the shielding plate 328 into an inner side space and an outer side space in the longitudinal direction of the first heating part 400. Also, the connecting end may be fitted and coupled to the support wall b.

A coupling hole c and a through-hole d may be formed in the support wall b.

The coupling hole c may be formed to pass through the support wall b. The coupling hole c may have a shape corresponding to the shape of an outer circumferential surface of the cylindrical part 421, e.g., a hollow circular shape. By the cylindrical part 421 being fitted to the coupling hole c having the above-described shape, the connecting end may be fitted and coupled to the support wall b.

The through-hole d may be formed to pass through the support wall b. The through-hole d may be formed by being cut out up to the coupling hole c from an upper side end portion of the support wall b. The through-hole d may be formed to pass through the support wall b while having a width corresponding to the length of the short side of the key-shaped part 425. In this way, the through-hole d may form a passage connecting the coupling hole c and an outer portion of the support wall b to each other.

The through-hole d may be formed in a width corresponding to the length of the short side of the key-shaped part 425, in other words, the thickness of the key-shaped part 425.

Any one of the first connecting end 420 and the second connecting end 430 may pass through the through-hole d and be inserted into the coupling hole c in a state in which the first heating part 400 takes a first posture. Here, the first posture is defined as a posture of the first heating part 400 in which the surface parallel to the thickness direction of the key-shaped part 425, that is, the second surface 427, is disposed parallel to a width direction of the through-hole d (see FIG. 40).

Further, an extension hole e may be further formed in the support wall b. The extension hole e may be formed to pass through the support wall b like the through-hole d. The extension hole e may be formed in the shape in which the through-hole d formed at an upper portion of the coupling hole c passes through the coupling hole c and extends to the lower portion of the coupling hole c.

When the connecting end takes the first posture, the key-shaped part 425 protrudes more upward and downward than the cylindrical part 421. Also, when the connecting end takes the first posture, for the cylindrical part 421 to reach a state in which the cylindrical part 421 is allowed to be inserted into the coupling hole c, the cylindrical part 421 and the coupling hole c should be disposed at the same height. However, for the cylindrical part 421 and the coupling hole c to be disposed at the same height, the portion of the key-shaped part 425 protruding downward should be disposed at a lower position than the coupling hole c.

To this end, the extension hole e may be formed at the lower portion of the coupling hole c, and the portion of the key-shaped part 425 protruding downward may be inserted into the extension hole e. That is, the extension hole e may provide a passage that allows the portion protruding downward of the key-shaped part 425, which is inserted into the coupling hole c by taking the first posture, to pass through the coupling hole c downward.

Also, the connecting end may further include an extension part 422. The extension part 422 may be formed by the cylindrical part 421 extending toward the key-shaped part 425. The extension part 422 is formed to protrudes outward in the thickness direction of the key-shaped part 425 from the first surface 426 of the key-shaped part 425 so that a step 423 is formed at a surface of the extension part 422 parallel to the width direction of the key-shaped part 425, that is, between the extension part 422 and the first surface 426. By the extension part 422 formed in this way, a region in which the extension part 422 and the key-shaped part 425 overlap each other is formed in a portion of the key-shaped part 425 adjacent to the cylindrical part 421.

In this region, the extension part 422 protrudes further in the thickness direction of the key-shaped part 425 than the first surface 426 of the key-shaped part 425, and the second surface 427 of the key-shaped part 425 protrudes further in the width direction of the key-shaped part 425 than the extension part 422.

Since the extension part 422 is formed as described above, a strength of a coupling portion between the cylindrical part 421 and the key-shaped part 425 may be further reinforced. When the extension part 422 is not present, the coupling portion between the cylindrical part 421 and the key-shaped part 425 would be limited to an end portion of a side surface of the key-shaped part 425. However, since the extension part 422 is formed at the connecting end, the coupling portion between the cylindrical part 421 and the key-shaped part 425 may extend to the point where the extension part 422 and the key-shaped part 425 overlap each other, and thus the strength of the coupling portion between the cylindrical part 421 and the key-shaped part 425 may be further reinforced.

Also, the step 423 formed due to the extension part 422 may serve to guide a position at which the key-shaped part 425 is inserted into the through-hole d when the connecting end and the support wall b are fitted and coupled to each other. This will be described in detail below.

Meanwhile, each of the first connecting end fixing part 326 and the second connecting end fixing part 327 may further include an outer wall f. The outer wall f may be disposed at an outer side of each support wall b in a longitudinal direction of the heating element 410 and may be connected to the inner side surface of the coupling part 321. The outer wall f forms the outermost side wall of each of the first connecting end fixing part 326 and the second connecting end fixing part 327 in the longitudinal direction of the heating element 410.

A space surrounded by the cover a, the support wall b, the outer wall f, and the shielding plate 328 is formed in each of the first connecting end fixing part 326 and the second connecting end fixing part 327. The corresponding space is a space whose side portion is surrounded by the cover a, the support wall b, the outer wall f, and the shielding plate 328 and whose lower portion is surrounded by the cover a. At least a portion of the cylindrical part 421 at a fixing end fixed to the first connecting end fixing part 326 or the second connecting end fixing part 327 is inserted into the space.

In the space, the cylindrical part 421 may be connected to a cable. The cable connected to the cylindrical part 421 may be a signal cable which transmits a control signal generated in the first control board 500 (see FIG. 7) to the first heating part 400, may be a power cable which supplies power to the first heating part 400, or may be both the signal cable and the power cable.

As illustrated in FIG. 7, the signal cable and the power cable are installed at the cable mounting parts 340 and 345 provided in the door upper surface part 310. Also, the coupling between the door upper surface part 310 and the door frame 320 is performed in a state in which the coupling part 321 covers the portions where the cable mounting parts 340 and 345 are disposed.

A plurality of fastening bosses 341 and 346 may be disposed in the cable mounting parts 340 and 345. Also, a plurality of fastening holes 320a may be disposed in the door frame 320 so as to correspond to the fastening bosses 341 and 346. When portions where the fastening holes 320a and the fastening bosses 341 and 346 are formed are fastened using a fastening member after matching the positions of the door upper surface part 310 and the door frame 320 so that the positions of the fastening holes 320a and the fastening bosses 341 and 346 match each other, the coupling between the door upper surface part 310 and the door frame 320 may be performed. In this case, the portions where the cable mounting parts 340 and 345 are disposed are covered by the coupling part 321.

Although the glasses 330 and 335 do not cover the portions where the cable mounting parts 340 and 345 are disposed, the first heating part 400 and the heater mounting part 325 are disposed at a lower portion of a region covered by the glass 335. Therefore, for the cables installed at the cable mounting parts 340 and 345 to be connected to the connecting end, as illustrated in FIGS. 36 to 39, a passage should be formed between the region of the coupling part 321 not covered by the glass 335 and the region of the heater mounting part 325 covered by the glass 335.

In consideration of such an aspect, in the present embodiment, a concave groove g is provided in a connecting portion between the outer wall f and the coupling part 321. At the connecting portion between the outer wall f and the coupling part 321, the concave groove g forms the upper surface of the coupling part 321, more specifically, a surface more concave than the seating surface 322 of the coupling part 321. The concave groove g formed in this way allows a gap through which the cable may pass to be formed at a lower portion of the glass 335 seated on the seating surface 322, thereby allowing a passage through which the cable may pass to be formed between the cable mounting parts 340 and 345 (see FIG. 7) and the space housing the cylindrical part 421 of the connecting end.

Meanwhile, the reference numeral "320b" which has not been described above indicates a hole formed in the door frame 320 to pass through the door frame 320 to form, on the door frame 320, a passage for allowing the hinge part 810 (see FIG. 2) to pass through the door frame 320.

Meanwhile, the cooking appliance of the present embodiment may further include a reflector 440 and a protective grille 450.

The reflector 440 is provided as an element which reflects heat of the first heating part 400 so that the heat of the first heating part 400 may be concentrated on the tray 200 (see FIG. 2.). In the present embodiment, the reflector 440 is illustrated as being provided in the shape in which a reflective surface forming a plane parallel to the shielding plate 328 and a reflective surface forming a plane parallel to the glass 335 are connected to each other in an L-shape. The reflector 440 may be coupled to the shielding plate 328, thereby being installed in the door frame 320.

The reflector 440 installed as described above may reflect heat of the first heating part 400 while blocking the first heating part 400 and the shielding plate 328 from each other and blocking the first heating part 400 and the glass 335 from each other, thereby contributing to the concentration of the heat of the first heating part 400 on the tray 200.

The protective grille 450 is provided as an element for protecting the first heating part 400 while allowing the heat of the first heating part 400 to be transmitted to the tray 200. The protective grille 450 is disposed to be spaced apart from the shielding plate 238 with the first heating part 400 disposed therebetween.

The protective grille 450 may include a plurality of steel wires 451 and a plurality of fixing members 453. Each steel wire 451 has a length extending in the longitudinal direction of the first heating part 400 in such a way that each steel wire 451 has a length substantially corresponding to the length of the first heating part 400 or a length slightly longer than the length of the first heating part 400.

The plurality of steel wires 451 are arranged in the form surrounding the surrounding portion of the first heating part 400 from the outside of the first heating part 400 in the circumferential direction. The plurality of steel wires 451 may be disposed to be spaced a predetermined distance apart from each other in the circumferential direction of the first heating part 400.

According to the present embodiment, the surrounding portion of the first heating part 400 in the circumferential direction is surrounded by the reflector 440 and the protective grille 450. That is, one side of the first heating part 400 in the front-rear direction and an upper portion of the first heating part 400 are surrounded by the reflector 440, and the remaining portions of the first heating part 400, that is, the other side of the first heating part 400 in the front-rear direction and the lower portion of the first heating part 400 are surrounded by the protective grille 450.

Accordingly, the plurality of steel wires 451 are arranged in the form of surrounding the other side of the first heating part 400 in the front-rear direction and the lower portion of the first heating part 400 from the outer side of the first heating part 400 in the circumferential direction. Also, the fixing members 453 are formed in the form extending in the direction in which the steel wires 451 are arranged. The plurality of fixing members 453 may be disposed to be spaced a predetermined distance apart from each other in the longitudinal direction of the steel wires 451.

The protective grille 450 may be installed in the door frame 320 in such a way that both side end portions of the protective grille 450 in the longitudinal direction are respectively fixed to the first connecting end fixing part 326 and the second connecting end fixing part 327.

To this end, a grille fixing part may be provided in each of the first connecting end fixing part 326 and the second connecting end fixing part 327. The grille fixing part is provided as a means for fixing the steel wires 451 of the protective grille 450 to the heater mounting part 325. The grille fixing part may include a plurality of fixing ribs h.

The plurality of fixing ribs h are disposed to be spaced a predetermined distance apart from each other in the direction in which the plurality of steel wires 451 are arranged. Also, each fixing rib h is formed to protrude from the cover a toward the first heating part 400. Accordingly, a fixing groove may be formed between the fixing ribs h. The distance at which the fixing ribs h are spaced apart from each other may be determined to allow the fixing groove to be formed in a width corresponding to a thickness of the steel wire 451.

By fitting and fixing the steel wire 451 to each fixing groove formed between the plurality of fixing ribs h as described above, the protective grille 450 and the grille fixing part may be fitted and coupled to each other. In this way, a task of installing the protective grille 450 in the door frame 320 may be easily and promptly performed just by a simple task of fitting and fixing both side end portions of the protective grille 450 to the grille fixing part formed at each of the first connecting end fixing part 326 and the second connecting end fixing part 327.

Further, the plurality of fixing ribs h formed to protrude from the cover a as described above may also serve as reinforcing structures for improving the strength of the cover a.

FIGS. 39 to 43 are views for showing a process in which the first heating part is installed in the door frame.

Hereinafter, the process in which the first heating part 400 is installed in the door frame 320 will be described with reference to FIGS. 39 to 43.

Figure 39:
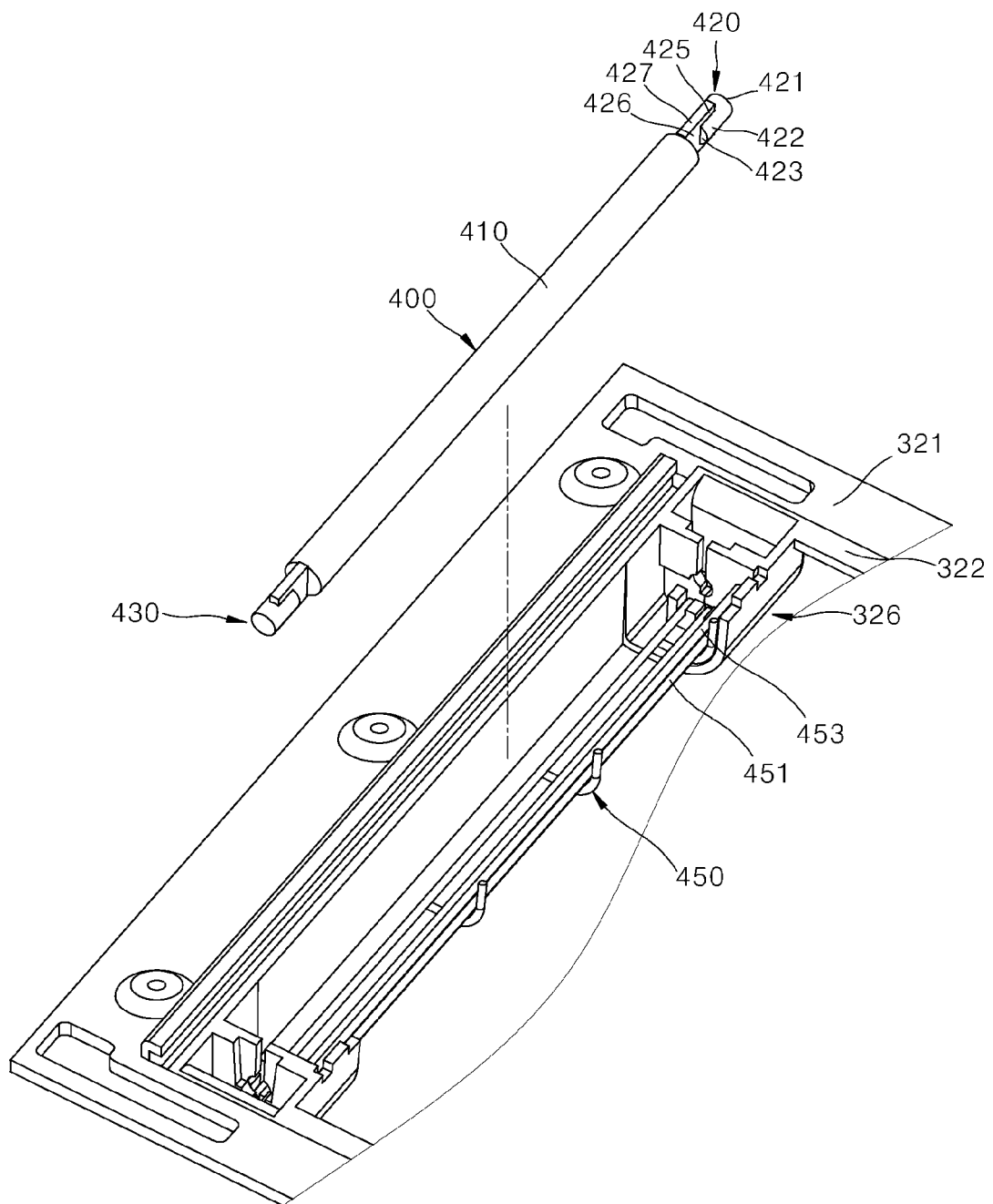
FIGS. 39 to 43 are views for showing a process in which the first heating part is installed on the door frame.

Referring to FIG. 39, installation of the protective grille 450 may be performed prior to installing the first heating part 400 in the door frame 320. The installation of the protective grille 450 may be performed in the form in which both side end portions of the protective griller 450 in the longitudinal direction are respectively fixed to the first connecting end fixing part 326 and the second connecting end fixing part 327. In this case, fixing of each end portion of the protective grille 450 may be performed in the form in which the steel wires 451 are fitted to the fixing grooves formed between the plurality of fixing ribs h so that the protective grille 450 and the grille fixing part are fitted and coupled to each other.

The installation of the first heating part 400 may be performed in a state in which the installation of the protective grille 450 is completed. For the first heating part 400 to be installed in the door frame 320, first, the first heating part 400 should take the first posture. In this case, both the first connecting end 420 and the second connecting end 430 reach a state in which the pair of first surfaces 426 face forward and downward and, of the two pairs of second surfaces 427, the pair of second surfaces 427 facing each other face upward and downward.

Figure 40:
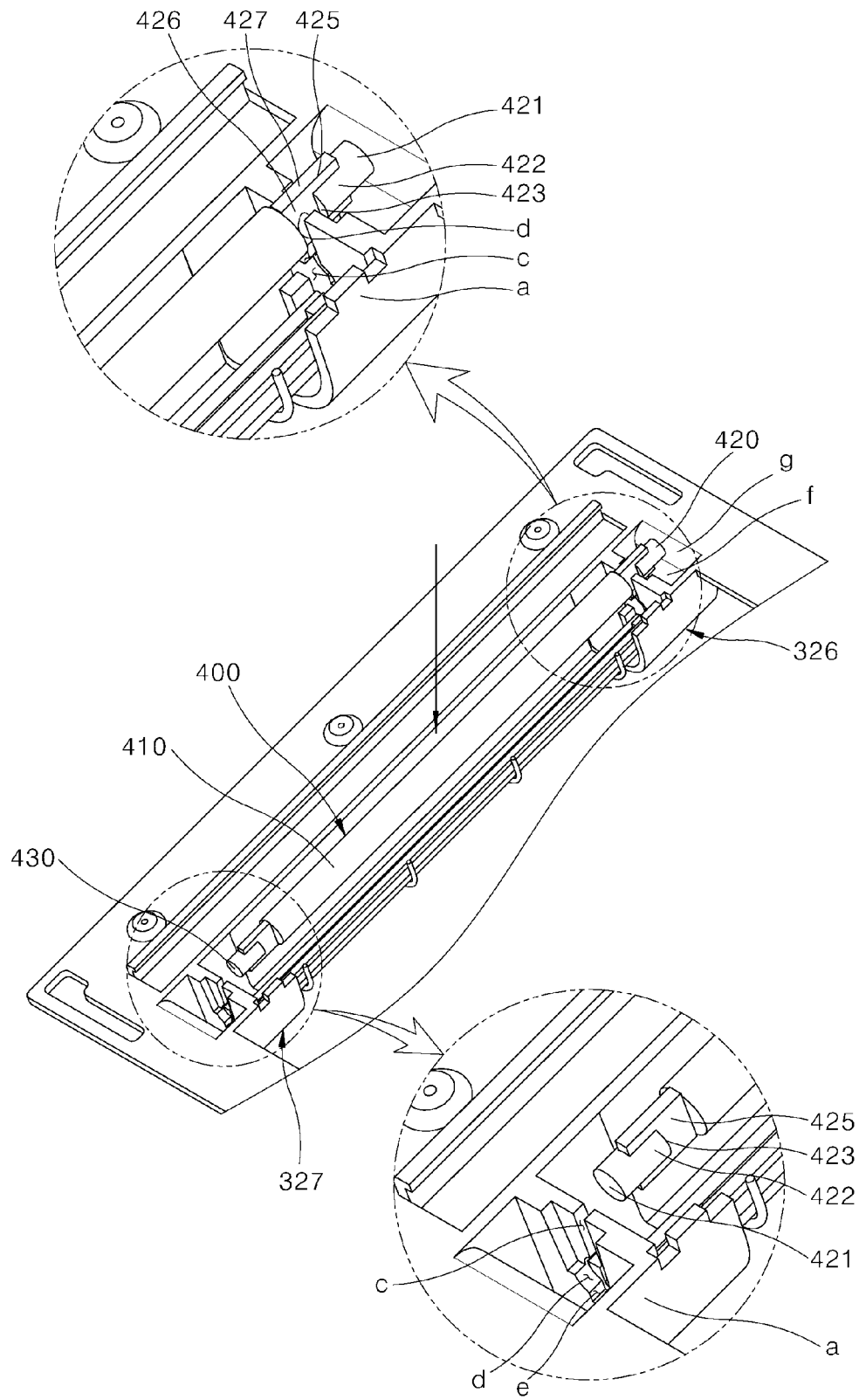

In this state, as illustrated in FIG. 40, any one of the first connecting end 420 and the second connecting end 430 is fitted into the support wall b. In the present embodiment, an example in which the first connecting end 420 is fitted to the support wall b provided in the first connecting end fixing part 326 is illustrated.

For the first connecting end 420 to be fitted into the support wall b, the first connecting end 420 should be inserted into the through-hole d formed in the support wall b. To this end, the first connecting end 420 is inserted into the through-hole d in a state in which the position of the key-shaped part 425 matches the position of the through-hole d. In this process, the key-shaped part 425 is inserted into the through-hole d through a cut-out upper end of the support wall b and passes through the through-hole d to be inserted into the coupling hole c.

In this case, the second connecting end 430 maintains a state of not being fitted to the second connecting end fixing part 327. That is, even when the first heating part 400 moves downward in the state in which the key-shaped part 425 of the first connecting end 420 is inserted into the coupling hole c, the second connecting end 430 is not fitted to the support wall b and maintains a state of being disposed at a right side of the support wall b.

In order to be fitted into the support wall b, the first connecting end 420 may be guided in the longitudinal direction to a position at which a region between a longitudinal end portion of the heating element 410 and the extension part 422 (hereinafter referred to as "depressed region") may overlap the through-hole d. That is, in the first connecting end 420, a portion able to pass through the through-hole d is limited to the depressed region. The depressed region may be clearly distinguished due to the characteristic of being depressed between the longitudinal end portion of the heating element 410 and the extension part 422.

When a length of the depressed region is set to be substantially equal to the thickness of the support wall b or slightly longer than the thickness of the support wall b, the first heating part 400 may be easily guided to a position which allows the second connecting end 430 to maintain the state of not being fitted to the support wall b of the second connecting end fixing part 327 while the first connecting end 420 is fitted to the support wall b of the first connecting end fixing part 326.

To this end, a separation distance $L_1$ between the support wall b of the first connecting end fixing part 326 and the support wall b of the second connecting end fixing part 327 satisfies the following relational expression.

$$L_H = L_{H1} + 2L_{H2} + 2L_{H3}$$

$$L_1 = L_H - L_{H2} - L_{H3}$$

Here, $L_H$ is the entire length of the first heating part, $L_{H1}$ is a length of the heating element, $L_{H2}$ is a distance between one side end portion of the heating element and a step, and $L_{H3}$ is a distance between the step and the outermost side end portion of the cylindrical part. Further, $L_{H2}$ may also be referred to as a length of the depressed region as well as the distance between the one side end portion of the heating element and the step.

That is, the separation distance $L_1$ between the support wall b of the first connecting end fixing part 326 and the support wall b of the second connecting end fixing part 327 is set to a length equal to a length excluding one connecting end from the heating element 410 and the pair of connecting ends 420 and 430 constituting the first heating apart 400.

When the separation distance $L_1$ between the support wall b of the first connecting end fixing part 326 and the support wall b of the second connecting end fixing part 327 is set as described above, when the depressed region of the first connecting end 420 is inserted into the through-hole d and fitted into the support wall b of the first connecting end fixing part 326, the second connecting end 430 maintains the state of not being fitted into the support wall b of the second connecting end fixing part 327.

Figure 41:
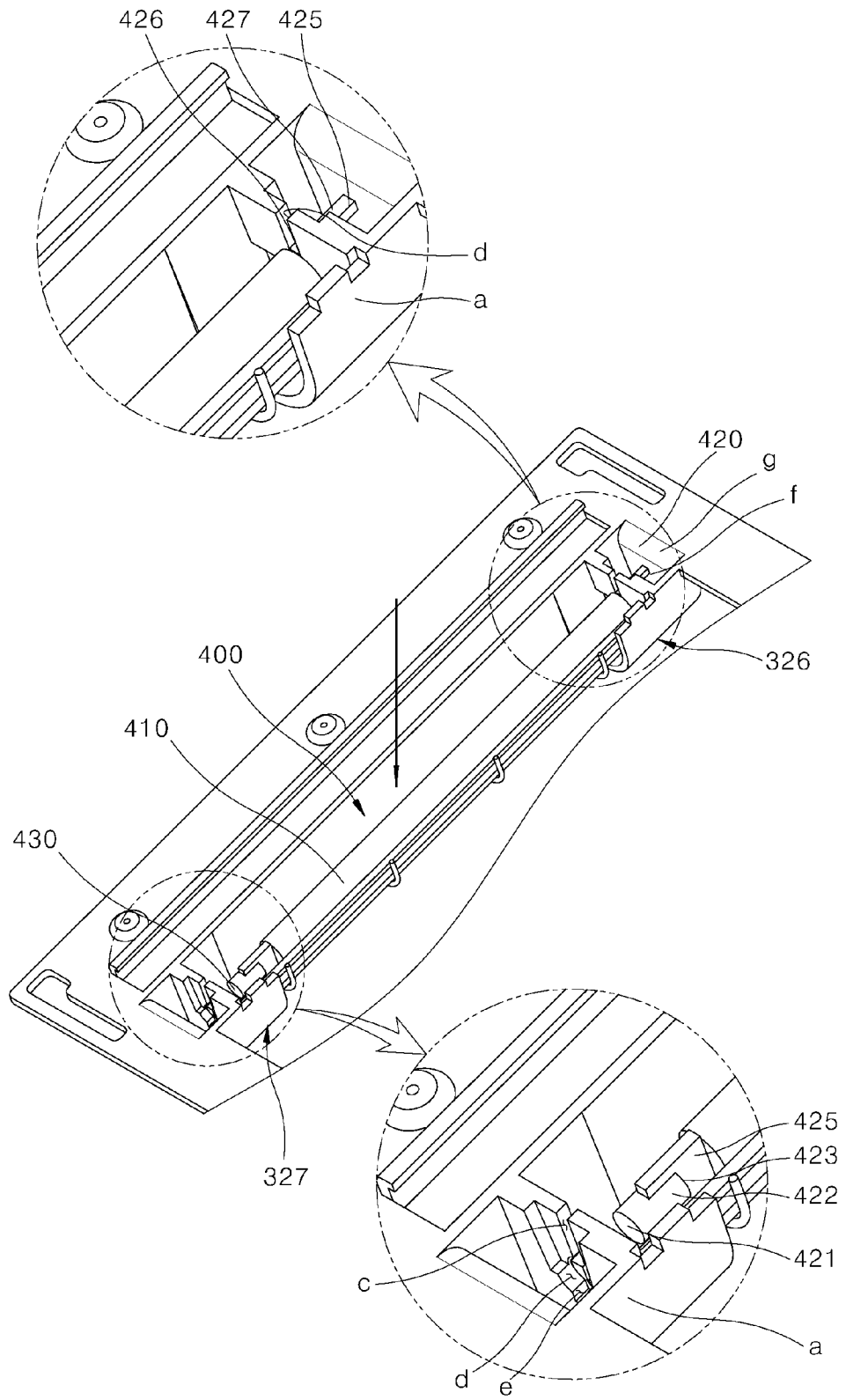

Meanwhile, as illustrated in FIG. 41, when the depressed region of the key-shaped part 425 passes through the through-hole d and is inserted into the coupling hole c, and thus the state in which the cylindrical part 421 is disposed at the same height as the coupling hole c is reached, the portion of the key-shaped part 425 protruding downward is inserted into the extension hole e, and the state in which the first connecting end 420 is unable to further move downward is reached.

Figure 42:
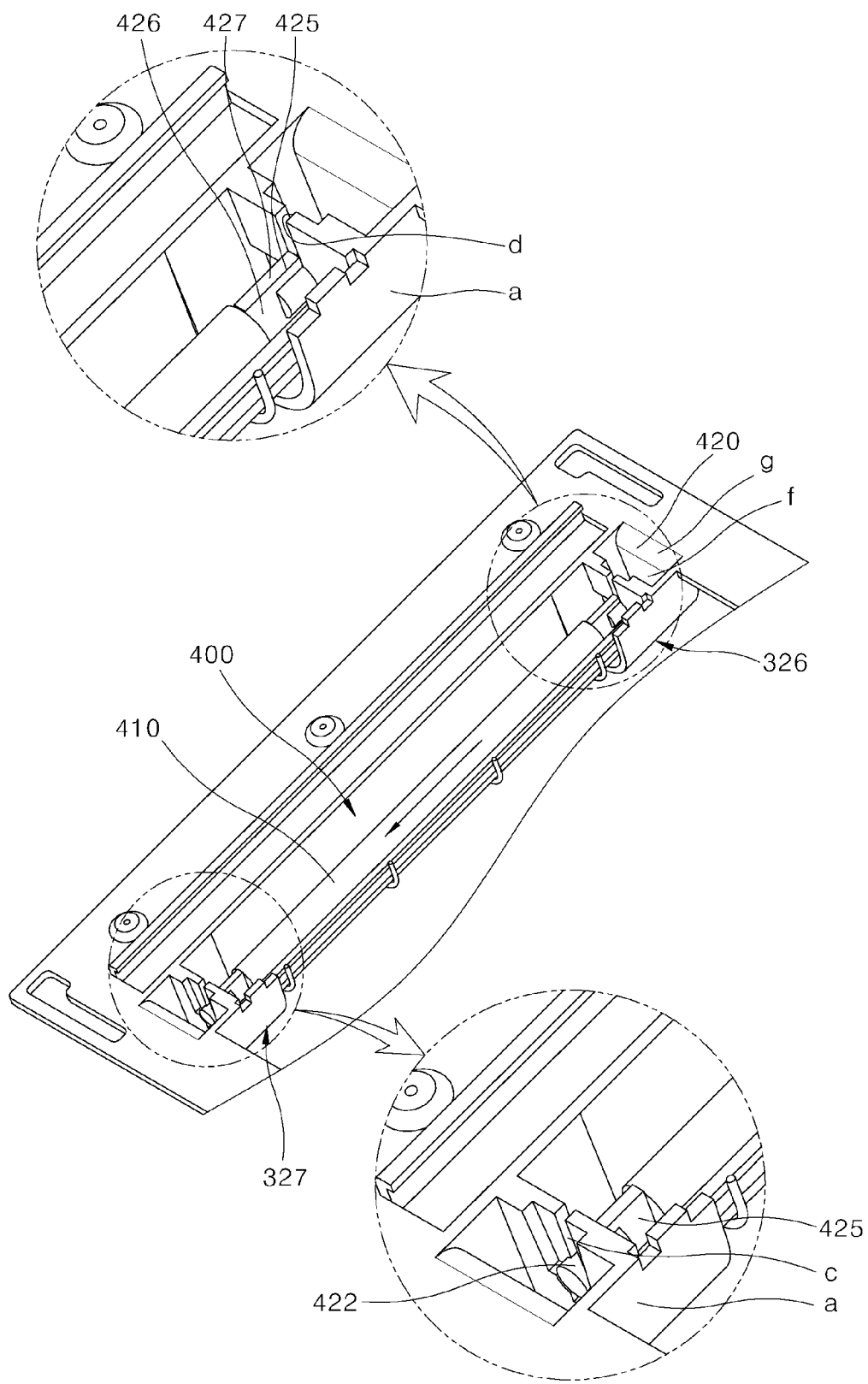

In this state, as illustrated in FIG. 42, the entire first heating part 400 is moved in the longitudinal direction of the first heating part 400 while moving the heating element 410 in a direction moving away from the support wall b of the first connecting end fixing part 326. Accordingly, the key-shaped part 425 of the first connecting end 420 is separated from the support wall b. That is, the key-shaped part 425 of the first connecting end 420 is deviated from the coupling hole c, the through-hole d, and the extension hole e, and instead, the cylindrical part 421 is inserted into the coupling hole c such that the cylindrical part 421 of the first connecting end 420 and the support wall b of the first connecting end fixing part 326 are fitted and coupled to each other.

At the same time, in the second connecting end fixing part 327, the cylindrical part 421 of the second connecting end 420 is inserted into the coupling hole c, and accordingly, the cylindrical part 421 of the second connecting end 430 and the support wall b of the second connecting end fixing part 327 are fitted and coupled to each other. In this case, the state in which the key-shaped part 425 of the second connecting end 420 is separated from the support wall b, that is, the state in which the key-shaped part 425 of the second connecting end 420 is not inserted into the coupling hole c, the through-hole d, and the extension hole e is also maintained in the second connecting end fixing part 327.

To this end, the separation distance $L_1$ between the support wall b of the first connecting end fixing part 326 and the support wall b of the second connecting end fixing part 327 satisfies the following relational expression.

$$L_1 = L_{H1} + 2L_{H4}$$

Here, $L_{H4}$ is a length of the key-shaped part 425.

That is, the separation distance $L_1$ between the support wall b of the first connecting end fixing part 326 and the support wall b of the second connecting end fixing part 327 is set to a length equal to a length including the heating element 410 and the pair of key-shaped parts 425.

When the separation distance $L_1$ between the support wall b of the first connecting end fixing part 326 and the support wall b of the second connecting end fixing part 327 are set as described above, when both the cylindrical part 421 of the first connecting end 420 and the cylindrical part 421 of the second connecting end 430 are fitted to the support walls b, both the key-shaped part 425 of the first connecting end 420 and the key-shaped part 425 of the second connecting end 430 maintain the state of not being fitted to the support walls b.

Figure 43:
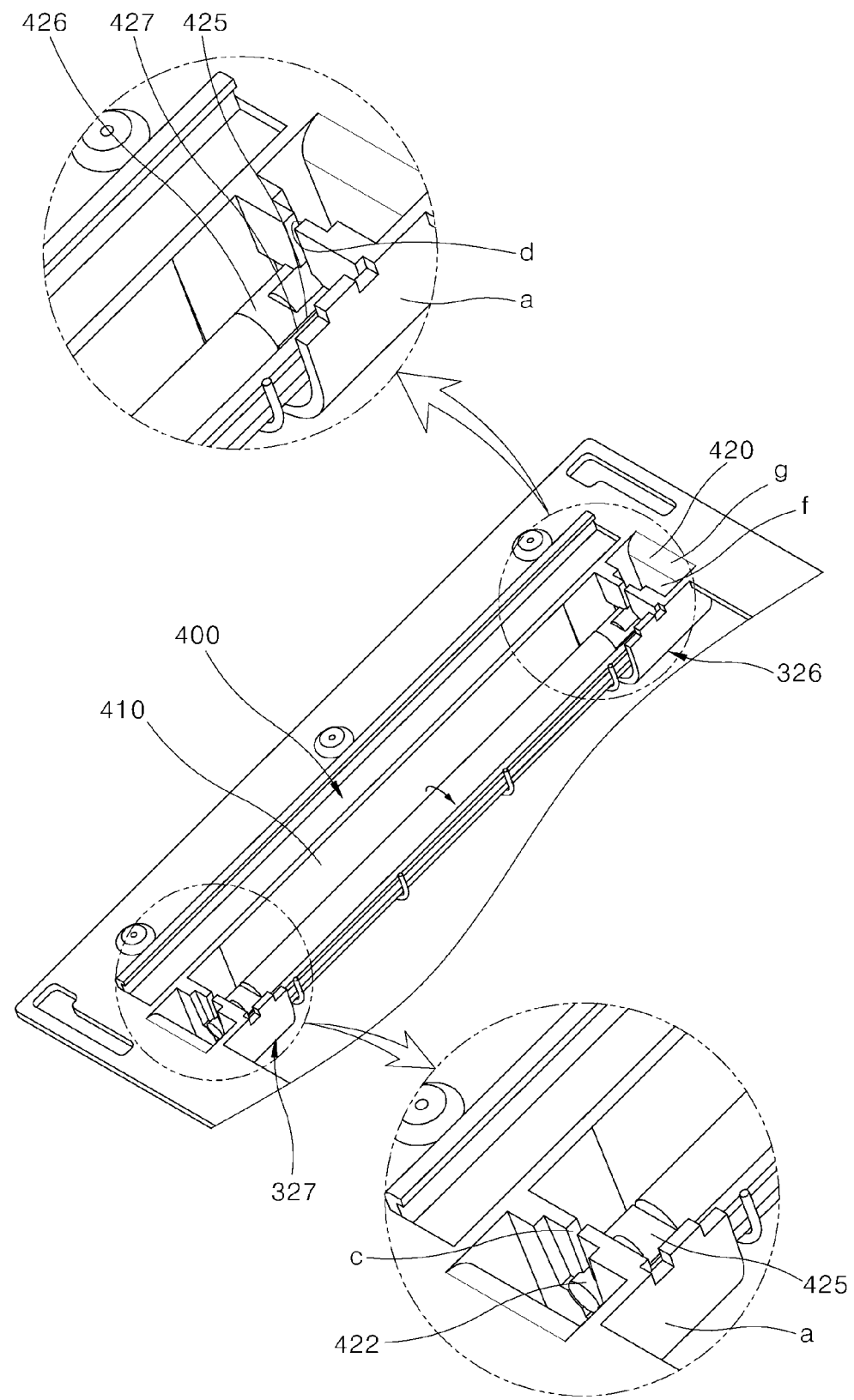

In this state, as illustrated in FIG. 43, when the posture of the first heating part 400 is changed to a second posture, the installation of the first heating part 400 is completed. Here, the second posture is defined as a posture of the first heating part 400 in which the first surface 426 of the key-shaped part 425 is disposed parallel to the width direction of the through-hole d. The second posture of the first heating part 400 may be a state reached by the first heating part 400 rotating 90° about the longitudinal axis of the first heating part 400 from the first posture.

As the posture of the first heating part 400 is changed as described above, the key-shaped part 425 disposed at each of both side end portions of the first heating part 400 may be adhered to the support wall b, and accordingly, the first heating part 400 may be fixed to the heater mounting part 325 in a state in which the movement of the first heating part 400 is restricted in the longitudinal direction.

This may correspond to the advantageous effect obtained by designing the shapes of the first heating part 400 and the heater mounting part 325 so that the separation distance $L_1$ between the support wall b of the first connecting end fixing part 420 and the support wall b of the second connecting end fixing part 430 satisfies the relational expression, $$L_1 = L_{H1} + 2L_{H4}.$$

Further, a separation distance $L_2$ between the support wall b and the outer wall f satisfies the following relational expression.

$$L_2 \geq L_{H3}$$

That is, the separation distance $L_2$ between the support wall b and the outer wall f is set to a length longer than a length between the step 423 and the outermost side end portion of the cylindrical part 421.

When the separation distance $L_2$ between the support wall b and the outer wall f is set as described above, a space having a length corresponding to the separation distance $L_2$ is formed between the support wall b and the outer wall f. The extension part 422 and the cylindrical part 421 are inserted into the space formed between the support wall b and the outer wall f. Also, in the space, the connection between the cables and the connecting ends may be performed. That is, when the separation distance $L_2$ between the support wall b and the outer wall f is set as described above, a sufficient space required for the insertion of the extension part 422 and the cylindrical part 421 and the connection between the cables and the connecting ends may be provided.

When the installation of the first heating part 400 is completed as described above, the installation of the reflector 440 may be performed. The installation of the reflector 440 may be performed in the form in which the reflector 440 is coupled to the shielding plate 328.

Then, when the glass 335 (see FIG. 35) is seated on the seating surface 332 of the door frame 320 and then fixed by the restricting rib 323 and the stopper 324, the installation of the glass 335 is completed.

The task of connecting the connecting ends and the cables may be performed before or after the process of installing the glass 335. Once all of these processes are completed, the door frame 320, the first heating part 400, the reflector 440, the protective grille 450, and the glass 335 may be provided as an integrally-assembled unit body. Also, when the door frame 320 which is integrally assembled with the first heating part 400, the reflector 440, the protective grille 450, and the glass 335 as described above is coupled to the door upper surface part 310 (see FIG. 1), the first heating part 400, the reflector 440, the protective grille 450, and the glass 335 may be assembled to the door 300 at once.

Although not illustrated, once the installation of the first heating part 400 and the task of connecting the connecting ends and the cables are completed, open upper portions of the first connecting end fixing part 326 and the second connecting end fixing part 327 (see FIG. 35) may be covered with caps so that the connecting ends are protected. For coupling between the caps and the first connecting end fixing part 326 and the second connecting end fixing part 327, a coupling protrusion i may be provided to protrude from an upper portion of the cover a.

The door frame 320 of the present embodiment having the above-described configuration may provide the following advantageous effects.

First, since the door frame 320 is coupled to the lower portion of the door upper surface part 310, the door frame 320 may cover the lower portion of the door upper surface part 310 so that the cable mounting parts 340 and 345 (see FIG. 7) disposed inside the door upper surface part 310 and the cables installed at the cable mounting parts 340 and 345 are not exposed to the outside.

The door frame 320 may be coupled to the lower portion of the door upper surface part 310 in the form in which, while the portions where the cable mounting parts 340 and 345 are disposed are covered by the coupling part 321, the door frame 320 is fastened to the cable mounting parts 340 and 345 using a fastening member. The door frame 320 coupled to the lower portion of the door upper surface part 310 in this way may cover the cable mounting parts 340 and 345 (see FIG. 7) disposed inside the door upper surface part 310 and the cables installed at the cable mounting parts 340 and 345 so that the cable mounting parts 340 and 345 and the cables are not exposed to the outside, and the door frame 320 may be easily separated from the door 300 when necessary. Since the door frame 320 may safely protect the components inside the door upper surface part 310 while being easily separable when necessary, the door frame 320 may contribute to allowing maintenance and repair tasks of the cooking appliance to be performed easily and promptly.

Second, the door frame 320 provides a frame in which the first heating part 400, the components related thereto, and the glass 335 may be assembled to a single unit body. In this way, the door frame 320 may contribute to allowing the components management and manufacturing management to be more efficiently performed.

In addition to the structures for fixing the glass 335 to the door frame 320, the structures for fixing the first heating part 400, the reflector 440, and the protective grille 450 to the door frame 320 are provided in the door frame 320.

Accordingly, the glass 335, the first heating part 400, the reflector 440, and the protective grille 450 may be provided as an integrally-assembled unit body coupled to the door frame 320, and the glass 335, the first heating part 400, the reflector 440, and the protective grille 450 may be assembled at once just by coupling the door frame 320 to the lower portion of the door upper surface part 310.

Third, since the door frame 320 provides structures that allow the first heating part 400 to be easily and promptly installed at the door frame 320, the door frame 320 may contribute to allowing the task of installing the first heating part 400 to be more efficiently performed.

According to the present embodiment, the installation of the first heating part 400 may be completed by a simple task in which one side end portion of the first heating part 400 is first fitted to any one of the first connecting end fixing part 326 and the second connecting end fixing part 327, the first heating part 400 is moved in the longitudinal direction thereof so that both side end portions of the first heating part 400 are respectively fitted to the first connecting end fixing part 326 and the second connecting end fixing part 327, and then the first heating part 400 is rotated.

In this case, since the first connecting end fixing part 326 and the second connecting end fixing part 327 are not provided to be directional, the installation of the first heating part 400 is possible without problems regardless of which of the first connecting end fixing part 326 and the second connecting end fixing part 327 is first fitted to the one side end portion of the first heating part 400.

In this way, by allowing the task of installing the first heating part 400 to be performed more efficiently, the door frame 320 may contribute to allowing maintenance and repair tasks performed for replacing the first heating part 400, as well as the task of manufacturing the cooking appliance, to be easily and promptly performed.

[Detailed Structure of Housing]

Figure 44:
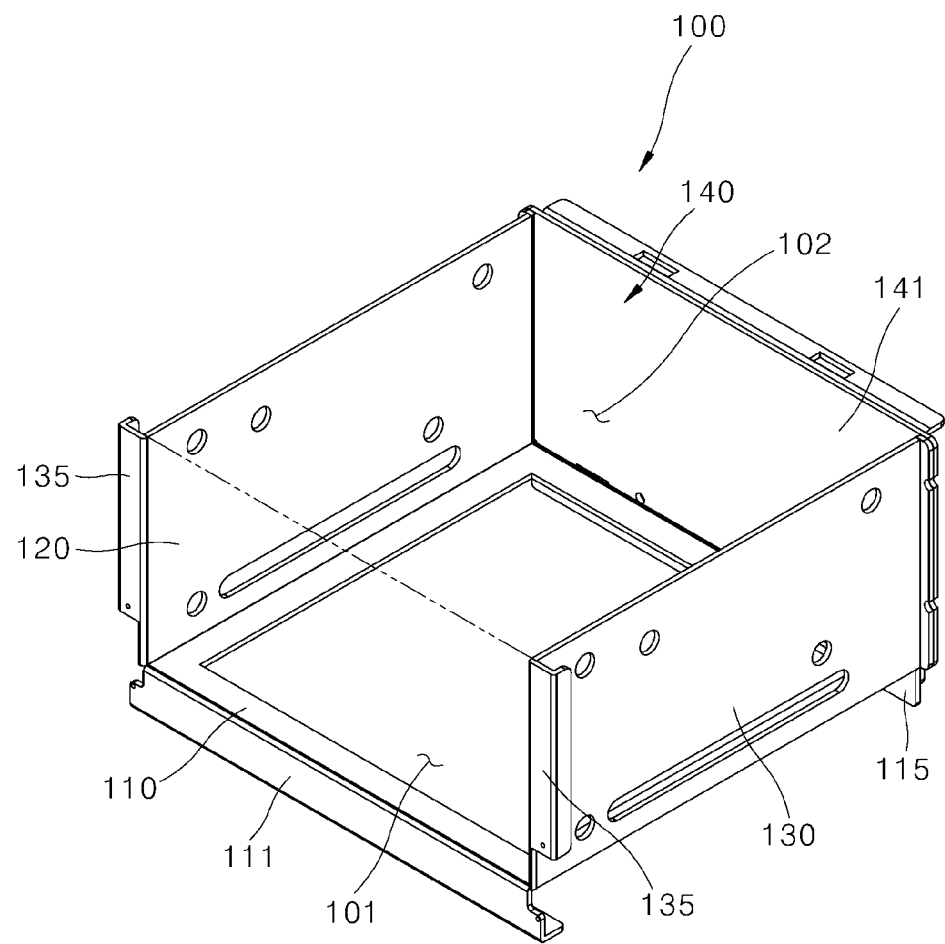
FIG. 44 is an exploded perspective view of the housing according to the embodiment of the present disclosure.
Figure 45:
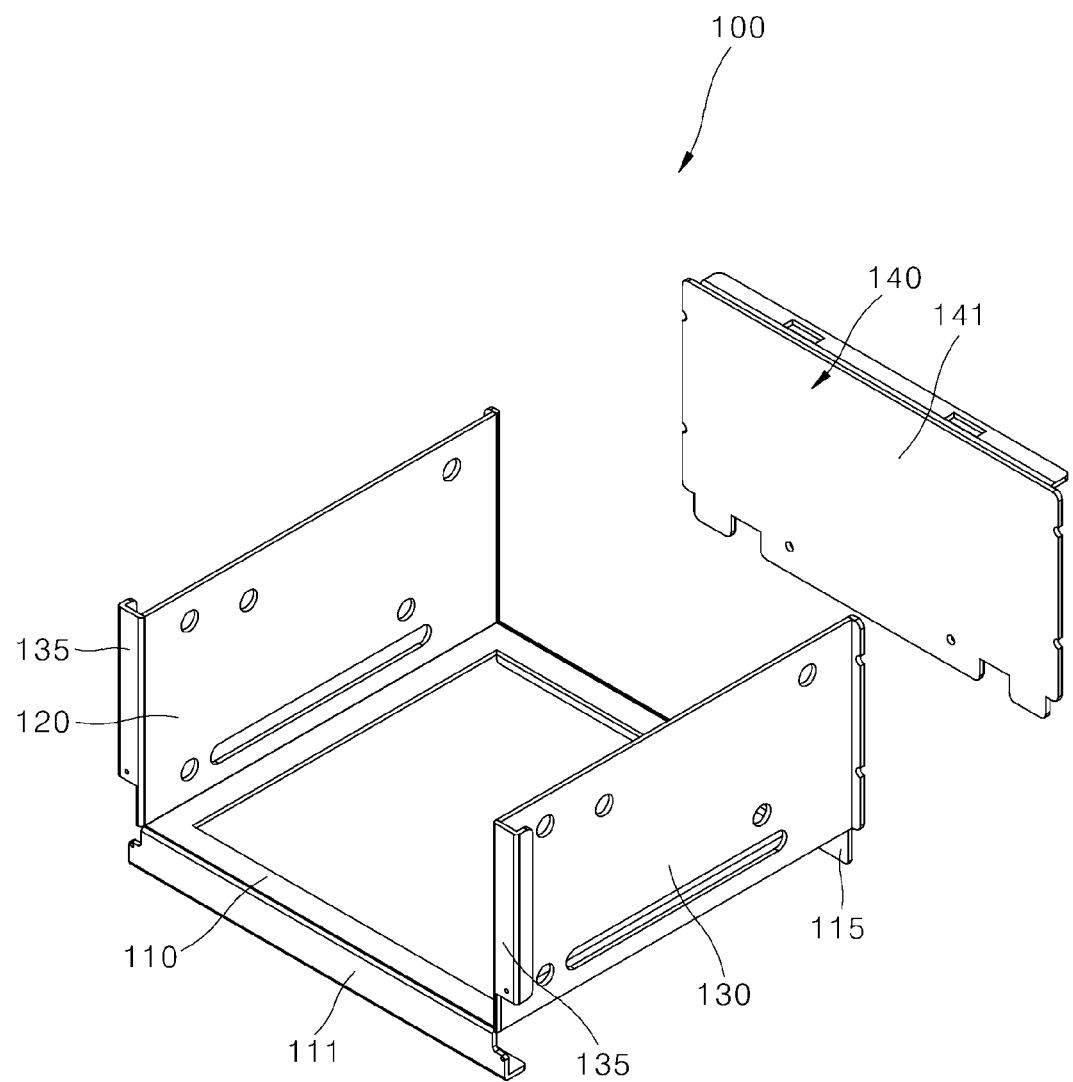
FIG. 45 is an exploded perspective view illustrating a configuration of the housing illustrated in FIG. 44.
Figure 46:
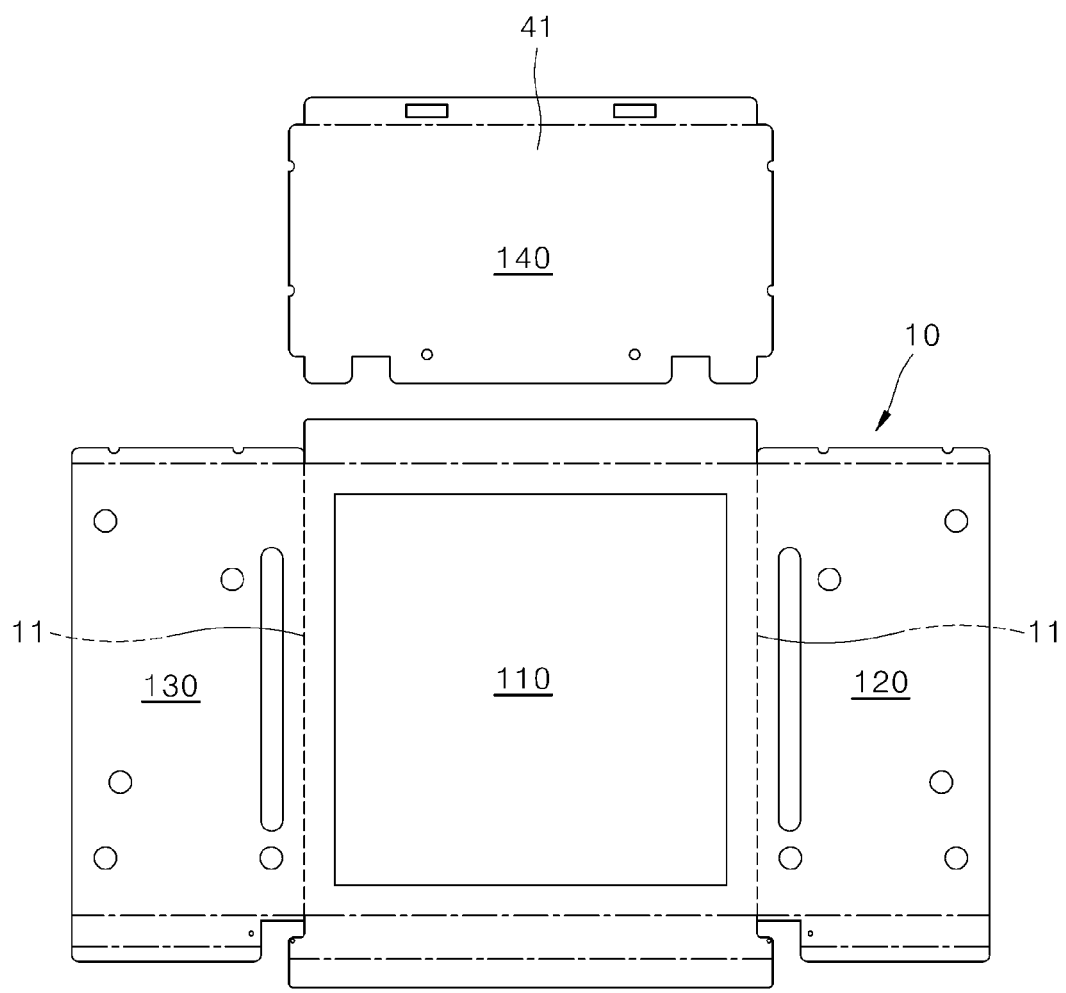
FIG. 46 is a development view of a plate for producing the housing illustrated in FIG. 44.
Figure 47:
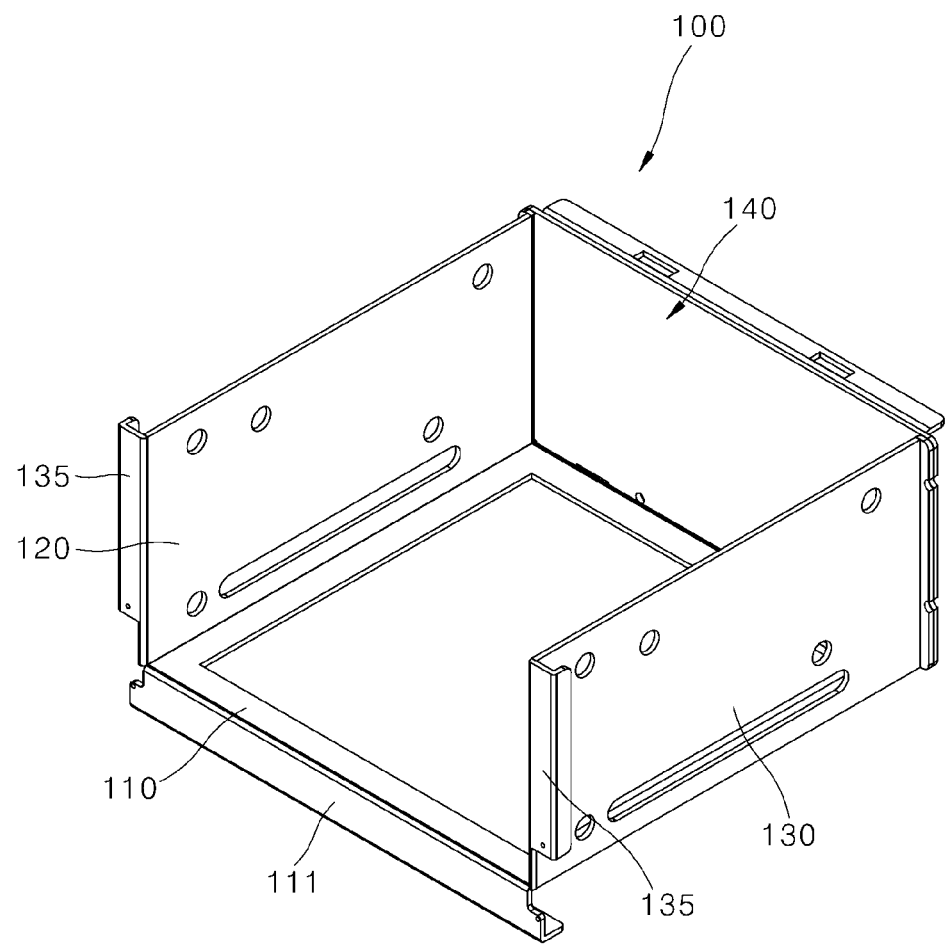
FIG. 47 is a perspective view illustrating another example of the housing illustrated in FIG. 44.
Figure 48:
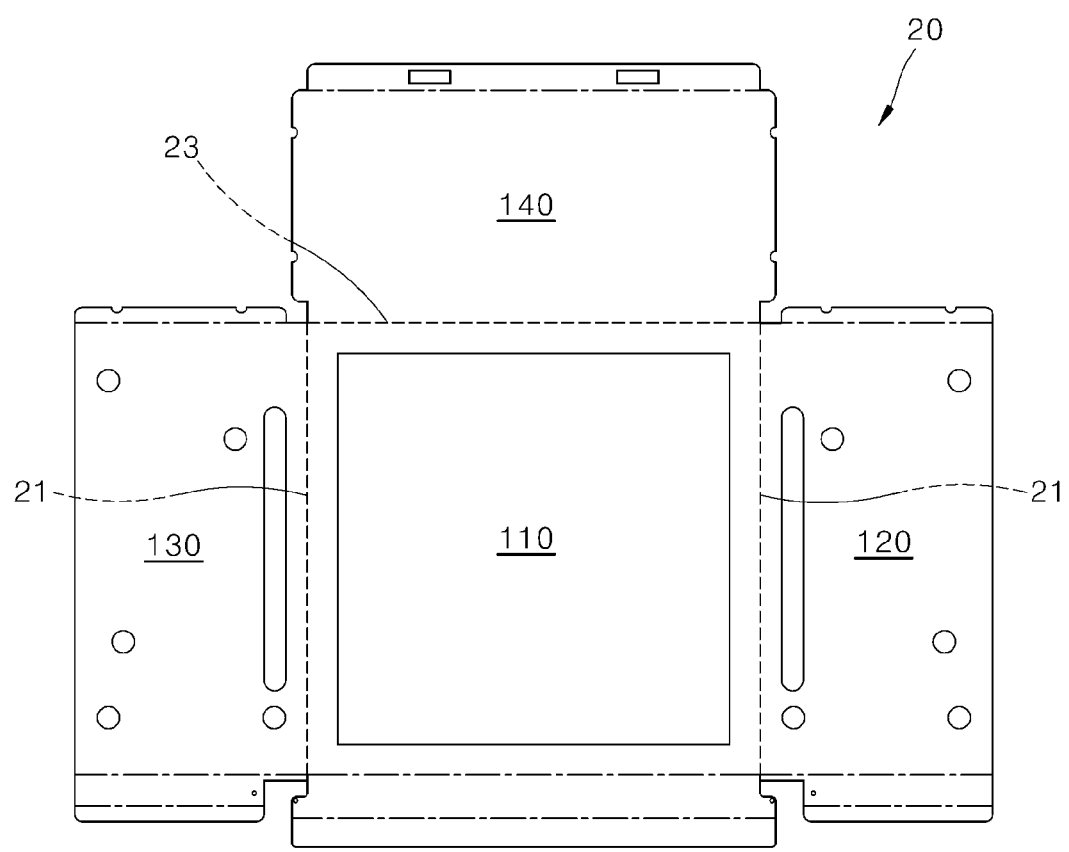
FIG. 48 is a development view of a plate for producing the housing illustrated in FIG. 46.

FIG. 44 is an exploded perspective view of the housing according to the embodiment of the present disclosure. FIG. 45 is an exploded perspective view illustrating a configuration of the housing illustrated in FIG. 44. FIG. 46 is a development view of a plate for producing the housing illustrated in FIG. 44. FIG. 47 is a perspective view illustrating another example of the housing illustrated in FIG. 44. FIG. 48 is a development view of a plate for producing the housing illustrated in FIG. 46.

Referring to FIGS. 2 to 4 and FIGS. 44 to 46, as described above, the housing 100 includes the bottom surface 110, the first side surface 120, the second side surface 130, and the back surface 140. The first side surface 120 and the second side surface 130 that are formed in a quadrilateral shape are disposed to face each other. Further, a first opening 101 is formed in at least a part of the upper surface that faces the bottom surface 110 formed in a quadrilateral shape, and a second opening 102 is formed in at least a part of the front surface that faces the back surface 140 formed in a quadrilateral shape.

In the present embodiment, it is illustrated that the first opening 101 is formed over the entire upper surface, and the second opening 102 is formed over the entire front surface. Further, the first opening 101 and the second opening 102 are formed to interconnect each other. That is, no structure that partitions a space between the first opening 101 and the second opening 102 is disposed between the first opening 101 and the second opening 102, and thus the housing 100 is provided in such a form that the upper and front surfaces thereof are open.

The housing 100 may be produced in such a form that one plate 10 is bent and at least three of the bottom surface 110, the first side surface 120, the second side surface 130, and the back surface 140 are formed.

For example, the plate 10 may be formed of a quadrilateral metal plate having long sides and short sides. Two bending lines 11 may be disposed in the plate 10 to be separated from each other in a long-side direction of the plate 10. The bending lines 11 may be formed in straight lines parallel to the short sides of the plate 10.

The plate 10 may be bent centering on the bending lines 11 in a U-shape. Among the three surfaces formed in this way, the surface disposed in the middle of the plate 10 in the long-side direction may be formed as the bottom surface 110, and the surfaces bent centering on the bottom surface 110 in a lateral direction may be formed as the first side surface 120 and the second side surface 130, respectively.

When the housing 100 is produced in this way, the bottom surface 110 of the housing 100 can be integrally coupled with both the side surfaces 120 and 130 without joints. Thereby, it is possible to improve internal aesthetic of the cooking compartment 105, and to obtain an effect of preventing foreign materials from being jammed in gaps between the bottom surface 110 and both the side surfaces 120 and 130 of the housing 100 or preventing the foreign materials from coming out through the gaps to contaminate the second heating part 600.

According to the present embodiment, since the front surface and the upper surface of the housing 100 are open and a separate structure for fixing front ends of both the side surfaces 120 and 130 of the housing 100 is not present, the first side surface 120 and the second side surface 130 of the housing 100 have a structural disadvantage vulnerable to lateral deformation.

If the bottom surface 110 and both the side surfaces 120 and 130 of the housing 100 are not connected in one without joints, and the bottom surface 110 and both the side surfaces 120 and 130 that are provided as separate structures are coupled by a method such as welding, screwing, or riveting, thereby producing the housing 100, when an external force is applied to both the side surfaces 120 and 130 of the housing 100, an influence produced by the external force has no alternative but to concentrate on coupled portions between the surfaces.

Typically, since welding, screwing, or riveting has no alternative but to be performed along coupling surfaces among the surfaces at a prescribed interval, when the external force is applied to both the side surfaces 120 and 130 of the housing 100, the influence of the external force has no alternative but to concentrate on few coupled portions. For this reason, the first side surface 120 and the second side surface 130 of the housing 100 have reduced structural rigidity, and have no alternative but to be vulnerable to the lateral deformation.

In contrast, as given in the present embodiment by way of example, if the housing 100 is produced in such a form that the bottom surface 110 is integrally connected to both the side surfaces 120 and 130 without joints, when the external force is applied to both the side surfaces 120 and 130 of the housing 100, the influence produced by the external force can be dispersed to all the coupling portions among the surfaces. Therefore, the first side surface 120 and the second side surface 130 of the housing 100 can have more improved structural rigidity, and resistance to the lateral deformation.

Meanwhile, the bottom surface 110 of the housing 100 may include a ceramic glass. The ceramic glass may have the shape of a rectangular flat plate having a prescribed thickness.

For example, the ceramic glass may be disposed at a cut middle portion of the bottom surface 110 formed of a metal material. The ceramic glass may be disposed between the second heating part 600 and the tray 200.

The hinge assemblies 800 may be installed outside both the side surfaces 120 and 130 of the housing 100. The door 300 may be rotatably installed on the housing 100 by coupling with the hinge assemblies 800 installed in this way.

The hinge assemblies 800 may be coupled to the first side surface 120 and the second side surface 130 of the housing 100, respectively. In this case, the coupling between the hinge assemblies 800 and the housing 100 may be performed by coupling between the hinge cases 830 (FIG. 19) of the hinge assemblies 800 and the housing 100.

The hinge assemblies 800 are coupled to the first side surface 120 and the second side surface 130, and thereby the hinge assemblies 800 can be fixed to the housing 100, and the structural rigidity of the first side surface 120 and the second side surface 130 of the housing 100 can be enhanced.

Since the front surface and the upper surface of the housing 100 are open and a separate structure for fixing the front ends of both the side surfaces 120 and 130 of the housing 100 is not present, the first side surface 120 and the second side surface 130 of the housing 100 have a structural disadvantage vulnerable to the lateral deformation.

In consideration of such an aspect, in the present embodiment, the hinge assemblies 800 are coupled to the first side surface 120 and the second side surface 130. The hinge assemblies 800 coupled to the first side surface 120 and the second side surface 130 in this way can serve to increase overall thicknesses and rigidity of both the side surfaces 120 and 130 of the housing 100. Thus, the structural rigidity of both the side surfaces 120 and 130 of the housing 100 is enhanced, and the resistance to the lateral deformation can also be improved.

Further, side surface cover parts 135 may be provided at the ends of the first and second side surfaces 120 and 130 which are adjacent to the front surface of the housing 100, i.e., the front ends of the first and second side surfaces 120 and 130. The side surface cover parts 135 may be formed to protrude in directions in which the first side surface 120 and the second side surface 130 move away from each other, i.e., in directions that are directed outward in the lateral directions of the housing 100.

The front end of the first side surface 120 and the front end of the second side surface 130 may be bent in the lateral directions, and thereby the side surface cover parts 135 may be formed. The side surface cover parts 135 may be formed in planes parallel to the front surface and the back surface 140 of the housing 100.

Since the side surface cover parts 135 are formed as described above, the first side surface 120 and the side surface cover part 135 and the second side surface 130 and the side surface cover part 135 can be integrally connected without joints in addition to the bottom surface 110 and both the side surfaces 120 and 130 of the housing 100.

The side surface cover parts 135 are portions exposed forward when the door 300 is opened. Since the side surface cover parts 135 are integrally connected to both the side surfaces 120 and 130 of the housing 100 without joints, an effect of improving aesthetic of the front surface of the cooking appliance can be obtained.

Meanwhile, the hinge assembly 800 coupled with the first side surface 120 is disposed in a space surrounded by the first side surface 120 and the side surface cover part 135. The hinge assembly 800 is in contact with the first side surface 120 and the side surface cover part 135, and is coupled with the first side surface 120 and the side surface cover part 135.

That is, the side surface of the hinge assembly 800 facing the first side surface 120 may be in surface contact with the first side surface 120 and be coupled with the first side surface 120, and the front surface of the hinge assembly 800 facing the side surface cover part 135 may be in contact with a back surface of the side surface cover part 135, and be coupled with the side surface cover part 135.

The hinge assembly 800 coupled with the second side surface 130 is disposed in a space surrounded by the second side surface 130 and the side surface cover part 135. The hinge assembly 800 is in contact with the second side surface 130 and the side surface cover part 135, and is coupled with the second side surface 130 and the side surface cover part 135.

That is, the side surface of the hinge assembly 800 facing the second side surface 130 may be in surface contact with the second side surface 130 and be coupled with the second side surface 130, and the front surface of the hinge assembly 800 facing the side surface cover part 135 may be in contact with a back surface of the side surface cover part 135, and be coupled with the side surface cover part 135.

As described above, the side surface cover parts 135 coupled with the hinge assemblies 800 can serve to guide coupled positions of the hinge assemblies 800 in the front-rear direction. That is, positions at which the front surfaces of the hinge assemblies 800 facing the side surface cover parts 135 are in contact with the back surfaces of the side surface cover parts 135 may be guided as the coupled positions of the hinge assemblies 800.

Further, the side surface cover parts 135 enable coupling between the housing 100 and the hinge assemblies 800 in at least two directions, and can thereby contribute to increasing coupling strength between the housing 100 and the hinge assemblies 800.

Further, like the side surface cover parts 135, if the coupling structure is formed, in which structures protrude from the side surfaces 120 and 130 of the housing 100 in the lateral directions and the hinge assemblies 800 are mutually coupled in the front-rear direction, the resistance to the lateral deformation in both the side surfaces 120 and 130 of the housing 100 can be still further improved.

In addition, the side surface cover parts 135 block the fronts of the hinge assemblies 800 such that the hinge assemblies 800 are not exposed forward. Thus, when the door 300 is opened, the hinge assemblies 800 are covered by the side surface cover parts 135, and are not exposed forward. Furthermore, since the side surface cover parts 135 are integrally connected to both the side surfaces 120 and 130 of the housing 100 without joints, the aesthetic of the front surface of the cooking appliance can be more effectively improved.

Meanwhile, bottom surface cover parts 111 and 115 may be provided at at least one of the end of the bottom surface 110 which is adjacent to the front surface of the housing 100 and the back surface 140 of the housing 100, that is, of the front and rear ends of the bottom surface 110. In the present embodiment, it is illustrated that the bottom surface cover parts 111 and 115 are provided at both of the front and rear ends of the bottom surface 110. Each of the bottom surface cover parts 111 and 115 may be formed to protrude in a direction away from the upper surface of the housing 100.

The front and rear ends of the bottom surface 110 are bent downward, and thereby the bottom surface cover parts 111 and 115 may be formed. The bottom surface cover parts 111 and 115 may be formed in planes parallel to the front surface and the back surface 140 of the housing 100.

Since the bottom surface cover parts 111 and 115 are formed as described above, the bottom surface 110 and the bottom surface cover parts 111 and 115 can be integrally connected without joints in addition to the bottom surface 110 and both the side surfaces 120 and 130 of the housing 100.

The bottom surface cover part 111 of the bottom surface cover parts 111 and 115 which is disposed at the front end of the bottom surface is a portion that is exposed forward along with the side surface cover parts 135 when the door 300 is opened. Since the bottom surface cover part 111 is integrally connected to the bottom surface of the housing 100 without joints, the effect of improving the aesthetic of the front surface of the cooking appliance can be obtained.

According to the present embodiment, the second heating part 600 (see FIG. 26) may be disposed at the lower portion of the bottom surface 110 of the housing 100. The front and rear of the second heating part 600 disposed at the lower portion of the bottom surface 110 of the housing 100 in this way may be blocked by the bottom surface cover parts 111 and 115. Further, the bottom surface cover parts 111 and 115 may be used as a coupling surface for coupling between the base 180 (see FIG. 26), which supports the second heating part 600 at the lower portion thereof, and the bottom surface 110 of the housing 100.

Meanwhile, the housing 100 of the present embodiment may further include a back surface plate 141. The back surface plate 141 may be formed of another plate provided as a member separately from the plate 10 used to form other surfaces of the housing 100, and is disposed in the rear of the bottom surface 110 and both the side surfaces 120 and 130 of the housing 100. The back surface plate 141 is coupled with at least one of the bottom surface 110, the first side surface 120 and the second side surface 130 of the housing 100, and can form the back surface of the housing 100.

Further, as illustrated in FIGS. 26 and 45, the housing 100 of the present embodiment may further include the back surface case 150 (see FIG. 26). The back surface case 150 is disposed behind the back surface 140 of the housing 100 formed by the back surface plate 141, and houses the second control board 700 therein. The back surface case 150 may be coupled to the back surface 140 of the housing 100 with the insulating plate 160 interposed therebetween.

The back surface case 150 may be installed above the base 180. The second control board 700 for the power supply to the second heating part 600 and the operation control of the second heating part 600 is installed in the back surface case 150, and the receiver coil 620 that transmits power to the second control board 700 and the second heating part 600 that is controlled by the second control board 700 is installed on the base 180.

In consideration of such an aspect, in the present embodiment, the second heating part 600, the receiver coil 620, the base 180, the second control board 700, and the back surface case 150 may be provided in the form of a single unit body. That is, the second heating part 600, the base 180, the second control board 700, and the back surface case 150 may be provided in the form of one module in which the base 180 on which the second heating part 600 and the receiver coil 620 are installed is coupled with the back surface case 150 in which the second control board 700 is installed.

Since the second heating part 600, the receiver coil 620, and the second control board 700 have a deep functional relation, if they are provided in the form of one module as described above, a process of assembling them can be separated and managed, and they can be separately preserved and managed for each module. Thus, efficiency of production management and component management can be improved.

Further, the back surface case 150 installed as described above can also serve as a support structure that is coupled to the back surface 140 of the housing 100 and supports the back surface 140. That is, the support structure in which the back surface 140 of the housing 100 is supported by the back surface case 150 whose lower portion is supported by the base 180 can be added to the housing 100, and thereby the structural rigidity of the housing 100 can be further improved.

In addition, the bottom surface cover part 115 disposed at the rear end of the bottom surface 110 may be provided as the coupling surface for coupling between at least one of the back surface plate 141 and the back surface case 150 and the bottom surface 110 of the housing 100.

That is, at least one of the back surface plate 141 and the back surface case 150 is coupled with the bottom surface cover part 115 disposed at the rear end of the bottom surface 110 so that it is coupled with the bottom surface 110, and thereby can be firmly coupled with the rear of the housing 100.

According to the present embodiment, the space in which the second heating part 600 is disposed and the space in which the second control board 700 is disposed may be connected to each other. To this end, a connection hole 181 may be formed in the base 180 to pass through the base 180.

The connection hole 181 formed in this way may form a passage that connects between the space in which the second heating part 600 is disposed and the space in which the second control board 700 is disposed, that is, between a space formed in the rear of the back surface case 150 and a space formed in the upper portion of the base 180. A wiring task may be formed for electrically connecting between the second heating part 600 and the second control board 700 and between the receiver coil 620 and the second control board 700 through the passage formed in this way.

The connection hole 181 may be formed in the sidewall of the base 180 to pass through the sidewall. A plurality of connection holes 181 are formed in the base 180, and thereby a plurality of passages may be formed to connect between the space formed in the rear of the back surface case 150 and the space formed in the upper portion of the base 180.

Further, although not illustrated in detail, a plurality of gaps may be formed between the base 180 and the back surface case 150, and the connection between the space formed in the rear of the back surface case 150 and the space formed in the upper portion of the base 180 may be performed through these gaps.

The housing 100 of the present embodiment having the configuration described above can provide the following effects.

First, the bottom surface 110 of the housing 100 is provided in such a form that it is integrally connected to both the side surfaces 120 and 130 without joints, and thereby it is possible to improve the internal aesthetic of the cooking compartment 105, and to obtain the effect of preventing foreign materials from being jammed in gaps between the bottom surface 110 and both the side surfaces 120 and 130 of the housing 100 or preventing the foreign materials from coming out through the gaps to contaminate the second heating part 600.

Second, the housing 100 is produced in such a form that the bottom surface 110 is integrally connected to both the side surfaces 120 and 130 without joints, and thereby, when the external force is applied to both the side surfaces 120 and 130 of the housing 100, the influence produced by the external force can be dispersed to all the coupling portions among the surfaces. Thus, the housing 100 having more improved structural rigidity, and resistance to the lateral deformation can be provided.

Third, the support structure in which both the side surfaces 120 and 130 of the housing 100 are supported by the hinge assemblies 800 and the back surface of the housing 100 is supported by the back surface case 150 supported by the base 180 is provided, and thereby the structural rigidity of the housing 100 can be more effectively improved.

Fourth, the portion exposed forward when the door 300 is opened is covered by the side surface cover parts 135 and the bottom surface cover part 111, and the side surface cover parts 135 and the bottom surface cover part 111 are integrally connected to both the side surfaces 120 and 130 and the bottom surface of the housing 100 without joints. Thus, the effect of improving the aesthetic of the front surface of the cooking appliance can be obtained.

Meanwhile, another example of the housing is illustrated in FIGS. 47 and 48.

Referring to FIGS. 47 and 48, the housing 100 may be produced in such a form that one plate 20 is bent and all of the bottom surface 110, the first side surface 120, the second side surface 130, and the back surface 140 are formed.

That is, the housing 100 may be produced in such a form that left and right protrusion portions of the plate 20 having a T-shape are bent upward to form the bottom surface 110 and both the side surfaces 120 and 130 of the housing 100, and a rear protrusion portion thereof is bent upward to form the back surface 140 of the housing 100.

To be more specific, the plate 20 may be formed in the T-shape in which a rectangular metal plate is orthogonal to the middle of a rectangular metal plate having long and short sides in a long-side direction.

Two first bending lines 21 may be disposed in the plate 20 to be separated from each other in the long-side direction of the metal plate. The bending lines 21 may be formed in straight lines parallel to the short sides of the plate 20.

Further, a second bending line 23 formed in a straight line parallel to the long sides of the metal plate may be provided in the plate 20. The second bending line 23 may be disposed between the two first bending lines 21.

The plate 20 may be bent centering on the first bending lines 21 in a U-shape. Among the three surfaces formed in this way, the surface disposed in the middle of the plate 20 in the long-side direction may be formed as the bottom surface 110, and the surfaces bent centering on the bottom surface 110 in a lateral direction may be formed as the first side surface 120 and the second side surface 130, respectively.

Further, the plate 20 may be bent centering on the second bending line 23 in an L-shape. Thus, the surface disposed in the middle of the plate 20 in the long-side direction may be formed as the bottom surface 110, and the surface bent centering on the bottom surface 110 may be formed as the back surface 140.

If the housing is produced in this way, the bottom surface 110, both the side surfaces 120 and 130, and the back surface 140 of the housing 100 can be integrally formed without joints between the bottom surface 110 and both the side surfaces 120 and 130 of the housing 100 and a joint between the bottom surface 110 and the back surface 140 of the housing 100.

Thereby, when viewed from the front and the top, an inner surface of the cooking compartment 105 can maintain a smooth surface while internal joints of the cooking compartment 105 are not nearly seen. Thus, the internal aesthetic of the cooking compartment 105 can be further improved, and an effect of easily removing contaminants attached to the inner surface of the cooking compartment 105 can be additionally obtained.

The present disclosure has been described above with reference to the embodiments illustrated in the drawings, but the embodiments are merely illustrative. Those of ordinary skill in the art to which the present disclosure pertains should understand that various modifications and other equivalent embodiments are possible from the above embodiments. Therefore, the actual technical scope of the present disclosure should be defined by the claims below.

DESCRIPTION OF REFERENCE NUMERALS

100: housing
105: cooking compartment
110: bottom surface
111, 115: bottom surface cover part
120, 130: side surface
125: second slot
135: side surface cover part
140: back surface
141: back surface plate
150: back surface case
160: insulating plate
170: cabinet
180: base
200: tray
205: tray main body
210: mounting part
211: first protrusion
213: second protrusion
214: sliding surface
215: mounting groove
220: water receiving groove
230: steam cover
231: cover main body part
233: steam hole
235: water entrance guide surface
237: water entrance hole
300: door
301: air intake port
303: air exhaust port
305: handle
310: door upper surface part
320: door frame
320a: fastening hole
321: coupling part
322: seating surface
323: restricting rib
324: stopper
325: heater mounting part
326: first connecting end fixing part
327: second connecting end fixing part
328: shielding plate
330, 335: glass
340, 345: cable mounting part
343: connecting member
350: door front surface part
360: input part
370: first cooling fan
400: first heating part
410: heating element
420: first connecting end
421: cylindrical part
422: extension part
423: step
425: key-shaped part
430: second connecting end
440: reflector
450: protective grille
500: first control board
600: second heating part
610: working coil
611: first coil installation base
612: first fastening hole
613: first coil
614: open hole
615: first coil connection wiring
617: first ferrite
619: first central hole
620: receiver coil
621: second coil installation base
622: first fastening hole
623: second coil
627: second ferrite
629: second central hole
630: electromagnetic shielding plate
631: first coil corresponding region
632: second coil corresponding region
633: third fastening hole
634: fourth fastening hole
635: vent
637: first ferrite corresponding region
638: second ferrite corresponding region
639: third central hole
640: temperature measurement module
700: second control board
710: noise filter PCB
720: coil control PCB
725: IGBT chip
726: heat sink
730: second cooling fan
800: hinge assembly
810: hinge part
820: mounting protrusion
830: hinge case
831: guide hole
832: first guide rib
833: second guide rib
835: first slot
W: see-through window

What is claimed is:
1. A cooking appliance, comprising:
a housing having a cooking compartment, a bottom part, and a base, the bottom part defining a bottom surface of the cooking compartment and the base of the housing below the bottom part; and
an induction heating part installed between the bottom part and the base, the induction heating part including:
a working coil installed adjacent to the bottom part for inductively heating an object in the cooking compartment;

a receiver coil installed adjacent to the base for wirelessly receiving power from a coil of another appliance to operate the cooking appliance; and an electromagnetic shielding plate provided between the working coil and the receiver coil for shielding electromagnetic waves, wherein a center axis of the receiver coil and a center axis of the working coil are aligned.

2. The cooking appliance according to claim 1, wherein the electromagnetic shielding plate has a sheet shape.

3. The cooking appliance according to claim 1, wherein the electromagnetic shielding plate contains aluminum.

4. The cooking appliance according to claim 1, wherein the electromagnetic shielding plate is one sheet of plate interposed between the working coil and the receiver coil.

5. The cooking appliance according to claim 1, wherein the electromagnetic shielding plate has a size that shields both the receiver coil and the working coil.

6. The cooking appliance according to claim 1, wherein:
the working coil includes a plurality of first ferrites that radially extend from positions spaced apart from a center of the working coil by a prescribed distance;
the receiver coil includes a plurality of second ferrites that radially extend from positions spaced apart from a center of the receiver coil by a prescribed distance; and
the electromagnetic shielding plate includes first ferrite corresponding regions overlapping with regions in which the first ferrites are disposed and second ferrite corresponding regions overlapping with regions in which the second ferrites are disposed.

7. The cooking appliance according to claim 6, wherein the first ferrite corresponding regions are closed and the second ferrite corresponding regions are closed.

8. The cooking appliance according to claim 1, wherein:
the working coil includes a first coil surrounding a center of the working coil and being spaced apart from the center of the working coil;
the receiver coil includes a second coil surrounding a center of the receiver coil and being spaced apart from the center of the receiver coil; and
the electromagnetic shielding plate includes a first region corresponding to the first coil and overlapping with a region in which the first coil is disposed, and a second region corresponding to the second coil and overlapping with a region in which the second coil is disposed.

9. The cooking appliance according to claim 8, wherein the first region and the second region at least partly overlap with each other.

10. The cooking appliance according to claim 9, wherein the electromagnetic shielding plate includes vents provided in parts of the first region which do not overlap with the second region.

11. The cooking appliance according to claim 10, wherein:
the working coil includes a first coil installation base to which the first coil is fixed;
holes are provided in the first coil installation base; and
the holes of the first coil installation base and the vents of the electromagnetic shielding plate at least partly overlap with each other.

12. The cooking appliance according to claim 1, wherein the receiver coil has a circular shape and/or the working coil has a rectangular shape whose corner portions are rounded.

13. The cooking appliance according to claim 1, further comprising a control board for supplying the working coil with power received from the receiver coil.

14. The cooking appliance according to claim 13, wherein the control board is installed behind a back part of the housing.

15. The cooking appliance according to claim 14, wherein a space below the bottom part and a space behind the back part of the housing are connected to communicate with each other.

16. The cooking appliance according to claim 15, wherein the working coil and the control board are connected by a first coil connecting wiring via the connected spaces and/or the receiver coil and the control board are connected by a second coil connecting wiring via the connected spaces.

17. The cooking appliance according to claim 14, wherein an insulating plate for insulating heat is interposed between the back part of the housing and the control board.

18. The cooking appliance according to claim 1, wherein:
a first central hole is provided in a center of the working coil;
a second central hole is provided in a center of the receiver coil;
a third central hole is provided in a center of the electromagnetic shielding plate; and
the first central hole, the second central hole, and the third central hole communicate with one another.

19. The cooking appliance according to claim 18, wherein a temperature measurement module is provided to pass through the first central hole, the second central hole, and the third central hole in a vertical direction.

* * * * *